US012692571B2

(12) United States Patent
Kawata et al.

(10) Patent No.: US 12,692,571 B2
(45) Date of Patent: Jul. 28, 2026

(54) STEEL SHEET AND METHOD OF MANUFACTURING THE SAME

(71) Applicant: NIPPON STEEL CORPORATION, Tokyo (JP)

(72) Inventors: Hiroyuki Kawata, Tokyo (JP); Kengo Takeda, Tokyo (JP); Eriko Tsukamoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 570 days.

(21) Appl. No.: 17/771,770

(22) PCT Filed: Jan. 4, 2021

(86) PCT No.: PCT/JP2021/000036
§ 371 (c)(1),
(2) Date: Apr. 25, 2022

(87) PCT Pub. No.: WO2021/141006
PCT Pub. Date: Jul. 15, 2021

(65) Prior Publication Data
US 2022/0389531 A1      Dec. 8, 2022

(30) Foreign Application Priority Data
Jan. 8, 2020      (JP) ................................. 2020-001531

(51) Int. Cl.
| | |
|---|---|
| *C21D 9/46* | (2006.01) |
| *B32B 15/01* | (2006.01) |
| *C21D 6/00* | (2006.01) |
| *C21D 8/02* | (2006.01) |
| *C21D 8/0221* | (2026.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/16* | (2006.01) |
| *C22C 38/22* | (2006.01) |
| *C22C 38/28* | (2006.01) |
| *C22C 38/32* | (2006.01) |
| *C23C 2/02* | (2006.01) |
| *C23C 2/06* | (2006.01) |
| *C23C 2/26* | (2006.01) |
| *C23C 2/40* | (2006.01) |

(52) U.S. Cl.
CPC ............. *C21D 9/46* (2013.01); *B32B 15/013* (2013.01); *C21D 6/001* (2013.01); *C21D 6/002* (2013.01); *C21D 6/005* (2013.01); *C21D 6/008* (2013.01); *C21D 8/02* (2013.01); *C21D 8/0226* (2013.01); *C21D 8/0236* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/16* (2013.01); *C22C 38/22* (2013.01); *C22C 38/28* (2013.01); *C22C 38/32* (2013.01); *C23C 2/02* (2013.01); *C23C 2/0224* (2022.08); *C23C 2/06* (2013.01); *C23C 2/26* (2013.01); *C23C 2/40* (2013.01); *C21D 2211/005* (2013.01)

(58) Field of Classification Search
CPC ..... C22C 18/00; C22C 38/001; C22C 38/002; C22C 38/005; C22C 38/008; C22C 38/02; C22C 38/04; C22C 38/06; C22C 38/08; C22C 38/12; C22C 38/14; C22C 38/16; C22C 38/22; C22C 38/26; C22C 38/28; C22C 38/32; C22C 38/38; C22C 38/60; C22C 38/42; C22C 38/44; C22C 38/58; C21D 1/26; C21D 2211/004; C21D 2211/005; C21D 6/001; C21D 6/002; C21D 6/005; C21D 6/008; C21D 6/02; C21D 8/0205; C21D 8/021; C21D 8/0226; C21D 8/0236; C21D 8/0263; C21D 8/0273; C21D 9/46; C23C 2/02; C23C 2/022; C23C 2/0224; C23C 2/06; C23C 2/26; C23C 2/40; C23C 2/024; C23C 2/28

See application file for complete search history.

(56) References Cited

U.S. PATENT DOCUMENTS

| | | | |
|---|---|---|---|
| 2011/0030854 A1 | 2/2011 | Matsuda et al. | |
| 2013/0259734 A1 | 10/2013 | Kakiuchi et al. | |
| 2014/0234655 A1* | 8/2014 | Takashima ........... | C21D 8/0463 148/533 |

(Continued)

FOREIGN PATENT DOCUMENTS

| | | | |
|---|---|---|---|
| EP | 2 816 129 A1 | 12/2014 | |
| JP | 2008106350 | * | 5/2008 |

(Continued)

*Primary Examiner* — Nicholas A Wang

(74) *Attorney, Agent, or Firm* — Birch, Stewart, Kolasch & Birch, LLP

(57) ABSTRACT

A steel sheet has a predetermined chemical composition, in which a microstructure in a ¼ width portion, a microstructure in a ½ width portion, and a microstructure in a ¾ width portion, include, by area %, ferrite: 80% or more, martensite: 2% or less, and residual austenite: 2% or less, in which a proportion of unrecrystallized ferrite in the ferrite is 5% to 60%, an average grain size of carbonitrides is 6.0 nm to 30.0 nm, and Expressions (2) to (5) are satisfied.

$$\Delta_{SF}/\mu_{SF} \leq 0.10 \tag{2}$$

$$\Delta_{dF}/\mu_{dF} \leq 0.20 \tag{3}$$

$$\Delta_{SUF} \leq 20 \tag{4}$$

$$\Delta_{dC}/\mu_{dC} \leq 0.50 \tag{5}$$

16 Claims, No Drawings

(56)                    References Cited

U.S. PATENT DOCUMENTS

2014/0352850 A1 * 12/2014 Kondo ...................... C23C 2/40
                                                      148/504
2017/0314091 A1    11/2017 Kawasaki et al.
2019/0161823 A1     5/2019 Kohsaka et al.

FOREIGN PATENT DOCUMENTS

JP          2010285656     * 12/2010
JP             5347739 B     11/2013
JP             5659929 B2     1/2015
JP          2015-147967 A     8/2015
JP           2015147967     *  8/2015
KR          20170118929     * 10/2017
WO     WO 2009/096596 A1      8/2009
WO     WO 2018/030503 A1      2/2018

* cited by examiner

STEEL SHEET AND METHOD OF MANUFACTURING THE SAME

TECHNICAL FIELD OF THE INVENTION

The present invention relates to a steel sheet and a method for manufacturing the same. Priority is claimed on Japanese Patent Application No. 2020-001531, filed on Jan. 8, 2020, the content of which is incorporated herein by reference.

BACKGROUND ART

Recently, in vehicles, in order to reduce the weight of a vehicle body for a reduction in fuel consumption, to reduce the emissions of carbon dioxide gas, or to absorb collision energy during collision for ensuring the protection and safety of passengers, high strength steel sheets are widely used. However, in general, in a case where a steel sheet is high-strengthened, deformability (for example, ductility or bendability) deteriorates. In a case where the deformability of the steel sheet deteriorates, the dimensional accuracy during press forming may be poor.

For example, Patent Document 1 discloses a high strength steel sheet having a tensile strength of 900 MPa or higher where high strength and excellent formability can be simultaneously achieved. In Patent Document 1, a steel structure includes, by area ratio, 5% or more and 80% or less of ferrite, 15% or more of autotempered martensite, 10% or less of bainite, 5% or less of residual austenite, and 40% or less of as-quenched martensite; an average hardness of the autotempered martensite is HV≤700; and the average number of precipitated iron-based carbide grains each having a size of 5 nm or more and 0.5 μm or less in the autotempered martensite is $5 \times 10^4$ or more per 1 $mm^2$.

Patent Document 2 discloses a steel sheet having a tensile strength of 900 MPa or higher, excellent weldability, and excellent elongation. The steel sheet in Patent Document 2 includes, as a steel structure, by area ratio, 25% or more and 65% or less of ferrite, 35% or more and 75% or less of martensite having iron-based carbides precipitated in the martensite grains, and 20% or less (including 0%) in total of the remainder in microstructure other than the ferrite and the martensite, in which an average grain size of each of the ferrite and the martensite is 5 μm or less, and a total atomic concentration of Si and Mn at an interface between the ferrite and the martensite is 5% or more.

Patent Document 3 discloses a cold-rolled steel sheet including, as a steel structure, 60 area % or more in total of ferrite and bainite and 3 area % or more and 20 area % or less of residual austenite, in which an average grain size of the ferrite and the bainite is 0.5 μm or more and 6.0 μm or less, a C concentration in the residual austenite is 0.5 mass % or more and 1.2 mass % or less, the cold-rolled steel sheet has an element concentration distribution in which an average interval in an orthogonal-to-rolling direction of each of a Mn concentrated portion and a Si concentrated portion that extend in a rolling direction at a 50 μm depth position from a steel sheet surface is 1000 μm or less, the cold-rolled steel sheet has surface properties in which a maximum depth of cracks on the steel sheet surface is 4.5 μm or less and a number density of cracks having a width of 6 μm or less and a depth of 2 μm or more is 10 crack/50 μm or more, and the cold-rolled steel sheet has mechanical properties in which a tensile strength (TS) is 800 MPa or higher and 1200 MPa or lower, a work hardening coefficient (n3-8) in a plastic strain region of 3% or more and 8% or less is 0.10 or more, and bendability satisfies an expression (R/t≤1.5).

Patent Document 4 discloses a high-strength cold-rolled steel sheet including, as a composition, by mass %, C: 0.03% or more and 0.15% or less, Si: 1.5% or less, Mn: 0.6% or less, P: 0.05% or less, S: 0.01% or less, Al: 0.08% or less, N: 0.0080% or less, and Ti: 0.04% or more and 0.18% or less, an area ratio of ferrite is 90% or more, a dispersion in area ratio of the ferrite in a coil surface is 3% or less, an area ratio of worked ferrite with respect to the ferrite is 15% or less, an average grain size of carbides including Ti in crystal grains of the ferrite is 10 nm or less, and a proportion of a Ti content present in a solid solution state in a matrix to a Ti content in the steel sheet is less than 10%.

However, as a result of an investigation by the present inventors, it was found that a dimensional accuracy during press forming is not sufficient with the techniques disclosed in Patent Documents 1 to 4.

PRIOR ART DOCUMENT

Patent Document

[Patent Document 1] PCT International Publication No. WO2009/096596
[Patent Document 2] PCT International Publication No. WO2018/030503
[Patent Document 3] Japanese Patent No. 5659929
[Patent Document 4] Japanese Unexamined Patent Application, First Publication No. 2015-147967

DISCLOSURE OF THE INVENTION

Problems to be Solved by the Invention

The present invention has been considering that not only improvement of formability and strength but also improvement of dimensional accuracy during press forming are required for a high strength steel sheet as described above. An object of the present invention is to provide a high strength steel sheet (including a galvanized steel sheet, a zinc alloy plated steel sheet, a galvannealed steel sheet, and an alloy galvannealed steel sheet) having excellent formability, strength, and dimensional accuracy during press forming and a method of manufacturing the same.

Means for Solving the Problem

As a result of an investigation in order to achieve the object, the present inventors achieved findings.

In order to obtain a steel sheet having excellent formability, strength, and dimensional accuracy during press forming, it is necessary to suppress property fluctuation in a sheet width direction of the steel sheet that increases a dispersion in dimensional accuracy during press forming. Specifically, it is important to suppress a fluctuation in an area ratio of ferrite, an average grain size of ferrite, an area ratio of unrecrystallized ferrite, and an average grain size of carbonitrides in the sheet width direction of the steel sheet.

The present invention has been made based on the above findings, and the scope thereof is as follows.

[1] According to one aspect of the present invention, there is provided a steel sheet including, as a composition, by mass %:
  C: 0.035% to 0.150%;
  Si: 0.010% to 1.500%;
  Mn: 0.10% to 3.00%;
  Al: 0.005% to 1.000%;
  P: 0.100% or less;

S: 0.0200% or less;

N: 0.0150% or less;

O: 0.0100% or less;

V: 0% to 0.50%;

Cr: 0% to 1.00%;

Ni: 0% to 1.00%;

Cu: 0% to 1.00%;

Mo: 0% to 1.00%;

W: 0% to 1.00%;

B: 0% to 0.0100%;

Sn: 0% to 1.00%;

Sb: 0% to 0.20%;

Nb: 0% to 0.060%;

Ti: 0% to 0.100%;

Ca: 0% to 0.0100%;

Mg: 0% to 0.0100%;

Zr: 0% to 0.0100%;

REM: 0% to 0.0100%; and a remainder: Fe and impurities, in which Expressions (1-1) to (1-3) are satisfied, a microstructure in a ¼ width portion at a ¼ width position from a sheet width direction end portion in a sheet width direction and at a ¼ thickness position from a surface in a sheet thickness direction, a microstructure in a ½ width portion at a ½ width position from the sheet width direction end portion in the sheet width direction and at the ¼ thickness position from the surface in the sheet thickness direction, and a microstructure in a ¾ width portion at a ¾ width position from the sheet width direction end portion in the sheet width direction and at the ¼ thickness position from the surface in the sheet thickness direction include, by area %, ferrite: 80% or more, martensite: 2% or less, residual austenite: 2% or less, and the remainder in microstructure, a proportion of unrecrystallized ferrite in the ferrite is 5% to 60%, an average grain size of carbonitrides is 6.0 nm to 30.0 nm, Expressions (2) to (5) are satisfied, a 0.2% proof stress is 280 MPa to 600 MPa, a tensile strength is 450 MPa to 800 MPa, a yield ratio is 0.50 to 0.90, and a uniform elongation is 10.0% or more.

$$1.5 \times Nb + Ti \geq 0.015 \tag{1-1}$$

$$0.03 \leq \{(Ti/48 - N/14) + Nb/93\}/(C/12) \leq 0.40 \tag{1-2}$$

$$Ca + Mg + Zr + REM \leq 0.0100 \tag{1-3}$$

$$\Delta_{SF}/\mu_{SF} \leq 0.10 \tag{2}$$

$$\Delta_{dF}/\mu_{dF} \leq 0.20 \tag{3}$$

$$\Delta_{SUF} \leq 20 \tag{4}$$

$$\Delta_{dC}/\mu_{dC} \leq 0.50 \tag{5}$$

Each of Ti, N, Nb, C, Ca, Mg, Zr, and REM in Expressions (1-1) to (1-3) represent a content by mass % of the element, when the element is not included, 0 is substituted as the content of the element, and when a value of $(Ti/48 - N/14)$ is negative, 0 is substituted as the value of $(Ti/48 - N/14)$, $\mu_{SF}$ in Expression (2) represents an average value of an area ratio of ferrite in the microstructure in the ¼ width portion, an area ratio of ferrite in the microstructure in the ½ width portion, and an area ratio of ferrite in the microstructure in the ¾ width portion, and $\Delta_{SF}$ represents a difference between a maximum value and a minimum value of area ratio of ferrite in the microstructures in the ¼ width portion, the ½ width portion, and the ¾ width portion, $\mu_{dF}$ in Expression (3) represents an average value of an average grain size of ferrite in the microstructure in the ¼ width portion, an average grain size of ferrite in the microstructure in the ½ width portion, and an average grain size of ferrite in the microstructure in the ¾ width portion, and $\Delta_{dF}$ represents a difference between a maximum value and a minimum value of average grain size of ferrite in the microstructures in the ¼ width portion, the ½ width portion, and the ¾ width portion, $\Delta_{SUF}$ in Expression (4) represents a difference between a maximum value and a minimum value of area ratio of unrecrystallized ferrite in the microstructures in the ¼ width portion, the ½ width portion, and the ¾ width portion, and $\mu_{dC}$ in Expression (5) represents an average value of an average grain size of carbonitrides in the microstructure in the ¼ width portion, an average grain size of carbonitrides in the microstructure in the ½ width portion, and an average grain size of carbonitrides in the microstructure in the ¾ width portion, and $\Delta_{dC}$ represents a difference between a maximum value and a minimum value of average grain size of carbonitrides in the microstructures in the ¼ width portion, the ½ width portion, and the ¾ width portion.

[2] In the steel sheet according to [1], the composition may include Mn: 0.70% to 3.00% by mass %.

[3] In the steel sheet according to [1] or [2], the average grain sizes of ferrite in the ¼ width portion, the ½ width portion, and the ¾ width portion may be 5.0 μm to 15.0 μm.

[4] The steel sheet according to any one of [1] to [3] may further include a galvanized layer on the surface.

[5] The steel sheet according to any one of [1] to [3] may further include a zinc alloy plated layer on the surface.

[6] In the steel sheet according to [4] or [5], a Fe content in the galvanized layer or the zinc alloy plated layer may be 7.0% to 13.0% by mass %.

[7] According to another aspect of the present invention, there is provided a method of manufacturing the steel sheet according to any one of [1] to [3], including:

a hot rolling process of heating a steel piece having the composition according to [1] to 1150° C. to 1320° C., completing hot rolling such that a hot rolling completion temperature is 850° C. to 930° C., starting cooling after 1.5 s or longer, cooling the steel piece to a temperature range of lower than 450° C. to obtain a hot-rolled steel sheet such that an average cooling rate in a temperature range of 800° C. to 450° C. is 20° C./s or higher;

a reheating process of heating the hot-rolled steel sheet to a temperature range of 450° C. to 700° C.;

a cooling process of cooling the hot-rolled steel sheet to room temperature;

a cold rolling process of cold-rolling the hot-rolled steel sheet to obtain a cold-rolled steel sheet such that a total rolling reduction is 30% to 80% and a cold rolling completion temperature is 120° C. or higher; and an annealing process of heating the cold-rolled steel sheet to an annealing temperature of 720° C. to 850° C. and cooling the cold-rolled steel sheet to a temperature range of 500° C. or lower, in which in the hot rolling process, Expression (6) is satisfied in a temperature range of 1000° C. or lower, in the reheating process, Expression (7-1) and Expression (8) are satisfied in the temperature range of 450° C. to 700° C., in the annealing process, in the process of heating to the annealing temperature, Expression (9) is satisfied in a temperature range of 550° C. to 720° C., a tension of 15 MPa or higher is applied and Expression (10) is satisfied in a temperature range of 720° C. to the annealing temperature, and in the process of cooling from the annealing temperature, Expression (11) is satisfied in a temperature range of 720° C. to 500° C.

$$g_n = \left(0.5 + \frac{h*}{h}\right) \cdot \left(1 + a_1\sqrt{Nb} + a_2\sqrt{Ti}\right) \tag{6}$$

$$K_n = (T_n + 273) \cdot \left(a_3 + a_4\sqrt{Nb} + a_5\sqrt{Ti}\right)$$

$$R_n = (T_n + 273) \cdot \left(a_6 + a_7\sqrt{Nb} + a_8\sqrt{Ti}\right)$$

$$J_n = \left(\frac{h*}{h}\right)^{1.5} \cdot \left(a_9 + a_{10}\sqrt{Nb} + a_{11}\sqrt{Ti}\right)$$

$$f_n = [f_{n-1} \cdot \exp(-K_n \cdot t_n) + g_n \cdot \{1 - \exp(-K_n \cdot t_n)\}] \cdot \exp(-R_n \cdot t_n) + J_n \leq 1.00$$

In Expression (6), $f_n$ represents an index representing a degree of progress of precipitation of a fine carbide in the temperature range of 1000° C. or lower of the hot rolling process, reference numerals in Expression (6) are as follows, n: the number of rolling passes at 1000° C. or lower, h: a sheet thickness [mm] before an n-th pass rolling, h*: a sheet thickness [mm] after the n-th pass rolling, Nb and Ti: contents [mass %] of Nb and Ti, $T_n$: an average steel sheet temperature [° C.] from the n-th pass rolling to an n+1-th pass rolling, $t_n$: a shorter time among a time [s] from the n-th pass rolling to the n+1-th pass rolling and a time [s] taken until the steel sheet temperature decreases to 800° C. from the n-th pass rolling, and $a_{1\ to\ 11}$: constants ($a_1$=2.28×100, $a_2$=1.25×100, $a_3$=7.86× $10^{-4}$, $a_4$=1.36×$10^{-3}$, $a_5$=6.76×$10^{-4}$, $a_6$=7.86×$10^{-4}$, $a_7$=2.13×$10^{-3}$, $a_8$=1.14×$10^{-3}$, $a_9$=6.70×$10^{-2}$, $a_{10}$=1.11× $10^0$, and $a_{11}$=5.27×$10^{-1}$)

$$b_1 \cdot \left\{1.00 - \exp\left(-\frac{b_2 + b_3 \cdot \sqrt{Nb} + b_4 \cdot \sqrt{Ti*} - T_{max}}{b_5 + b_6 - \sqrt{Nb} + b_7 \cdot \sqrt{Ti*}}\right)\right\} \cdot \sqrt{D_{20} \cdot t_{20}} \geq 1.00 \tag{7-1}$$

Reference numerals in Expression (7-1) are as follows, $b_{1\ to\ 7}$: constants ($b_1$=6.82×$10^6$, $b_2$=1.00×$10^3$, $b_3$=8.70× $10^1$, $b_4$=1.25×$10^2$, $b_5$=1.00×$10^2$, $b_6$=−1.50×$10^1$, and $b_7$=−2.50×$10^1$), Nb: a Nb content [mass %], Ti*: an effective Ti content represented by Ti−42/14×N, where, each of Ti and N represents a content by mass % of the element, and when the element is not included, 0 is substituted as the content of the element, $T_{max}$: a highest heating temperature [° C.], $t_{20}$: an effective heat treatment time [s] in a 20th period when a residence time in the temperature range of 450° C. to 700° C. is divided into 20 periods, and $D_{20}$: an index representing an effective diffusion rate in a 20th period when a residence time in the temperature range of 450° C. to 700° C. is divided into 20 periods, where, an m-th effective heat treatment time $t_m$ and an index $D_m$ representing an m-th effective diffusion rate are represented by Expression (7-2)

$$D_m = \frac{Ti*}{42} \cdot \left(\frac{Ti*}{42} + \frac{Nb}{92}\right)^{-1} \cdot b_8 \cdot \exp\left(-\frac{b_9}{T_m}\right) + \frac{Nb}{92} \cdot \left(\frac{Ti*}{42} + \frac{Nb}{92}\right)^{-1} \cdot b_{10} \cdot \exp\left(-\frac{b_{11}}{T_m}\right) \tag{7-2}$$

$$t_m = t' + \frac{D_{m-1}}{D_m} \cdot t_{m-1}$$

Reference numerals in Expression (7-2) are as follows, m: an integer of 1 to 20, $b_{9\ to\ 11}$: constants ($b_8$=6.81×$10^1$, $b_9$=2.61×$10^5$, $b_{10}$=5.60× $10^0$, and $b_{11}$=2.86×$10^5$), Nb: a Nb content [mass %], Ti*: an effective Ti content represented by Ti−42/14×N, where, each of Ti and N represents a content by mass % of the element, and when the element is not included, 0 is substituted as the content of the element, $T_m$: an average steel sheet temperature [° C.] in an m-th period when a residence time in the temperature range of 450° C. to 700° C. is divided into 20 periods, $t_m$: an effective heat treatment time [s] in an m-th period when a residence time in the temperature range of 450° C. to 700° C. is divided into 20 periods where, $t_1$=t', and t': 1/20 [s] of an entire residence time in the temperature range of 450° C. to 700° C.

$$K_j = \tag{8}$$

$$T_j \cdot (\log 10(s_j) + 20 / (1 + 0.15 \times Si - 0.08 \times Mn - 0.05 \times Cr - 0.13 \times Mo))$$

$$s_j = t' + 10^{\frac{T_{j-1}}{T_j}\log 10 s_{j-1} + \frac{20}{T_j} \cdot \frac{T_j + T_{j-1}}{1 + 0.15Si - 0.08Mn - 0.05Cr - 0.13Mo}}$$

$$K_{20} \leq 2.00 \times 10^4$$

In Expression (8), $K_{20}$ represents an index representing a degree of stabilization of cementite in a 20th period when a temperature history in the temperature range of 450° C. to 700° C. of the reheating process is divided into 20 periods with respect to time, reference numerals in Expression (8) are as follows, j: an integer of 1 to 20, each of Si, Mn, Cr, and Mo: a content [mass %] of the element, $T_j$: an average steel sheet temperature [° C.] in a j-th period when a residence time in the temperature range of 450° C. to 700° C. is divided into 20 periods, $s_j$: an effective heat treatment time [s] in a j-th period when a residence time in the temperature range of 450° C. to 700° C. is divided into 20 periods, where, $s_1$=t', and t': 1/20 [s] of an entire residence time in the temperature range of 450° C. to 700° C.

$$E = d_1 \cdot \left(1 - \frac{h*}{h}\right)^{1.5} \cdot T_R^{-1} \cdot \left(1 + d_2 \cdot Nb^{0.5} + d_3 \cdot Ti*^{0.5}\right)^{-1} \cdot K_2^{0.5} \tag{9}$$

$$q_n = d_3 \cdot E \cdot \exp\left(-\frac{d_4}{T_n' + 273}\right)$$

-continued $$t_n = \Delta t - \frac{\ln(1 - p_{n-1})}{q_n}$$

$$p_n = 1 - \exp(-q_n \cdot t_n)$$

$$0.10 \le p_{10} \le 1.00$$

In Expression (9), $p_{10}$ represents an index representing a degree of progress of recrystallization in a 10th period when a residence time in the temperature range of 550° C. to 720° C. in the process of heating in the annealing process is divided into 10 periods, reference numerals in Expression (9) are as follows, $d_{1 \ to \ 4}$: constants ($d_1$=4.24×10², $d_2$=2.10×10⁰, $d_3$=1.31× 10³, and $d_4$=7.63×10³), h: a sheet thickness [mm] before cold rolling, h*: a sheet thickness [mm] after cold rolling, $T_R$: a cold rolling completion temperature [° C.], Nb: a Nb content [mass %], Ti*: an effective Ti content represented by Ti–42/14×N, where, each of Ti and N represents a content by mass % of the element, and when the element is not included, 0 is substituted as the content of the element, $K_2$: a value obtained by Expression (7-1), n: an integer of 1 to 10, $T_n'$: an average temperature [° C.] in an n-th period when a residence time in the temperature range of 550° C. to 720° C. is divided into 10 periods, $\Delta_t$: a time [s] in one of 10 periods into which an elapsed time until a steel sheet temperature reaches 720° C. from 550° is divided, and where, $t_1 = \Delta t$.

$$y_m = \left\{ \frac{e_1}{K_2} \cdot \exp\left(-\frac{e_2}{T_m + 273}\right) \cdot \frac{A_{c3} - T_m}{A_{c3} - A_{c1}} \cdot t_m \right\}^{1/2} \cdot e_3 \cdot \left(\frac{T_m - e_4}{A_{c3} - e_4}\right)^3 \tag{10}$$

$$t_m = \Delta t + y_{m-1}^2 \cdot \left\{ \frac{e_1}{K_2} \cdot \exp\left(-\frac{e_2}{T_m + 273}\right) \cdot \frac{A_{c3} - T_m}{A_{c3} - A_{c1}} \right\}^{-1} \cdot \left\{ e_3 \cdot \left(\frac{T_m - e4}{A_{c3} - e_4}\right)^3 \right\}^{-2}$$

$$1.0 \le e_4 \cdot y_m \cdot (K_3 \cdot K_4)^{-\frac{1}{2}} \le 5.0$$

In Expression (10), $y_m$ represents an index representing a degree of progress of reverse transformation in an m-th period when a residence time in the temperature range of 720° C. to the annealing temperature is divided into 10 periods, reference numerals in Expression (10) are as follows, $e_{1 \ to \ 4}$: constants ($e_1$=4.50×10², $e_2$=2.85×10⁴, $e_3$=2.24× 10⁰, and $e_4$=8.56×10⁻⁸), $K_2$: a value on the left side of Expression (7-1), $K_3$: a value of $K_{20}$ obtained by Expression (8), $K_4$: a value of $p_{10}$ obtained by Expression (9), $Ac_1$: an austenite transformation start temperature [° C.] during heating, $Ac_3$: an austenite transformation completion temperature [° C.] during heating, $T_m$: an average temperature [° C.] in an m-th period when a residence time in the temperature range of 720° C. to the annealing temperature is divided into 10 periods, and $t_m$: an effective heat treatment time [s] in an m-th period when a residence time in the temperature range of 720° C. to the annealing temperature is divided into 10 periods $$\sum_{i=1}^{10} (g_1 + g_2 \cdot Nb^{0.5} + g_3 \cdot Ti*^{0.5}) \cdot (1 + g_4 \cdot Mo^{0.5})^{-1} \cdot K_4^{1/3} \cdot \tag{11}$$

$$\left(\frac{A_{c3} - T_{max}}{A_{c3} - A_{c1}}\right)^{1/3} \cdot (\Delta_i + g_5 \cdot \Delta_i^{0.5}) \cdot \exp\left(-\frac{g_6}{T_i + 273}\right) \cdot t'^{0.5} \ge 1.00$$

Reference numerals in Expression (11) are as follows, i: an integer of 1 to 10, $\Delta_i$: 750–18×Si–17×Mn–10×Cr–8×Ni+15×Al–$T_i$, where each of the elements represents a content by mass % of the element, and when the element is not included, 0 is substituted as the content of the element, when a calculated value of $\Delta_i$ is a negative value, $\Delta_i$ set to 0, $g_{1 \ to \ 6}$: constants ($g_1$=1.00×10⁻¹, $g_2$=1.46×10¹, $g_3$=1.14× 10¹, $g_4$=2.24×10⁰, $g_5$=4.53×10⁰, and $g_6$=4.83×10³), each of Nb, Mo, Si, Mn, Cr, Ni, and Al: a content [mass %] of the element, Ti*: an effective Ti content represented by Ti–42/14×N, where, each of Ti and N represents a content by mass % of the element, and when the element is not included, 0 is substituted as the content of the element, $K_4$: a value of $p_{10}$ obtained by Expression (9), $Ac_1$: an austenite transformation start temperature [° C.] during heating, $Ac_3$: an austenite transformation completion temperature [° C.] during heating, $T_{max}$: an annealing temperature [° C.], $T_i$: an average temperature [° C.] in an i-th period when a residence time in the temperature range of 720° C. to 500° C. is divided into 10 periods, and $\Delta t$: a time [s] in one of 10 periods into which an entire residence time in the temperature range of 720° C. to 500° C. is divided

[8] In the method of manufacturing a steel sheet according to [7], in the process of cooling in the annealing process, hot-dip galvanizing may be performed on the cold-rolled steel sheet.

[9] In the method of manufacturing a steel sheet according to [7], in the process of cooling in the annealing process, hot-dip zinc alloy plating may be performed on the cold-rolled steel sheet.

[10] In the method of manufacturing a steel sheet according to [8] or [9], in the process of cooling in the annealing process, alloying may be performed after the hot-dip galvanizing or the hot-dip zinc alloy plating.

Effects of the Invention

In the above-described aspects according to the present invention, a steel sheet having excellent formability, strength, and dimensional accuracy during press forming and a method of manufacturing the same can be provided.

EMBODIMENTS OF THE INVENTION

Hereinafter, a steel sheet according to an embodiment and manufacturing conditions thereof will be sequentially described. First, the reason for limiting a composition (chemical composition) of the steel sheet according to the embodiment will be described. A limited numerical range described below with "~" interposed therebetween includes a lower limit value and an upper limit value. A numerical value shown together with "less than" or "more than" is not included in a numerical range. All the "%" in the composition represents "mass %".

The steel sheet according to the embodiment includes, as a composition, by mass %: C: 0.035% to 0.150%; Si: 0.010% to 1.500%; Mn: 0.10% to 3.00%; Al: 0.005% to 1.000%; P: 0.100% or less; S: 0.0200% or less; N: 0.0150% or less; O: 0.0100% or less; V: 0% to 0.50%; Cr: 0% to 1.00%; Ni: 0% to 1.00%; Cu: 0% to 1.00%; Mo: 0% to 1.00%; W: 0% to 1.00%; B: 0% to 0.0100%; Sn: 0% to 1.00%; Sb: 0% to 0.20%; Nb: 0% to 0.060%; Ti: 0% to 0.100%; Ca: 0% to 0.0100%; Mg: 0% to 0.0100%; Zr: 0% to 0.0100%; REM: 0% to 0.0100%; and a remainder: Fe and impurities, in which Expressions (1-1) to (1-3) are satisfied.

$$1.5 \times Nb + Ti \geq 0.015 \tag{1-1}$$

$$0.03 \leq \{(Ti/48 - N/14) + Nb/93\}/(C/12) \leq 0.40 \tag{1-2}$$

$$Ca + Mg + Zr + REM \leq 0.0100 \tag{1-3}$$

Hereinafter, each of the elements will be described.

C: 0.035% to 0.150%

C is an element that significantly increases the strength of the steel sheet. When the C content is 0.035% or more, a sufficient tensile strength can be obtained. Therefore, the C content is set to be 0.035% or more. In order to further increase the tensile strength of the steel sheet, the C content is preferably 0.040% or more and more preferably 0.050% or more.

On the other hand, when the C content is 0.150% or less, the formation of a large amount of residual austenite after a heat treatment (annealing) can be suppressed, and a desired microstructure can be obtained. Therefore, the C content is set to be 0.150% or less. The C content is preferably 0.130% or less and more preferably 0.110% or less or 0.090% or less.

Si: 0.010% to 1.500%

Si is an element that refines an iron-based carbide and contributes to improvement of a balance between the strength and the formability of the steel sheet. In order to improve the balance between the strength and the formability of the steel sheet, the Si content is set to be 0.010% or less. The Si content is preferably 0.050% or more and, from the viewpoint of increasing the strength, is preferably 0.100% or more.

In addition, when the Si content is 1.500% or less, the formation of a coarse Si oxide that functions as a fracture origin can be suppressed, cracking is not likely to occur, and the embrittlement of the steel can be suppressed. Therefore, the Si content is set to be 1.500% or less. The Si content is preferably 1.300% or less or 1.000% or less and more preferably 0.800% or less, 0.600% or less, or 0.400% or less.

Mn: 0.10% to 3.00%

Mn is an element that improves hardenability of the steel and contributes to improvement of the strength. In order to obtain a desired strength, the Mn content is set to be 0.10% or more. The Mn content is preferably 0.50% or more. In order to obtain not only strength but also a higher dimensional accuracy after press forming, the Mn content is more preferably more than 0.60%. The Mn content is still more preferably 0.70% or more and 1.00% or more.

In addition, when the Mn content is 3.00% or less, the loss of macroscopic homogeneity in the steel sheet caused by segregation of Mn during casting can be suppressed, and the formability of the steel sheet can be ensured. Therefore, the Mn content is set to be 3.00% or less. In order to obtain more satisfactory formability, the Mn content is preferably 2.80% or less and 2.60% or less and more preferably 2.30% or less, 2.00% or less, or 1.70% or less.

Al: 0.005% to 1.000%

Al is an element which functions as a deoxidation material. When the Al content is 0.005% or more, a deoxidation effect can be sufficiently obtained. Therefore, the Al content is set to be 0.005% or more. The Al content is preferably 0.010% or more and more preferably 0.020% or more.

Al is also an element that forms a coarse oxide as a fracture origin and embrittles the steel. When the Al content is 1.000% or less, the formation of a coarse oxide as a fracture origin can be suppressed, and easy cracking of the cast piece can be suppressed. Therefore, the Al content is set to be 1.000% or less. The Al content is preferably 0.800% or less or 0.6000% or less and more preferably 0.300% or less, 0.150% or less, or 0.080% or less.

P: 0.100% or Less

P is an element that embrittles the steel and embrittles a molten portion formed by spot welding. When the P content is 0.100% or less, easy cracking of the steel sheet in the formation process caused by embrittlement can be suppressed. Therefore, the P content is set to be 0.100% or less. From the viewpoint of productivity, the P content is preferably 0.050% or less and more preferably 0.030% or less.

The lower limit of the P content as an impurity is 0%. When the P content is not likely to be less than 0.001%, and the lower limit may be 0.001%.

S: 0.0200% or Less

S is an element that forms a Mn sulfide and deteriorates formability such as ductility, hole expansibility, stretch flangeability, or bendability. When the S content is 0.0200% or less, significant deterioration in the formability of the steel sheet can be suppressed. Therefore, the S content is set to be 0.0200% or less. The S content is preferably 0.0100% or less and more preferably 0.0080% or less.

The lower limit of the S content as an impurity is 0%. When the S content is not likely to be less than 0.0001%, and the lower limit may be 0.0001%.

Nb: 0% to 0.060%,

Ti: 0% to 0.100%, and $$1.5 \times Nb + Ti \geq 0.015 \tag{1-1}$$

The chemical composition of the steel sheet according to the embodiment satisfies Nb: 0% to 0.060%, Ti: 0% to 0.100%, and Expression (1-1). Nb is an element that contributes to improvement of the strength of the steel sheet by strengthening by a precipitate, grain refinement strengthening by growth suppression of ferrite crystal grains, and dislocation strengthening by suppression of recrystallization. Ti is an element having an effect of reducing the amounts of S, N, and O causing the formation of a coarse inclusion that functions as a fracture origin. In addition, Ti has an effect of refining the structure to improve a balance between the strength and the formability of the steel sheet. In order to obtain these effects, the chemical composition of the steel sheet according to the embodiment satisfies Expression (1-1). That is, $1.5 \times Nb + Ti \geq 0.015$. Optionally, the lower limit of the right side of Expression (1-1), that is, "$1.5 \times Nb + Ti$" may be 0.020% or 0.025%.

When the Nb content is 0.060% or less, the remaining of unrecrystallized ferrite caused by promotion of recrystallization can be suppressed, and the formability of the steel sheet can be ensured. Therefore, the Nb content is set to be 0.060% or less. The Nb content is preferably 0.050% or less and more preferably 0.040% or less. When the Ti content is 0.100% or less, the formation of a coarse Ti sulfide, a coarse Ti nitride, or a coarse Ti oxide can be suppressed, and the formability of the steel sheet can be ensured. Therefore, the Ti content is set to be 0.100% or less. Therefore, the Ti content is preferably 0.075% or less and more preferably 0.060% or less. As long as Expression (1-1) is satisfied, the lower limit of the Nb content or the Ti content is 0%. Expression (1-1) may be deleted, the lower limit of the Nb content may be 0.010%, the lower limit of the Ti content may be 0.015%, and any one of the Nb content or the Ti content may be the lower limit or more. Each of Nb and Ti in Expression (1-3) represents a content by mass % of the element, and when the element is not included, 0 is substituted as the content of the element.

$$0.03 \leq \{(Ti/48 - N/14) + Nb/93\}/(C/12) \leq 0.40 \tag{1-2}$$

The chemical composition of the steel sheet according to the embodiment satisfies Expression (1-2). By satisfying Expression (1-2), the cementite content in the microstructure increases such that deterioration in the formability of the steel sheet can be suppressed.

Each of Ti, N, Nb, and C in Expression (1-2) represents a content by mass % of the element, and when the element is not included, 0 is substituted as the content of the element. When a value (Ti/48−N/14) in parentheses including Ti and N is negative, 0 is substituted as the value in the parentheses.

N: 0.0150% or Less

N is an element that forms a nitride and deteriorates formability such as ductility, hole expansibility, stretch flangeability, or bendability. When the N content is 0.0150% or less, deterioration in the formability of the steel sheet can be suppressed. Therefore, the N content is set to be 0.0150% or less. In addition, N is also an element that causes weld defects during welding and hinders productivity. Therefore, the N content is preferably 0.0120% or less and more preferably 0.0100% or less or 0.0070% or less.

The lower limit of the N content as an impurity is 0%. When the N content is not likely to be less than 0.0005%, and the lower limit may be 0.0005%.

O: 0.0100% or Less

O is an element that forms an oxide and hinders formability such as ductility, hole expansibility, stretch flangeability, or bendability. When the O content is 0.0100% or less, significant deterioration in the formability of the steel sheet can be suppressed. Therefore, the O content is set to be 0.0100% or less. The O content is preferably 0.0080% or less and more preferably 0.0050% or less or 0.0030% or less.

The lower limit of the O content as an impurity is 0%. When the O content is not likely to be less than 0.0001%, and the lower limit may be 0.0001%.

The steel sheet according to the embodiment may include elements as optional elements. When each of optional elements is not included, the lower limit of the content of the element is 0%.

V: 0% to 0.50%

V is an element that contributes to improvement of the strength of the steel sheet by strengthening by a precipitate, grain refinement strengthening by growth suppression of ferrite crystal grains, and dislocation strengthening by suppression of recrystallization. V does not need to be included. Therefore, the lower limit of the V content includes 0%. In order to sufficiently obtain the strength improvement effect by V, the V content is preferably 0.01% or more and more preferably 0.03% or more.

In addition, when the V content is 0.50% or less, deterioration in the formability of the steel sheet caused by precipitation of a large amount of carbonitrides can be suppressed. Therefore, the V content is set to be 0.50% or less.

Cr: 0% to 1.00%

Cr is an element that improves hardenability of the steel and contributes to improvement of the strength of the steel sheet, and is an element that can be replaced with a part of Mn. Cr does not need to be included. Therefore, the lower limit of the Cr content includes 0%. In order to sufficiently obtain the strength improvement effect by Cr, the Cr content is preferably 0.05% or more and more preferably 0.20% or more.

In addition, when the Cr content is 1.00% or less, the formation of a coarse Cr carbide that can function as a fracture origin can be suppressed. Therefore, the Cr content is set to be 1.00% or less.

Ni: 0% to 1.00%

Ni is an element that suppresses phase transformation at a high temperature and contributes to improvement of the strength of the steel sheet, and is an element that can be replaced with a part of Mn. Ni does not need to be included. Therefore, the lower limit of the Ni content includes 0%. In order to sufficiently obtain the strength improvement effect by Ni, the Ni content is preferably 0.05% or more and more preferably 0.20% or more.

In addition, when the Ni content is 1.00% or less, deterioration in the weldability of the steel sheet can be suppressed. Therefore, the Ni content is set to be 1.00% or less.

Cu: 0% to 1.00%

Cu is an element that is present in the steel in the form of fine grains and contributes to improvement of the strength of the steel sheet, and is an element that can be replaced with a part of C and/or Mn. Cu does not need to be included. Therefore, the lower limit of the Cu content includes 0%. In order to sufficiently obtain the strength improvement effect by Cu, the Cu content is preferably 0.05% or more and more preferably 0.15% or more.

In addition, when the Cu content is 1.00% or less, deterioration in the weldability of the steel sheet can be suppressed. Therefore, the Cu content is set to be 1.00% or less.

Mo: 0% to 1.00%

Mo is an element that suppresses phase transformation at a high temperature and contributes to improvement of the strength of the steel sheet, or is an element that can be replaced with a part of Mn. Mo does not need to be included. Therefore, the lower limit of the Mo content includes 0%. In order to sufficiently obtain the strength improvement effect by Mo, the Mo content is preferably 0.03% or more and more preferably 0.06% or more.

In addition, when the Mo content is 1.00% or less, deterioration in productivity caused by deterioration in hot workability can be suppressed. Therefore, the Mo content is set to be 1.00% or less.

W: 0% to 1.00%

W is an element that suppresses phase transformation at a high temperature and contributes to improvement of the strength of the steel sheet, or is an element that can be replaced with a part of C and/or Mn. W does not need to be included. Therefore, the lower limit of the W content includes 0%. In order to sufficiently obtain the strength improvement effect by W, the W content is preferably 0.03% or more and more preferably 0.10% or more.

In addition, when the W content is 1.00% or less, deterioration in productivity caused by deterioration in hot workability can be suppressed. Therefore, the W content is set to be 1.00% or less.

B: 0% to 0.0100%

B is an element that suppresses phase transformation at a high temperature and contributes to improvement of the strength of the steel sheet, and is an element that can be replaced with a part of Mn. B does not need to be included. Therefore, the lower limit of the B content includes 0%. In order to sufficiently obtain the strength improvement effect by B, the B content is preferably 0.0005% or more and more preferably 0.0010% or more.

In addition, when the B content is 0.0100% or less, deterioration in the strength of the steel sheet caused by the formation of a B precipitate can be suppressed. Therefore, the B content is set to be 0.0100% or less.

Sn: 0% to 1.00%

Sn is an element that suppresses the coarsening of crystal grains and contributes to improvement of the strength of the steel sheet. Sn does not need to be included. Therefore, the lower limit of the Sn content includes 0%. In order to sufficiently obtain the effect by Sn, the Sn content is more preferably 0.01% or more.

In addition, when the Sn content is 1.00% or less, fracture during rolling caused by embrittlement of the steel sheet can be suppressed. Therefore, the Sn content is set to be 1.00% or less.

Sb: 0% to 0.20%

Sb is an element that suppresses the coarsening of crystal grains and contributes to improvement of the strength of the steel sheet. Sb does not need to be included. Therefore, the lower limit of the Sb content includes 0%. In order to sufficiently obtain the effect, the Sb content is preferably 0.005% or more.

In addition, when the Sb content is 0.20% or less, fracture during rolling caused by embrittlement of the steel sheet can be suppressed. Therefore, the Sb content is set to be 0.20% or less.

The composition of the steel sheet according to the embodiment may optionally include one or two or more selected from Ca, Ce, Mg, Zr, La, and REM.

One or Two or More selected from Ca, Ce, Mg, Zr, La, and REM: 0% to 0.0100% in total Ca, Ce, Mg, Zr, La, and REM are elements that contribute to improvement of the formability of the steel sheet. The lower limit of the total content of one or two or more selected from Ca, Ce, Mg, Zr, La, and REM includes 0%. In order to sufficiently obtain the formability improvement effect, the total content is preferably 0.0001% or more and more preferably 0.0010% or more.

In addition, when the total content of one or two or more selected from Ca, Ce, Mg, Zr, La, and REM is 0.0100% or less, deterioration in the ductility of the steel sheet can be suppressed. Therefore, the total content of the elements is set to be 0.0100% or less. The total content is preferably 0.0050% or less.

REM (Rare Earth Metal) refers to an element group other than La and Ce that can be individually specified in the element group belonging to lanthanoids. In most cases, these elements are added in the form of mischmetal. However, the lanthanoid-based elements other than La and Ce may be inevitably included.

Ca: 0% to 0.0100%,
Mg: 0% to 0.0100%,
Zr: 0% to 0.0100%,
REM: 0% to 0.0100%; and $$Ca+Mg+Zr+REM \leq 0.0100 \tag{1-3}$$

Ca, Ce, Mg, Zr, La, and REM are elements that contribute to improvement of the formability of the steel sheet, and can be included. When the content of each of the elements is more than 0.0100%, the formability may deteriorate, and the content of each of the elements is set to be 0.0100% or less.

The chemical composition of the steel sheet according to the embodiment satisfies Expression (1-3). Ca, Mg, Zr, and REM do not need to be included. Therefore, the lower limit of the total content of one or two or more selected from Ca, Mg, Zr, and REM includes 0%. On the other hand, Ca, Mg, Zr, and REM are elements that contribute to improvement of the formability of the steel sheet. Therefore, the lower limit of "Ca+Mg+Zr+REM" may be 0.0001%. In order to sufficiently obtain the formability improvement effect, the lower limit of "Ca+Mg+Zr+REM" is preferably 0.0005% or more and more preferably 0.0010% or more.

In addition, by satisfying Expression (1-3), that is, "Ca+Mg+Zr+REM≤0.0100", deterioration in the ductility of the steel sheet can be suppressed. The upper limit of "Ca+Mg+Zr+REM" is preferably 0.0070% or 0.0050%.

REM (Rare Earth Metal) refers to the element group belonging to lanthanoids. In most cases, these elements are added in the form of mischmetal. However, the lanthanoid-based elements may be inevitably included. Examples of REM include Ce and La.

Each of Ca, Mg, Zr, and REM in Expression (1-3) represents a content by mass % of the element, and when the element is not included, 0 is substituted as the content of the element.

The remainder in the composition of the steel sheet according to the embodiment may include Fe and impurities. Examples of the impurities include elements that are unavoidably incorporated from steel raw materials or scrap and/or in the steelmaking process and are allowable within a range where the properties of the steel sheet according to the embodiment are not hindered. Examples of the impurities include H, Na, Cl, Co, Zn, Ga, Ge, As, Se, Y, Tc, Ru, Rh, Pd, Ag, Cd, In, Te, Cs, Ta, Re, Os, Ir, Pt, Au, Pb, Bi, and Po. The total content of the impurities may be 0.100% or less.

Next, the microstructure of the steel sheet according to the embodiment will be described.

In the steel sheet according to the embodiment, a microstructure in a ¼ width portion at a ¼ width position from a sheet width direction end portion in a sheet width direction and at a ¼ thickness position from a surface in a sheet thickness direction, a microstructure in a ½ width portion at a ½ width position from the sheet width direction end portion in the sheet width direction and at the ¼ thickness position from the surface in the sheet thickness direction, and a microstructure in a ¾ width portion at a ¾ width position from the sheet width direction end portion in the sheet width direction and at the ¼ thickness position from the surface in the sheet thickness direction include, by area %, ferrite: 80% or more, martensite: 2% or less, and residual austenite: 2% or less, and the remainder in microstructure, a proportion of unrecrystallized ferrite in the ferrite is 5% to 60%, an average grain size of carbonitrides is 6.0 nm to 30.0 nm, and Expressions (2) to (5) are satisfied.

In the embodiment, the reason for limiting the microstructures at the ¼ thickness position in the sheet thickness direction from the surface is that the microstructure at the position are representative microstructures of the steel sheet and have a strong correlation with the mechanical properties of the steel sheet. All of the proportions of structures in the microstructures are area ratios (area %).

$$\Delta_{SF}/\mu_{SF} \leq 0.10 \tag{2}$$

$$\Delta_{dF}/\mu_{dF} \leq 0.20 \tag{3}$$

$$\Delta_{SUF} \leq 20 \tag{4}$$

$$\Delta_{dC}/\mu_{dC} \leq 0.50 \tag{5}$$

$\mu_{SF}$ in Expression (2) represents an average value (average value of three area ratios) of an area ratio of ferrite in the microstructure in the ¼ width portion, an area ratio of ferrite in the microstructure in the ½ width portion, and an area ratio of ferrite in the microstructure in the ¾ width portion, and $\Delta_{SF}$ represents a difference between a maximum value and a minimum value of area ratio of ferrite in the microstructures in the ¼ width portion, the ½ width portion, and the ¾ width portion, $\mu_{dF}$ in Expression (3) represents an average value (average value of three average values) of an average grain size of ferrite in the microstructure in the ¼ width portion, an average grain size of ferrite in the microstructure in the ½ width portion, and an average grain size of ferrite in the microstructure in the ¾ width portion, and $\Delta_{dF}$ represents a difference between a maximum value and a minimum value of average grain size of ferrite in the microstructures in the ¼ width portion, the ½ width portion, and the ¾ width portion, $\Delta_{SUF}$ in Expression (4) represents a difference between a maximum value and a minimum value of area ratio of unrecrystallized ferrite in the microstructures in the ¼ width portion, the ½ width portion, and the ¾ width portion, and $\mu_{dC}$ in Expression (5) represents an average value (average value of three average values) of an average grain size of carbonitrides including Ti and/or Nb in the microstructure in the ¼ width portion, an average grain size of carbonitrides in the microstructure in the ½ width portion, and an average grain size of carbonitrides in the microstructure in the ¾ width portion, and $\Delta_{dC}$ represents a difference between a maximum value and a minimum value of average grain size of carbonitrides in the microstructures in the ¼ width portion, the ½ width portion, and the ¾ width portion.

Ferrite: 80% or More

Ferrite is a structure having excellent formability. When the area ratio of ferrite in each of the microstructures in the ¼ width portion, the ½ width portion, and the ¾ width portion is 80% or more, desired formability can be obtained. Therefore, the area ratio of ferrite is set to be 80% or more. The area ratio of ferrite is preferably 85% or more and more preferably 90% or more. It is preferable that the amount of ferrite is large. Therefore, the area ratio of ferrite may be 100%.

Proportion of Unrecrystallized Ferrite in Ferrite: 5% to 60%

The unrecrystallized ferrite is ferrite where strain introduced by cold rolling or the like remains, and has a higher strength but lower ductility than typical ferrite. When the area ratio of unrecrystallized ferrite in the ferrite of each of the microstructures in the ¼ width portion, the ½ width portion, and the ¾ width portion is 5% or more, a sufficient strength can be obtained. Therefore, the area ratio of unrecrystallized ferrite in the ferrite is 5% or more. The area ratio of unrecrystallized ferrite is preferably 10% or more. In addition, when the area ratio of unrecrystallized ferrite in the ferrite is 60% or less, formability can be ensured. Therefore, the area ratio of unrecrystallized ferrite in the ferrite is 60% or less. The area ratio of unrecrystallized ferrite is preferably 50% or less.

Martensite: 2% or Less

The martensite is a structure that increases the strength but functions as an origin where fine voids initiate during forming. When fine voids initiate during forming, desired resistance to impact and fracture cannot be obtained. In order to suppress the formation of fine voids during forming, the area ratio of martensite in each of the microstructures in the ¼ width portion, the ½ width portion, and the ¾ width portion is set to be 2% or less. The area ratio of martensite is preferably 1% or less and more preferably 0%.

Residual Austenite: 2% or Less

Residual austenite is a structure that improves a balance between the strength and the ductility of the steel sheet but functions as an origin where fine voids initiate during forming. In order to suppress the formation of fine voids during forming, the area ratio of residual austenite in each of the microstructures in the ¼ width portion, the ½ width portion, and the ¾ width portion is set to be 2% or less. The area ratio of residual austenite is preferably 1% or less and more preferably 0%.

Remainder in Microstructure

Examples of the remainder in the microstructure include pearlite, cementite, and bainite. By setting the total area ratio of the structures to be 20% or less, desired resistance to impact and fracture can be obtained. Therefore, the total area ratio of the structures in the microstructure in the ¼ width portion, the ½ width portion, and the ¾ width portion is preferably 20% or less, more preferably 15% or less, and still more preferably 10% or less. The lower limit of the area ratio of pearlite is originally 0% and optionally may be 2% or 5%, and the upper limit may be 15%, 10%, or 5%. The lower limit of the area ratio of cementite (excluding cementite present in pearlite; hereinafter, the same shall be applied) is originally 0% and optionally may be 0.5% or 1%, and the upper limit may be 3%, 2.2%, or 1%. The lower limit of the area ratio of bainite is originally 0% and optionally may be 2% or 5%, and the upper limit may be 15%, 10%, or 5%. Optionally, the area ratio of pearlite may be 0%, and the area ratio of cementite may also be 0%.

Hereinafter, a method of measuring the area ratio in the microstructure will be described.

Test pieces (three in total) having, as an observed section, a cross section parallel to a rolling direction of the steel sheet and perpendicular to a steel sheet surface are collected from the ¼ width portion, the ½ width portion, and the ¾ width portion of the steel sheet. The observed section of each of the test pieces is polished and subsequently is etched with nital. In the vicinity of the ¼ thickness position from the surface in the sheet thickness direction (here, the observation range is limited to a region of ⅛t to ⅜t (t represents the sheet thickness) from the sheet thickness surface), an area of $2.0 \times 10^9$ m$^2$ or more in total was observed using a field emission scanning electron microscope (FE-SEM) in one or more visual fields at an observation magnification of 1000 to 3000-fold, various structures are identified based on the microstructural morphology (for example, a shape of crystal grains, a subgrain boundary in the crystal grains, or a formation state of carbides), and area ratios (area %) thereof are measured. As a result, the area ratios of ferrite, unrecrystallized ferrite, martensite, MA (a region including martensite and residual austenite), pearlite, cementite, and bainite are obtained. When a plurality of visual fields are observed, each of the areas analyzed in the visual fields is $4.0 \times 10^{-10}$ m$^2$ or more.

The analysis of the area ratios is performed using a point counting method in each of the visual fields, 15 lines parallel to the rolling direction and 15 lines perpendicular to the rolling direction are drawn, and the structures are identified at 225 intersection points between the lines. Regarding the method of identifying the structures, specifically, a massive region where cementite and a subgrain boundary are not present is identified as ferrite, and a massive region where a subgrain boundary is present without including cementite is identified as unrecrystallized ferrite. In addition, martensite and MA including a large amount of solid solution carbon look white due to higher brightness than that of the other structures, and thus can be distinguished from the other structures. Using the above-described method, the sum of the area ratio of ferrite, the area ratio of unrecrystallized ferrite, and the area ratio of "martensite and MA (the region including martensite and residual austenite)" are obtained. By dividing the area ratio of unrecrystallized ferrite by the area ratio of ferrite, the proportion of unrecrystallized ferrite in ferrite is obtained. The number of visual fields used in the point counting method may be two or more.

The area ratio of residual austenite is analyzed using an X-ray diffraction method. In the vicinity of the ¼ thickness position from the surface in the sheet thickness direction (here, the observation range is limited to a region of ⅛t to ⅜t (t represents the sheet thickness)) from the sheet thickness surface of each of the test pieces (the three test pieces in total collected from the ¼ width portion, the ½ width portion, and the ¾ width portion), a surface parallel to the steel sheet surface is mirror-finished, and the volume percentage of FCC steel is analyzed using the X-ray diffraction method. The obtained volume percentage is considered as the area ratio of residual austenite. In addition, by subtracting the obtained area ratio of residual austenite from the total area ratio of "martensite and MA" obtained by the observation with the FE-SEM, the area ratio of martensite is obtained.

In addition, by subtracting the area ratio of ferrite, the area ratio of martensite, and the area ratio of residual austenite from 100%, the area ratio of the remainder in microstructure is obtained.

The above-described measurement is performed at the ¼ width position, the ½ width position, and the ¾ width position from an rolling direction end portion in the sheet width direction.

Average Grain Size of Carbonitride: 6.0 nm to 30.0 nm

The average grain size of carbonitrides in the ¼ width portion, the ½ width portion, and the ¾ width portion is 6.0 nm to 30.0 nm. By setting the average grain size of carbonitrides to be 6.0 nm or more, an excessive action of precipitation hardening can be suppressed, and formability can be ensured. The average grain size of carbonitrides is preferably 8.0 nm or more and more preferably 10.0 μm or more. On the other hand, when the average grain size of carbonitrides is 30.0 nm or less, a sufficient strength can be obtained. The average grain size of carbonitrides is preferably 25.0 nm or less or 20.0 nm or less and more preferably 17.0 nm or less, 15.0 nm or less, 12.5 nm or less, or 11.0 nm or less.

The average grain size of carbonitrides is measured using method.

As in the case where the area ratios of the microstructures are obtained, test pieces (three test pieces in total collected from the ¼ width portion, the ½ width portion, and the ¾ width portion) are collected from the vicinity of the ¼ thickness position from the surface in the sheet thickness direction (where the sheet thickness range where the test piece is collected are limited to a region of ⅛t to ⅜t (t represents the sheet thickness) from the sheet thickness surface of the test piece). An acicular test piece is formed from the collected test piece by cutting and electrolytic polishing and optionally using a focused ion beam processing method in addition to electrolytic polishing, and three-dimensional atom probe measurement is performed. By obtaining the major axis lengths of any 30 or more Ti and/or Nb carbonitride grains in the obtained three-dimensional atom map and calculating the average value thereof, the average grain size of carbonitrides including Ti and/or Nb is obtained for each of the three test pieces from the ¼ width portion, the ½ width portion, and the ¾ width portion.

The steel sheet according to the embodiment satisfies $$\Delta_{SF}/\mu_{SF} \leq 0.10 \tag{2}$$

$$\Delta_{dF}/\mu_{dF} \leq 0.20 \tag{3}$$

$$\Delta_{SUF} \leq 20 \tag{4}$$

$$\Delta_{dC}/\mu_{dC} \leq 0.50 \tag{5}.$$

Expressions (2) to (5) being satisfied represents that fluctuations in the area ratio of ferrite, the average grain size of ferrite, the area ratio of unrecrystallized ferrite, and the average grain size of carbonitrides including Ti and/or Nb in the sheet width direction of the steel sheet are suppressed. By satisfying Expressions (2) to (5), property fluctuation in the sheet width direction of the steel sheet can be suppressed, property fluctuation increasing a dispersion in dimensional accuracy during press forming. As a result, a steel sheet having excellent formability, strength, and dimensional accuracy during press forming can be obtained.

$\Delta_{SF}$ in Expression (2) is obtained by measuring the area ratios of ferrite in the ¼ width portion, the ½ width portion, and the ¾ width portion using the above-described method and calculating the average value of the area ratios. In addition, $\Delta_{SF}$ in Expression (2) is obtained by measuring the area ratios of ferrite in the microstructures in the ¼ width portion, the ½ width portion, and the ¾ width portion using the above-described method and calculating a difference between a maximum value and a minimum value among the obtained area ratios of ferrite.

$\Delta_{SUF}$ in Expression (4) represents a difference between a maximum value and a minimum value of area ratio of unrecrystallized ferrite in the microstructures in the ¼ width portion, the ½ width portion, and the ¾ width portion. In addition, $\Delta_{SUF}$ in Expression (4) is obtained by measuring the area ratios of unrecrystallized ferrite in the microstructures in the ¼ width portion, the ½ width portion, and the ¾ width portion using the above-described method and calculating a difference between a maximum value and a minimum value among the obtained area ratios of unrecrystallized ferrite.

$\mu_{dF}$ in Expression (3) can be obtained by measuring the average grain sizes of ferrite in the microstructures in the ¼ width portion, the ½ width portion, and the ¾ width portion using a method described below and calculating the average value of the average grain sizes. In addition, $\Delta_{dF}$ in Expression (3) is obtained by measuring the average grain sizes of ferrite in the microstructures in the ¼ width portion, the ½ width portion, and the ¾ width portion using a method described below and calculating a difference between a maximum value and a minimum value among the obtained average grain sizes of ferrite.

$\mu_{dC}$ in Expression (5) is obtained by measuring the average major axis lengths (average grain sizes) of carbonitrides in the microstructures in the ¼ width portion, the ½ width portion, and the ¾ width portion using a method described below and calculating the average values of the average grain sizes. In addition, $\Delta_{dC}$ in Expression (5) is obtained by measuring the average grain sizes of carbonitrides in the microstructures in the ¼ width portion, the ½ width portion, and the ¾ width portion using the above-described method and calculating a difference between a maximum value and a minimum value among the obtained average grain sizes of carbonitrides.

The average grain size of ferrite is measured using method.

The average grain size of ferrite is obtained using a linear analysis method. In the visual fields where the area ratios of the microstructures are measured, one or more straight lines having a size of 200 μm or more in total in the rolling direction are drawn, 1 is added to the number of intersection points between the straight line and a ferrite grain boundary, and the obtained value is divided by the length of the straight line. As a result, the average grain size of ferrite is obtained.

Average Grain Size of Ferrite: 5.0 μm to 15.0 μm

The average grain size of ferrite in the microstructure in the ¼ width portion, the microstructure in the ½ width portion, and the microstructure in the ¾ width portion is preferably 5.0 μm to 15.0 μm. By setting the average grain size of ferrite to be 5.0 μm to 15.0 μm, a balance between the strength and the formability can be further improved. In order to improve the strength, the upper limit of the average grain size of ferrite may be 13.0 μm, 11.0 μm, or 9.5 μm.

The average grain size of ferrite is measured using the above-described method.

The steel sheet according to the embodiment may be a steel sheet including a galvanized layer or a zinc alloy plated layer on a single surface or both surfaces of the steel sheet. In addition, the steel sheet according to the embodiment may be a steel sheet including a galvannealed layer or an alloy galvannealed layer obtained by alloying a galvanized layer or a zinc alloy plated layer.

The plated layer formed on a single surface or both surfaces of the steel sheet according to the embodiment is preferably a galvanized layer or a zinc alloy plated layer including zinc as a main component. It is preferable that the zinc alloy plated layer includes Ni as an alloy component.

The galvanized layer and the zinc alloy plated layer are formed using a hot-dip plating method, an electroplating method, or a deposition plating method. When the Al content in the galvanized layer is 0.5 mass % or less, adhesion between the steel sheet surface and the galvanized layer can be ensured. Therefore, the Al content in the galvanized layer is preferably 0.5 mass % or less. When the galvanized layer is a hot-dip galvanized layer, in order to improve adhesion between the steel sheet surface and the galvanized layer, the Fe content in the hot-dip galvanized layer is preferably 3.0 mass % or less.

When the galvanized layer is an electrogalvanized layer, the Fe content in the plated layer is preferably 0.5 mass % or less from the viewpoint of improving corrosion resistance.

The galvanized layer and the zinc alloy plated layer may include one or two or more selected from the group consisting of Al, Ag, B, Be, Bi, Ca, Cd, Co, Cr, Cs, Cu, Ge, Hf, Zr, I, K, La, Li, Mg, Mn, Mo, Na, Nb, Ni, Pb, Rb, Sb, Si, Sn, Sr, Ta, Ti, V, W, Zr, and REM within a range where the corrosion resistance or formability of the steel sheet does not deteriorates. In particular, Ni, Al, and Mg are effective for improving corrosion resistance.

The galvanized layer or the zinc alloy plated layer on the surface of the steel sheet according to the embodiment may be a galvannealed layer or an alloy galvannealed layer obtained by alloying a galvanized layer or a zinc alloy plated layer. When the hot-dip galvanized layer or the hot-dip zinc alloy plated layer is alloyed, from the viewpoint of improving adhesion between the steel sheet surface and the alloy plated layer, the Fe content in the alloyed hot-dip galvanized layer (galvannealed layer) or the alloyed hot-dip zinc alloy plated layer (alloy galvannealed layer) is preferably 7.0 mass % to 13.0 mass %. By alloying the steel sheet including the hot-dip galvanized layer or the hot-dip zinc alloy plated layer, Fe is incorporated into the plated layer such that the Fe content increases. As a result, the Fe content can be made to be 7.0 mass % or more. That is, the galvanized layer having a Fe content of 7.0 mass % or more is a galvannealed layer or an alloy galvannealed layer.

The Fe content in the alloyed hot-dip galvanized layer (galvannealed layer) or the alloyed hot-dip zinc alloy plated layer (alloy galvannealed layer) can be obtained using method. Only the plated layer is removed by dissolving with a 5% HCl aqueous solution to which an inhibitor is added. By measuring the Fe content in the obtained solution by inductively coupled plasma-atomic emission spectrometry (ICP-AES), the Fe content (mass %) in the galvanized layer is obtained.

The sheet thickness of the steel sheet according to the embodiment is not limited to a specific range but, in consideration of versatility or manufacturability is preferably 0.2 mm to 5.0 mm. By setting the sheet thickness to be 0.2 mm or more, the shape of the steel sheet can be easily maintained to be flat, and the dimensional accuracy and the shape accuracy can be improved. Therefore, the sheet thickness is preferably 0.2 mm or more. The sheet thickness is more preferably 0.4 mm or more.

On the other hand, when the sheet thickness is 5.0 mm or less, appropriate strain application and temperature control can be easily performed in the process of manufacturing, a homogeneous structure can be obtained. Therefore, the sheet thickness is preferably 5.0 mm or less. The sheet thickness is more preferably 4.5 mm or less or 3.2 mm or less.

0.2% Proof Stress: 280 MPa to 600 MPa, Tensile Strength: 450 MPa to 800 MPa, Yield Ratio: 0.50 to 0.90, Uniform Elongation: 10.0% or More Regarding target values of tensile properties of the steel sheet according to the embodiment, a 0.2% proof stress is 280 MPa to 600 MPa, a tensile strength is 450 MPa to 600 MPa, and a yield ratio that is 0.2% proof stress/tensile strength is 0.50 to 0.90, and an uniform elongation that is a plastic elongation at a maximum load is 10.0% or more. As a result, the formability and the strength of the steel sheet can be improved.

The 0.2% proof stress, the tensile strength, the yield ratio, and the uniform elongation are measured using method.

The 0.2% proof stress, the tensile strength, the yield ratio, and the uniform elongation are obtained by performing a tensile test. A 13B test piece is prepared according to JIS Z 2241:2011, and the rolling direction of the steel sheet is set as a tension axis to perform the tensile test. The rolling direction of the steel sheet is set as the tension axis, and tensile test pieces are collected from a ¼ width position from a sheet width direction end portion in the sheet width direction, a ½ width position from the sheet width direction end portion in the sheet width direction, and a ¾ width position from the sheet width direction end portion in the sheet width direction. By calculating the average values of the 0.2% proof stress, the tensile strength, and the uniform elongation obtained from the three tensile test pieces, the 0.2% proof stress, the tensile strength, and the uniform elongation are obtained. By dividing the 0.2% proof stress by the tensile strength, the yield ratio is obtained.

Next, a method of manufacturing the steel sheet according to the embodiment will be described.

As long as the steel sheet according to the embodiment has the above-described characteristics, the effects thereof can be obtained irrespective of the manufacturing method thereof. A manufacturing method including processes is preferable because the steel sheet according to the embodiment can be stably obtained.

(I) a hot rolling process of heating a steel piece having a predetermined composition to 1150° C. to 1320° C., completing hot rolling such that a hot rolling completion temperature is 850° C. to 930° C., starting cooling after 1.5 s or longer, cooling the steel piece to a temperature range of lower than 450° C. to obtain a hot-rolled steel sheet such that an average cooling rate in a temperature range of 800° C. to 450° C. is 20° C./s or higher;

(II) a reheating process of heating the hot-rolled steel sheet to a temperature range of 450° C. to 700° C.;

(III) a cooling process of cooling the hot-rolled steel sheet to room temperature;

(IV) a cold rolling process of cold-rolling the hot-rolled steel sheet to obtain a cold-rolled steel sheet such that a total rolling reduction is 30% to 80% and a cold rolling completion temperature is 120° C. or higher; and (V) an annealing process of heating the cold-rolled steel sheet to an annealing temperature of 720° C. to 850° C. and cooling the cold-rolled steel sheet to a temperature range of 500° C. or lower.

Hereinafter, preferable conditions in each of the processes will be described.

<Hot Rolling Process>

First, the steel piece having the composition of the above-described steel sheet according to the embodiment is heated to 1150° C. to 1320° C. When the heating temperature is 1150° C. or higher, a coarse Ti and/or Nb carbide formed during casting can be sufficiently dissolved, and a dispersion in the state of the carbonitride can be suppressed. In addition, when the heating temperature of the steel piece is 1320° C. or lower, the formation of an excess amount of coarse primary austenite grains can be suppressed, and the recrystallization behavior in the hot rolling process can be made to be homogeneous. From the viewpoint of manufacturing costs, it is preferable that the steel piece to be heated is produced by continuous casting. However, the steel piece may be produced using another casting method (for example, an ingot-making method).

After heating the steel piece, hot rolling is performed such that a hot rolling completion temperature is 850° C. to 930° C. When the hot rolling completion temperature is 850° C. or higher, rolling is performed in a single phase range. Therefore, anisotropy of the metallographic structure can be suppressed. Therefore, the hot rolling completion temperature is set to be 850° C. or higher. In addition, when the hot rolling completion temperature is 930° C. or lower, excessive growth of recrystallized grains can be suppressed, and the grain size of the primary phase can be made to be uniform. Therefore, the hot rolling completion temperature is set to be 930° C. or lower.

In the hot rolling process, Expression (6) needs to be satisfied in a temperature range of 1000° C. or lower. By controlling a pass schedule such that Expression (6) is satisfied in a temperature range of 1000° C. or lower, recrystallization progresses uniformly, and carbides precipitates finely and homogeneously in the steel. As a result, the segregation of carbides can be suppressed, and property fluctuation in the sheet width direction of the steel sheet can be suppressed.

$$g_n = \left(0.5 + \frac{h*}{h}\right) \cdot \left(1 + a_1 \sqrt{Nb} + a_2 \sqrt{Ti}\right) \tag{6}$$

$$K_n = (T_n + 273) \cdot \left(a_3 + a_4 \sqrt{Nb} + a_5 \sqrt{Ti}\right)$$

$$R_n = (T_n + 273) \cdot \left(a_6 + a_7 \sqrt{Nb} + a_8 \sqrt{Ti}\right)$$

$$J_n = \left(\frac{h*}{h}\right)^{1.5} \cdot \left(a_9 + a_{10} \sqrt{Nb} + a_{11} \sqrt{Ti}\right)$$

$$f_n = [f_{n-1} \cdot \exp(-K_n \cdot t_n) + g_n \cdot \{1 - \exp(-K_n \cdot t_n)\}] \cdot \exp(-R_n \cdot t_n) + J_n \leq 1.00$$

In Expression (6), $f_n$ represents an index representing a degree of progress of precipitation of a fine carbide in the temperature range of 1000° C. or lower of the hot rolling process. Reference numerals in Expression (6) are as follows.

n: the number of rolling passes at 1000° C. or lower h: a sheet thickness [mm] before an n-th pass rolling h*: a sheet thickness [mm] after the n-th pass rolling Nb and Ti: contents [mass %] of Nb and Ti $T_n$: an average steel sheet temperature [° C.] from the n-th pass rolling to an n+1-th pass rolling $t_n$: a shorter time among a time [s] from the n-th pass rolling to the n+1-th pass rolling and a time [s] taken until the steel sheet temperature decreases to 800° C. from the n-th pass rolling $a_1$ to $_{11}$: constants ($a_1$=2.28×100, $a_2$=1.25×100, $a_3$=7.86× $10^{-4}$, $a_4$=1.36×$10^{-3}$, $a_5$=6.76×$10^{-4}$, $a_6$=7.86×$10^{-4}$, $a_7$=2.13×$10^{-3}$, $a_8$=1.14×$10^{-3}$, $a_9$=6.70×$10^{-2}$, $a_{10}$=1.11× $10^0$, and $a_{11}$=5.27×$10^{-1}$)

where, $f_n$ can be obtained by setting $f_0$ to 0 and calculating $f_1$ to $f_n$ in order.

The average steel sheet temperature in the present application refers to, for example, during the manufacturing of a steel strip having a width of about 600 mm to about 2500 mm, a temperature in the width direction of the steel strip managed such that a temperature distribution in the width direction is within ±15° C. relative to the average temperature, and refers to the average value of temperatures at the ¼ width position from the sheet width direction end portion in the sheet width direction, the ½ width position from the sheet width direction end portion in the sheet width direction, and the ¾ width position from the sheet width direction end portion in the sheet width direction. When the temperature management range exceeds ±15° C. described above, a temperature management range using a so-called ordinary method, there may be a small difference between the structures, which causes deterioration in the dimensional accuracy of a press-formed article. In other words, in the manufacturing method according to the embodiment of the present invention, a structure dispersion in the width direction can be reduced simply by managing the temperature distribution in the width direction to be within ±15° C. relative to the average temperature. As a result, a steel sheet or a steel strip having a small dimensional dispersion during press forming can be obtained.

The steel piece starts to be cooled after 1.5 s or longer from completion of hot rolling, and is cooled in a temperature range of lower than 450° C. such that an average cooling rate in a temperature range of 800° C. to 450° C. is 20° C./s or higher. As a result, a hot-rolled steel sheet is obtained.

By ensuring the time from the completion of hot rolling to the start of cooling to be 1.5 s or longer, recrystallization occurs, and a homogeneous structure is obtained.

By setting the average cooling rate in the temperature range of 800° C. to 450° C. to be 20° C./s or faster, stabilization of cementite is suppressed, and the coarsening of cementite is suppressed. When the average cooling rate in the temperature range is 20° C./s or faster, the stabilization of cementite can be suppressed, and a desired microstructure in the finally obtained steel sheet can be obtained.

The upper limit of the average cooling rate is not particularly limited. Since a special cooling medium is required to obtain a cooling rate exceeding 200° C./s, the average cooling rate is preferably 200° C./s or slower from the viewpoint of production costs.

In the embodiment, the average cooling rate refers to a value obtained by dividing a temperature difference between a starting point and an end point in a range to be set by an elapsed time from the starting point and the end point.

<Reheating Process>

In the reheating process, the obtained hot-rolled steel sheet is heated to a temperature range of 450° C. to 700° C. In addition, in the reheating process, a temperature history in the temperature range of 450° C. to 700° C. need to satisfy Expression (7-1) and Expression (8). By satisfying Expression (7-1) carbonitrides precipitates in the steel. In addition, by satisfying Expression (8), cementite can be prevented from being excessively stabilized. As a result, a desired microstructure can be finally obtained.

When the maximum reheating temperature (maximum temperature of the heating temperature in the reheating process) is 450° C. or higher, carbonitrides can be made to precipitate sufficiently in the steel, and a desired microstructure can be finally obtained. In addition, when the maximum reheating temperature is 700° C. or lower, the start of dissolution of a part of carbonitrides or cementite can be suppressed, and the homogeneity of the steel sheet can be ensured.

$$b_1 \cdot \left\{ 1.00 - \exp\left( -\frac{b_2 + b_3 \cdot \sqrt{Nb} + b_4 \cdot \sqrt{Ti* - T_{max}}}{b_5 + b_6 \cdot \sqrt{Nb} + b_7 \cdot \sqrt{Ti*}} \right) \right\} \cdot \sqrt{D_{20} \cdot t_{20}} \geq 1.00 \tag{7-1}$$

Reference numerals in Expression (7-1) are as follows.

$b_{1 \; to \; 7}$: constants ($b_1$=6.82×10$^6$, $b_2$=1.00×10$^3$, $b_3$=8.70× 10$^1$, $b_4$=1.25×10$^2$, $b_5$=1.00×10$^2$, $b_6$=−1.50×10$^1$, and $b_7$=−2.50×10$^1$)

Nb: a Nb content [mass %],

Ti*: an effective Ti content represented by Ti−42/14×N,
where, each of Ti and N represents a content by mass % of the element, and when the element is not included, 0 is substituted as the content of the element $T_{max}$: a highest heating temperature [° C.]

$t_{20}$: an effective heat treatment time [s] in a 20th period when a residence time in the temperature range of 450° C. to 700° C. is divided into 20 periods $D_{20}$: an index representing an effective diffusion rate in a 20th period when a residence time in the temperature range of 450° C. to 700° C. is divided into 20 periods
where, an m-th effective heat treatment time $t_m$ and an index $D_m$ representing an m-th effective diffusion rate are represented by Expression (7-2)

$$D_m = \frac{Ti*}{42} \cdot \left( \frac{Ti*}{42} + \frac{Nb}{92} \right)^{-1} \cdot b_8 \cdot \exp\left( -\frac{b_9}{T_m} \right) + \tag{7-2}$$

-continued $$\frac{Nb}{92} \cdot \left( \frac{Ti*}{42} + \frac{Nb}{92} \right)^{-1} \cdot b_{10} \cdot \exp\left( -\frac{b_{11}}{T_m} \right)$$

$$t_m = t' + \frac{D_{m-1}}{D_m} \cdot t_{m-1}$$

Reference numerals in Expression (7-2) are as follows
m: an integer of 1 to 20
$b_{9 \; to \; 11}$: constants ($b_8$=6.81×10$^1$, $b_9$=2.61×10$^5$, $b_{10}$=5.60× 10$^0$, and $b_{11}$=2.86×10$^5$)
Nb: a Nb content [mass %]
Ti*: an effective Ti content represented by Ti−42/14×N
where, each of Ti and N represents a content by mass % of the element, and when the element is not included, 0 is substituted as the content of the element
$T_m$: an average steel sheet temperature [° C.] in an m-th period when a residence time in the temperature range of 450° C. to 700° C. is divided into 20 periods
$t_m$: an effective heat treatment time [s] in an m-th period when a residence time in the temperature range of 450° C. to 700° C. is divided into 20 periods
where, $t_1$=t'.
t': ½0 [s] of an entire residence time in the temperature range of 450° C. to 700° C.

$$K_j = \tag{8}$$

$$T_j \cdot \left( \log 10(s_j) + 20/(1 + 0.15 \times Si - 0.08 \times Mn - 0.05 \times Cr - 0.13 \times Mo) \right)$$

$$s_j = t' + 10^{\frac{T_{j-1}}{T_j} \cdot \log 10 s_{j-1} + \frac{20}{T_j} \cdot \frac{T_j + T_{j-1}}{1 + 0.15 Si - 0.08 Mn - 0.05 Cr - 0.13 Mo}}$$

$$K_{20} \leqq 2.00 \times 10^4$$

In Expression (8), $K_{20}$ represents an index representing a degree of stabilization of cementite in a 20th period when a temperature history in the temperature range of 450° C. to 700° C. of the reheating process is divided into 20 periods with respect to time.
reference numerals in Expression (8) are as follows,
j: an integer of 1 to 20
each of Si, Mn, Cr, and Mo: a content [mass %] of the element
$T_j$: an average steel sheet temperature [° C.] in a j-th period when a residence time in the temperature range of 450° C. to 700° C. is divided into 20 periods
$s_j$: an effective heat treatment time [s] in a j-th period when a residence time in the temperature range of 450° C. to 700° C. is divided into 20 periods
where, $s_1$=t'
t': ½0 [s] of an entire residence time in the temperature range of 450° C. to 700° C.
where, $t_1$=Δt
$K_{20}$ represents an index representing the degree of stabilization of cementite, and as the value of $K_{20}$ increases, cementite is further stabilized. By satisfying Expression (8), the formation of excessively stable cementite in the reheating process can be suppressed. As a result, the formation of austenite having a high carbon concentration can be suppressed. Therefore, in the process of cooling after heating, the formation of martensite can be suppressed. As a result, the homogeneity of the steel sheet can be ensured. It is preferable that $K_{20}$≤18500. As a result, the formation of martensite in the process of cooling after heating can be further suppressed.

<Cooling Process>

After the reheating process, the hot-rolled steel sheet is cooled to room temperature. At this time, the cooling rate is not particularly limited, and examples of a cooling method include air cooling.

<Cold Rolling Process>

Next, the cooled hot-rolled steel sheet is cold-rolled to obtain a cold-rolled steel sheet such that a total rolling reduction is 30% to 80% and a cold rolling completion temperature is 120° C. or higher. As a result, a cold-rolled steel sheet is obtained. When the total rolling reduction is 30% or more, recrystallization in the subsequent heat treatment can be made to progress sufficiently, the remaining of unrecrystallized ferrite can be suppressed, and a desired microstructure can be finally obtained. Therefore, the total rolling reduction during cold rolling is set to be 30% or more. From the viewpoint of refining the structures to improve a balance between the strength and the formability, the total rolling reduction is preferably 45% or more and more preferably 60% or more. In addition, when the total rolling reduction in cold rolling is 80% or less, an increase in the anisotropy of the steel sheet can be suppressed, and the formability can be ensured. Therefore, the total rolling reduction during cold rolling is set to be 80% or less. In order to further improve the formability, the total rolling reduction is preferably 75% or less.

When the cold rolling completion temperature is 120° C. or higher, the remaining of unrecrystallized ferrite can be suppressed, and a desired microstructure can be finally obtained. Therefore, the cold rolling completion temperature is set to be 120° C. or higher. The cold rolling completion temperature is preferably 150° C. or higher and more preferably 170° C. or higher. From the viewpoint of formability, in order to make recrystallization to efficiently progress, the cold rolling completion temperature is preferably 250° C. or lower.

<Annealing Process>

[Process of Heating]

Next, a heat treatment (annealing) is performed on the steel sheet after cold rolling (cold-rolled steel sheet). First, the cold-rolled steel sheet is heated to an annealing temperature of 720° to 850° C. During the heating, in a temperature range of 550° C. to 720° C., Expression (9) needs to be satisfied, and in a temperature range of 720° C. to the annealing temperature (720° C. to 850° C.), a tension of 15 MPa or higher needs to be applied and a temperature history needs to satisfy Expression (10).

By controlling the temperature history to satisfy Expression (9) in the temperature range of 550° C. to 720° C., recrystallization is promoted. As a result, a desired microstructure can be finally obtained.

By applying a tension of 15 MPa or higher in the temperature range of 720° C. to the annealing temperature, the nucleation of austenite is promoted, and a homogeneous reverse transformed structure is formed. In order to sufficiently promote the nucleation of austenite to homogenize the structure, the tension is preferably 20 MPa or higher and more preferably 25 MPa or higher. When the tension is lower than 15 MPa, the behavior of reverse transformation disperses such that the homogeneity of the structure deteriorates.

Further, by controlling the temperature history to satisfy Expression (10) in the temperature range of 720° C. to the annealing temperature, cementite is dissolved. Regarding the temperature history, when $e_4 \cdot y_m \cdot (K_3 \cdot K_4)^{-2/1}$ obtained by Expression (10) is 0.10 or more, the dissolution of cementite can be sufficiently promoted, and the remaining of coarse cementite can be suppressed. When coarse cementite remains, the solid solution carbon content in austenite adjacent to the coarse cementite increases, it is difficult to make phase transformation to progress in the process of cooling after heating, and martensite is not likely to be formed. In addition, regarding the temperature history, when $e_4 \cdot y_m \cdot (K_3 \cdot K_4)^{-2/1}$ obtained by Expression (10) is 1.00 or less, the nucleation and the growth of austenite transformation progress with a good balance, the degree of progress is homogeneous, and the homogeneity of the steel sheet can be ensured.

$$E = d_1 \cdot \left(1 - \frac{h*}{h}\right)^{1.5} \cdot T_R^{-1} \cdot \left(1 + d_2 \cdot Nb^{0.5} + d_3 \cdot Ti*^{0.5}\right)^{-1} \cdot K_2^{0.5} \tag{9}$$

$$q_n = d_3 \cdot E \cdot \exp\left(-\frac{d_4}{T_n' + 273}\right)$$

$$t_n = \Delta t - \frac{\ln(1 - p_{n-1})}{q_n}$$

$$p_n = 1 - \exp(-q_n \cdot t_n)$$

$$0.10 \le p_{10} \le 1.00$$

In Expression (9), $p_{10}$ represents an index representing a degree of progress of recrystallization in a 10th period when a residence time in the temperature range of 550° C. to 720° C. in the process of heating in the annealing process is divided into 10 periods. Reference numerals in Expression (9) are as follows.

$d_{1\ to\ 4}$: constants ($d_1 = 4.24 \times 10^2$, $d_2 = 2.10 \times 10^0$, $d_3 = 1.31 \times 10^3$, and $d_4 = 7.63 \times 10^3$)

h: a sheet thickness [mm] before cold rolling h*: a sheet thickness [mm] after cold rolling $T_R$: a cold rolling completion temperature [° C.]

Nb: a Nb content [mass %]

Ti*: an effective Ti content represented by Ti−42/14×N where, each of Ti and N represents a content by mass % of the element, and when the element is not included, 0 is substituted as the content of the element $K_2$: a value obtained by Expression (7-1)

n: an integer of 1 to 10

$T_n'$: an average temperature [° C.] in an n-th period when a residence time in the temperature range of 550° C. to 720° C. is divided into 10 periods $\Delta_t$: a time [s] in one of 10 periods into which an elapsed time until a steel sheet temperature reaches 720° C. from 550° is divided where, $t_1 = \Delta t$ $$y_m = \left\{\frac{e_1}{K_2} \cdot \exp\left(-\frac{e_2}{T_m + 273}\right) \cdot \frac{A_{c3} - T_m}{A_{c3} - A_{c1}} \cdot t_m\right\}^{1/2} \cdot e_3 \cdot \left(\frac{T_m - e_4}{A_{c3} - e_4}\right)^3 \tag{10}$$

$$t_m = \Delta t + y_{m-1}^2 \cdot \left\{\frac{e_1}{K_2} \cdot \exp\left(-\frac{e_2}{T_m + 273}\right) \cdot \frac{A_{c3} - T_m}{A_{c3} - A_{c1}}\right\}^{-1} \cdot \left\{e_3 \cdot \left(\frac{T_m - e_4}{A_{c3} - e_4}\right)^3\right\}^{-2}$$

$$1.0 \le e_4 \cdot y_m \cdot (K_3 \cdot K_4)^{-\frac{1}{2}} \le 5.0$$

In Expression (10), $y_m$ represents an index representing a degree of progress of reverse transformation in an m-th period when a residence time in the temperature range of 720° C. to the annealing temperature is divided into 10 periods. Reference numerals in Expression (10) are as follows.

$e_{1 \ to \ 4}$: constants ($e_1$=4.50×10$^2$, $e_2$=2.85×10$^4$, $e_3$=2.24× 10$^0$, and $e_4$=8.56×10$^{-8}$)

$K_2$: a value on the left side of Expression (7-1)

$K_3$: a value of $K_{20}$ obtained by Expression (8)

$K_4$: a value of $p_{10}$ obtained by Expression (9)

$Ac_1$: an austenite transformation start temperature [° C.] during heating $Ac_3$: an austenite transformation completion temperature [° C.] during heating $T_m$: an average temperature [° C.] in an m-th period when a residence time in the temperature range of 720° C. to the annealing temperature is divided into 10 periods $t_m$: an effective heat treatment time [s] in an m-th period when a residence time in the temperature range of 720° C. to the annealing temperature is divided into 10 periods The annealing temperature in the annealing process is set to be 720° C. or higher. When the annealing temperature is 720° C. or higher, the dissolution and remaining of coarse cementite and the excessive progress of recrystallization can be suppressed, and a desired microstructure can be obtained. The annealing temperature is preferably 750° C. or higher and more preferably 780° C. or higher. In addition, when the annealing temperature is 850° C. or lower, the excessive progress of reverse transformation can be suppressed, and a desired amount of unrecrystallized ferrite can be made to remain. Accordingly, the annealing temperature is set to be 850° C. or lower. In order to increase the area ratio of ferrite to further improve formability, the annealing temperature is preferably 830° C. or lower and more preferably 810° C. or lower.

[Process of Retention]

The retention time at the annealing temperature, that is, the time required until the annealing temperature reaches 720° C. again from the range of 720° C. or higher through the range of 720° C. to 850° C. in the process of heating is preferably 3 s or longer. When the retention time is 3 s or longer, a change in microstructure is stabilized, and the homogeneity can be ensured. The retention time is preferably 10 s or longer and more preferably 25 s or longer. The upper limit of the retention time is not particularly limited, but even when the retention time exceeds 200 s, there is no influence on the properties of the steel sheet. Therefore, the upper limit of the retention time is preferably 200 s or shorter from the viewpoint of production costs.

[Process of Cooling]

After being heated to the annealing temperature and held at the temperature for the retention time, the steel sheet is cooled.

In the process of cooling the steel sheet to a temperature range of 500° C. or lower, a temperature history in a temperature range of 720° C. to 500° C. needs to satisfy Expression (11). By performing cooling such that the temperature history in the temperature range of 720° C. to 500° C. satisfying Expression (11), the formation of a hard phase (martensite) and residual austenite is suppressed. As a result, a desired microstructure can be finally obtained.

$$\sum_{i=1}^{10} \left( g_1 + g_2 \cdot Nb^{0.5} + g_3 \cdot Ti*^{0.5} \right) \cdot \left( 1 + g_4 \cdot Mo^{0.5} \right)^{-1} \cdot K_4^{1/3} \cdot$$

$$\left( \frac{A_{c3} - T_{max}}{A_{c3} - A_{c1}} \right)^{1/3} \cdot \left( \Delta_i + g_5 \cdot \Delta_i^{0.5} \right) \cdot \exp\left( -\frac{g_6}{T_i + 273} \right) \cdot t'^{0.5} \geq 1.00 \quad (11)$$

Reference numerals in Expression (11) are as follows.

i: an integer of 1 to 10

$\Delta_i$:750−18×Si−17×Mn−10×Cr−8×Ni+15×Al−$T_i$ where each of the elements represents a content by mass % of the element, and when the element is not included, 0 is substituted as the content of the element.

In addition, when a calculated value of $\Delta_i$ is a negative value, $\Delta_i$ set to 0.

$g_{1 \ to \ 6}$: constants ($g_1$=1.00×10$^{-1}$, $g_2$=1.46×10$^{-1}$, $g_3$=1.14× 10$^{-1}$, $g_4$=2.24×10$^0$, $g_5$=4.53×10$^0$, and $g_6$=4.83×10$^3$)

each of Nb, Mo, Si, Mn, Cr, Ni, and Al: a content [mass %] of the element

Ti*: an effective Ti content represented by Ti−42/14×N where, each of Ti and N represents a content by mass % of the element, and when the element is not included, 0 is substituted as the content of the element $K_4$: a value of $p_{10}$ obtained by Expression (9)

$Ac_1$: an austenite transformation start temperature [° C.] during heating $Ac_3$: an austenite transformation completion temperature [° C.] during heating $T_{max}$: an annealing temperature [° C.]

$T_i$: an average temperature [° C.] in an i-th period when a residence time in the temperature range of 720° C. to 500° C. is divided into 10 periods $\Delta t$: a time [s] in one of 10 periods into which an entire residence time in the temperature range of 720° C. to 500° C. is divided After the annealing process, hot-dip galvanizing or hot-dip zinc alloy plating may be performed on the steel sheet in a temperature range of 500° C. or lower. At this time, the steel sheet may be reheated before being dipped in a plating bath. In addition, the plated steel sheet may be heated to alloy the plated layer.

By performing electroplating or deposition plating on the steel sheet after the annealing process to form a galvanized layer on a single surface or both surfaces of the steel sheet, a galvanized steel sheet including the galvanized layer may be manufactured.

The atmosphere in the annealing process may be controlled to reform the surface of the steel sheet. For example, by performing heating in a decarburization atmosphere, a steel sheet having excellent bendability where a surface layer area of the steel sheet is appropriately decarburized is obtained.

<Temper Rolling Process>

After the annealing process, temper rolling may be performed such that the total rolling reduction is 0.05% to 2.00%. By performing the temper rolling, the surface shape can be flattened and the surface roughness can be adjusted.

EXAMPLES

Next, examples of the present invention will be described, but conditions of the examples are merely exemplary to confirm the operability and the effects of the present invention. The present invention is not limited to these condition examples. The present invention can adopt various conditions within a range not departing from the scope of the present invention as long as the object of the present invention can be achieved under the conditions.

Molten steel having a chemical composition shown in Tables 1-1 and 1-2 were cast to manufacture steel pieces. Next, hot-rolled steel sheets were obtained by hot-rolling the steel pieces under conditions shown in Tables 2-1 and 2-2.

Tables 2-1 and 2-2 show $f_n$ obtained from the temperature history at 1000° C. or lower in the hot rolling process and Expression (6).

Next, the steel pieces were reheated under conditions shown in Tables 2-1 and 2-2. Tables 2-1 and 2-2 show the left side of Expression (7-1) obtained from the temperature history in a temperature range of 450° C. to 700° C. in the reheating process and Expressions (7-1) and (7-2), and show $K_{20}$ obtained from the temperature history in a temperature range of 450° C. to 700° C. in the reheating process and Expression (8).

Next, steel sheets were obtained by performing cold rolling, a heat treatment (annealing), and optionally temper rolling on the hot-rolled steel sheets under conditions shown in Tables 3-1 to 3-3. For annealing, the steel sheets were heated to annealing temperatures shown in Tables 3-1 to 3-3, were retained at the temperatures for 3 s to 200 s, and subsequently were cooled.

Tables 3-1 to 3-3 show $p_{10}$ obtained from the temperature history in the temperature range of 550° C. to 720° C. in the process of heating in the annealing process and Expression (9), and show $e_4 \cdot y_m \cdot (K_3 \cdot K_4)^{-2/1}$ obtained from the temperature history in the temperature range of 720° C. to the annealing temperature in the process of heating in the annealing process and Expression (10).

The plating process in Tables 3-1 to 3-3 is as follows.

Zn alloy plating: a process of cooling the steel sheet to a temperature range of 500° C. or lower in the annealing process, dipping the steel sheet in a molten zinc alloy bath, and cooling the steel sheet to room temperature to obtain a zinc alloy plated steel sheet.

Alloy Galvannealing: a process of cooling the steel sheet to a temperature range of 500° C. or lower in the annealing process, dipping the steel sheet in a molten zinc alloy bath and reheating the steel sheet to 580° C. for alloying and cooling the steel sheet to room temperature to obtain an alloy galvannealed steel sheet.

GA: a process of cooling the steel sheet to a temperature range of 500° C. or lower in the annealing process, dipping the steel sheet in a molten zinc bath and reheating the steel sheet to 560° C. for alloying and cooling the steel sheet to room temperature to obtain a hot-dip galvannealed steel sheet (GA).

GI: a process of cooling the steel sheet to a temperature range of 500° C. or lower in the annealing process, dipping the steel sheet in a molten zinc bath, and cooling the steel sheet to room temperature to obtain a hot-dip galvanized steel sheet (GI).

Deposition: a process of performing deposition plating after the annealing process to obtain a galvanized steel sheet.

EG: a process of performing electrogalvanizing after the annealing process to obtain an electrogalvanized steel sheet (EG).

Test pieces (three in total) having, as an observed section, a cross section parallel to a rolling direction of the steel sheet and perpendicular to a steel sheet surface were collected from the ¼ width portion, the ½ width portion, and the ¾ width portion of each of the steel sheets obtained under the manufacturing conditions shown in Tables 4-1 to 4-6 and Tables 1-1 to 3-3, and microstructures were observed. As the results of the structure observation performed using the above-described method, Tables 4-1 to 4-6 show the area ratio of ferrite, the proportion of unrecrystallized ferrite in ferrite, the area ratio of martensite, the volume percentage of residual austenite, the average grain size of carbonitrides, the average grain size of ferrite, and the left sides of Expressions (2) to (4). The sheet thickness of the steel sheet was the same as the sheet thickness after rolling shown in Tables 3-1 to 3-3.

Regarding the alloyed steel sheet, The Fe content in the alloyed hot-dip galvanized layer (galvannealed layer) or the alloyed hot-dip zinc alloy plated layer (alloy galvannealed layer) was measured using the above-described method.

The plated layers shown in Tables 4-1 to 4-6 are as follows.

Zn alloy plated: zinc alloy plated layer

Alloy Galvannealed: alloy galvannealed layer

GA: hot-dip galvannealed layer formed by dipping the steel sheet in a molten zinc bath and alloying the steel sheet GI: hot-dip galvanized layer formed by dipping the steel sheet in a molten zinc bath Deposited: galvanized layer formed by deposition plating EG: galvanized layer formed by electrogalvanizing Tables 5-1 to 5-3 show the properties of the steel sheets obtained under the manufacturing conditions of Tables 1-1 to 3-3. Regarding the tensile properties, the 0.2% proof stress (YS: yield strength), the tensile strength (TS), the yield ratio (YR), and the uniform elongation (uEl) were evaluated. The 0.2% proof stress, the tensile strength, the yield ratio, and the uniform elongation were obtained by performing a tensile test. A 13B test piece was prepared according to JIS Z 2241:2011, and the rolling direction of the steel sheet is set as a tension axis to perform the tensile test. The rolling direction of the steel sheet was set as the tension axis, and tensile test pieces were collected from a ¼ width position from a sheet width direction end portion in the sheet width direction, a ½ width position from the sheet width direction end portion in the sheet width direction, and a ¾ width position from the sheet width direction end portion in the sheet width direction. By calculating the average values of the 0.2% proof stress, the tensile strength, and the uniform elongation obtained from the three tensile test pieces, the 0.2% proof stress, the tensile strength, and the uniform elongation were obtained. By dividing the average value of tensile strength by the average value of 0.2% proof stress, the yield ratio was obtained.

A steel sheet in which the 0.2% proof stress was 280 MPa to 600 MPa, the yield ratio was 0.50 to 0.90, and the uniform elongation was 10.0% or more was determined to have excellent formability and as "Pass". A steel sheet in which the 0.2% proof stress was lower than 280 MPa or higher than 600 MPa, the yield ratio was lower than 0.50 or higher than 0.90, or the uniform elongation was less than 10.0% was determined to have poor formability and as "Fail".

A steel sheet in which the tensile strength was 450 MPa to 800 MPa was determined to have an excellent strength and as "Pass". On the other hand, a steel sheet in which the tensile strength was lower than 450 MPa was determined to have a poor strength and as "Fail".

The homogeneity of the steel sheet was evaluated from Expressions (12), (13), and (14). A steel sheet that satisfied Expressions (12), (13), and (14) was determined to be homogeneous, to have excellent dimensional accuracy during press forming, and as "Pass". A steel sheet that did not satisfy any one of Expressions (12), (13), and (14) was determined to be inhomogeneous, to have poor dimensional accuracy during press forming, and as "Fail".

YS in Expression (12) was the average value of 0.2% proof stress obtained using the above-described method at the ¼ width position from the sheet width direction end portion in the sheet width direction, the ½ width position from the sheet width direction end portion in the sheet width direction, and the ¾ width position from the sheet width direction end portion in the sheet width direction. $\Delta_{YS}$ in Expression (12) was obtained using the above-described method by calculating a difference between a maximum value and a minimum value among the values of 0.2% proof stress at the ¼ width position from the sheet width direction end portion in the sheet width direction, the ½ width position from the sheet width direction end portion in the sheet width direction, and the ¾ width position from the sheet width direction end portion in the sheet width direction.

uEl in Expression (13) was the average value of uniform elongation obtained using the above-described method at the ¼ width position from the sheet width direction end portion in the sheet width direction, the ½ width position from the sheet width direction end portion in the sheet width direction, and the ¾ width position from the sheet width direction end portion in the sheet width direction. $\Delta_{uEl}$ in Expression (13) was obtained using the above-described method by calculating a difference between a maximum value and a minimum value among the values of uniform elongation at the ¼ width position from the sheet width direction end portion in the sheet width direction, the ½ width position from the sheet width direction end portion in the sheet width direction, and the ¾ width position from the sheet width direction end portion in the sheet width direction.

In order to obtain am in Expression (14), one tensile test piece is collected from each of the ¼ width position from the sheet width direction end portion in the sheet width direction, the ½ width position from the sheet width direction end portion in the sheet width direction, and the ¾ width position from the sheet width direction end portion in the sheet width direction, that is, three test pieces in total were collected. A deformation at a bending angle of 90° was applied to the test pieces in a bending test defined by the standard 238-100 of Verband der Automobilindustrie (VDA) in December, 2010, and plastic bending angles α of the test pieces after removing the load were measured. $\alpha_M$ was an angle of the test piece having the maximum difference from 90° among the measured values of the plastic bending angles α. That is, am is the maximum value of the absolute value of "α−90°", and $\alpha_M/90$ is an index representing the size of a dimensional dispersion after press forming obtained by non-dimensionalizing the plastic bending angle $\alpha_M$ by 90°. In addition, conditions were set in the VDA bending test.

Roll diameter; φ30 mm
Distance between rolls: 2×sheet thickness+0.5±0.05 mm
Punch shape: tip end R=0.4 mm
Punch pressing-in speed: 20 mm/min
Test piece dimension: sheet thickness×60 mm×60 mm
Bending direction: direction perpendicular to the rolling direction The plastic bending angle is a measured value of a bending inner angle among angles formed by extended lines of two flat portions of the test piece that is deformed in a "V-shape" in the bending test.

$$\Delta_{YS}/YS \leq 0.20 \tag{12}$$

$$\Delta_{uEl}/uEl \leq 0.25 \tag{13}$$

$$0.90 \leq \alpha_M/90 \leq 1.10 \tag{14}$$

TABLE 1-1

| Steel | Composition, mass %, Remainder including Fe and Impurities | | | | | | | | | | | Middle Side in Expression (1-2) | $Ac_3$ | $Ac_1$ | Note |
| | C | Si | Mn | Al | P | S | Ti | Nb | N | O | Others | | | | |
|---|---|---|---|---|---|---|---|---|---|---|---|---|---|---|---|
| A | 0.095 | 0.018 | 1.23 | 0.039 | 0.023 | 0.0036 | 0.037 | 0.012 | 0.0058 | 0.0006 | | 0.06 | 838 | 704 | Example |
| B | 0.038 | 0.256 | 1.72 | 0.014 | 0.006 | 0.0049 | 0.063 | | 0.0035 | 0.0018 | | 0.34 | 843 | 715 | Example |
| C | 0.078 | 0.048 | 0.48 | 0.091 | 0.013 | 0.0009 | | 0.035 | 0.0045 | 0.0012 | | 0.06 | 865 | 723 | Example |
| D | 0.105 | 1.374 | 1.71 | 0.009 | 0.015 | 0.0038 | 0.034 | 0.031 | 0.0016 | 0.0016 | | 0.11 | 862 | 733 | Example |
| E | 0.046 | 0.066 | 1.18 | 0.249 | 0.009 | 0.0014 | 0.025 | | 0.0043 | 0.0022 | B: 0.0032 | 0.06 | 882 | 725 | Example |
| F | 0.104 | 0.932 | 0.75 | 0.091 | 0.021 | 0.0017 | 0.023 | 0.047 | 0.0025 | 0.0008 | | 0.09 | 879 | 734 | Example |
| G | 0.088 | 0.099 | 2.17 | 0.067 | 0.016 | 0.0039 | 0.089 | | 0.0074 | 0.0015 | | 0.18 | 825 | 697 | Example |
| H | 0.135 | 0.179 | 1.60 | 0.472 | 0.009 | 0.0043 | | 0.044 | 0.0026 | 0.0008 | | 0.04 | 862 | 720 | Example |
| I | 0.123 | 0.694 | 0.98 | 0.076 | 0.018 | 0.0012 | 0.034 | 0.024 | 0.0027 | 0.0011 | Cr: 0.65 | 0.08 | 852 | 738 | Example |
| J | 0.058 | 0.038 | 1.07 | 0.184 | 0.046 | 0.0067 | 0.025 | 0.017 | 0.0057 | 0.0007 | Ca: 0.0033 | 0.06 | 864 | 715 | Example |
| K | 0.064 | 0.357 | 1.64 | 0.073 | 0.008 | 0.0019 | 0.075 | 0.012 | 0.0036 | 0.0018 | Mo: 0.33 | 0.27 | 846 | 707 | Example |
| L | 0.118 | 0.013 | 0.78 | 0.037 | 0.021 | 0.0082 | 0.018 | 0.056 | 0.0041 | 0.0013 | | 0.07 | 843 | 710 | Example |
| M | 0.072 | 0.154 | 0.16 | 0.042 | 0.006 | 0.0018 | 0.057 | | 0.0067 | 0.0018 | Ni: 0.59 | 0.12 | 856 | 712 | Example |
| N | 0.077 | 0.045 | 1.82 | 0.867 | 0.007 | 0.0045 | 0.008 | 0.047 | 0.0016 | 0.0024 | | 0.09 | 998 | 745 | Example |
| O | 0.085 | 0.599 | 2.83 | 0.071 | 0.009 | 0.0014 | 0.046 | 0.007 | 0.0042 | 0.0015 | | 0.10 | 821 | 684 | Example |
| P | 0.114 | 0.153 | 1.26 | 0.050 | 0.015 | 0.0037 | | 0.048 | 0.0055 | 0.0016 | V: 0.15 | 0.05 | 838 | 708 | Example |
| Q | 0.081 | 0.214 | 1.94 | 0.096 | 0.003 | 0.0008 | 0.036 | 0.015 | 0.0034 | 0.0030 | W: 0.20 | 0.10 | 842 | 698 | Example |

The underline represents that the value is outside of the range of the present invention, and the blank represents that the value is less than the lower detection limit.

TABLE 1-2

| Steel | Composition, mass %, Remainder including Fe and Impurities | | | | | | | | | | | Middle Side in Expression (1-2) | $Ac_3$ | $Ac_1$ | Note |
| | C | Si | Mn | Al | P | S | Ti | Nb | N | O | Others | | | | |
|---|---|---|---|---|---|---|---|---|---|---|---|---|---|---|---|
| R | 0.057 | 0.054 | 0.62 | 0.033 | 0.021 | 0.0058 | 0.029 | 0.037 | 0.0115 | 0.0014 | Mg: 0.0024 | 0.08 | 864 | 715 | Example |
| S | 0.091 | 1.097 | 1.22 | 0.038 | 0.013 | 0.0059 | 0.050 | | 0.0026 | 0.0008 | Sb: 0.13 | 0.11 | 874 | 727 | Example |
| T | 0.046 | 1.038 | 2.32 | 0.023 | 0.009 | 0.0017 | 0.068 | 0.027 | 0.0036 | 0.0007 | | 0.38 | 854 | 707 | Example |

TABLE 1-2-continued

| | Composition, mass %, Remainder including Fe and Impurities | | | | | | | | | | | Middle Side in Expression | | | |
| Steel | C | Si | Mn | Al | P | S | Ti | Nb | N | O | Others | (1-2) | Ac$_3$ | Ac$_1$ | Note |
|---|---|---|---|---|---|---|---|---|---|---|---|---|---|---|---|
| U | 0.113 | 0.428 | 1.05 | 0.080 | 0.018 | 0.0050 | 0.058 | | 0.0082 | 0.0017 | Sn: 0.17 | 0.07 | 850 | 720 | Example |
| V | 0.122 | 0.089 | 2.34 | 0.134 | 0.015 | 0.0035 | 0.021 | 0.019 | 0.0022 | 0.0009 | Ce: 0.0019, La: 0.0011 | 0.05 | 821 | 689 | Example |
| W | 0.059 | 0.057 | 0.38 | 0.064 | 0.021 | 0.0039 | 0.070 | | 0.0056 | 0.0010 | Cr: 0.20, Mo: 0.07, B: 0.0011 | 0.22 | 867 | 724 | Example |
| X | 0.103 | 0.066 | 1.09 | 0.257 | 0.014 | 0.0026 | | 0.036 | 0.0085 | 0.0010 | Cu: 0.22, Ni: 0.08 | 0.05 | 860 | 717 | Example |
| Y | 0.071 | 0.942 | 1.37 | 0.075 | 0.008 | 0.0045 | 0.065 | 0.026 | 0.0051 | 0.0016 | Cu: 0.34 | 0.21 | 868 | 722 | Example |
| Z | 0.067 | 0.435 | 2.00 | 0.075 | 0.010 | 0.0011 | | 0.025 | 0.0032 | 0.0020 | | 0.05 | 840 | 700 | Example |
| AA | 0.102 | 0.194 | 1.21 | 0.097 | 0.013 | 0.0061 | 0.015 | 0.013 | 0.0058 | 0.0011 | | <u>0.02</u> | 846 | 712 | Comparative Example |
| AB | 0.050 | 0.374 | 1.32 | 0.091 | 0.009 | 0.0049 | 0.073 | 0.045 | 0.0038 | 0.0014 | | <u>0.42</u> | 862 | 713 | Comparative Example |
| AC | 0.084 | 0.136 | 1.36 | 0.082 | 0.009 | 0.0059 | <u>0.117</u> | | 0.0055 | 0.0017 | | 0.29 | 843 | 706 | Comparative Example |
| AD | 0.069 | 0.180 | 1.41 | 0.074 | 0.023 | 0.0029 | | <u>0.079</u> | 0.0052 | 0.0007 | | 0.15 | 848 | 703 | Comparative Example |
| AE | <u>0.013</u> | 0.214 | 1.44 | 0.098 | 0.021 | 0.0058 | 0.037 | | 0.0065 | 0.0017 | | 0.28 | 878 | 762 | Comparative Example |
| AF | <u>0.189</u> | 0.174 | 1.49 | 0.099 | 0.007 | <u>0.0280</u> | 0.058 | 0.031 | 0.0044 | 0.0012 | | 0.08 | 820 | 705 | Comparative Example |
| AG | 0.082 | 0.088 | 0.69 | 0.014 | 0.012 | 0.0021 | | | 0.0032 | 0.0011 | | — | 845 | 712 | Comparative Example |
| AH | 0.051 | 1.223 | 0.22 | 0.038 | 0.012 | 0,0018 | <u>0.061</u> | | 0.0029 | 0.0011 | | 0.25 | 886 | 703 | Example |

The underline represents that the value is outside of the range of the present invention, and the blank represents that the value is less than the lower detection limit.

TABLE 2-1

| | | Cold Rolling Process | | | | | Reheating Process | | | |
| | Hot-Rolled Steel Sheet | Steel Piece Heating Temperature ° C. | Rolling Completion Temperature ° C. | f$_n$ | Time Required for Start of Cooling s | Average Cooling Rate in Temperature Range of 800° C. to 450° C. ° C./s | Maximum Reheating Temperature ° C. | Left side in Expression (7-1) | K$_{20}$ ×10$^4$ | Note |
| Steel | | | | | | | | | | |
|---|---|---|---|---|---|---|---|---|---|---|
| A | A1 | 1276 | 903 | 0.57 | 2.3 | 37 | 658 | 6.00 | 1.84 | Example |
| A | A2 | 1260 | 891 | 0.88 | 2.0 | 50 | 608 | 40.20 | 1.94 | Example |
| A | A3 | 1233 | <u>831</u> | 0.66 | 2.4 | 45 | 582 | 15.72 | 1.85 | Comparative Example |
| B | B1 | 1253 | 873 | 0.68 | 1.7 | 47 | 584 | 41.59 | 1.92 | Example |
| B | B2 | 1239 | 904 | 0.63 | 2.2 | 61 | 657 | 10.77 | 1.88 | Example |
| B | B3 | <u>1140</u> | 912 | 0.42 | 3.5 | 33 | 575 | 15.21 | 1.91 | Comparative Example |
| C | C1 | 1269 | 894 | 0.58 | 1.7 | 30 | 593 | 1.90 | 1.79 | Example |
| C | C2 | 1242 | 878 | 0.24 | 1.8 | 49 | 539 | 1.59 | 1.75 | Example |
| C | C3 | 1247 | 918 | 0.27 | 2.3 | <u>14</u> | 629 | 4.64 | 1.88 | Comparative Example |
| D | D1 | 1216 | 913 | 0.71 | 2.2 | 34 | 471 | 1.52 | 1.38 | Example |
| D | D2 | 1240 | 864 | 0.31 | 5.1 | 36 | 605 | 3.66 | 1.46 | Example |
| E | E1 | 1275 | 880 | 0.14 | 4.1 | 47 | 525 | 3.61 | 1.68 | Example |
| E | E2 | 1244 | 872 | 0.56 | 1.7 | 23 | 568 | 1.30 | 1.63 | Example |
| F | F1 | 1282 | 890 | 0.59 | 1.6 | 27 | 550 | 1.91 | 1.40 | Example |
| F | F2 | 1308 | 892 | 0.33 | 4.2 | 34 | 693 | 9.34 | 1.59 | Example |
| F | F3 | 1274 | 876 | <u>1.11</u> | 1.6 | 60 | 602 | 7.66 | 1.52 | Comparative Example |
| G | G1 | 1288 | 907 | 0.44 | 2.3 | 25 | 626 | 4.99 | 1.93 | Example |

TABLE 2-1-continued

| Steel | Hot-Rolled Steel Sheet | Steel Piece Heating Temperature ° C. | Rolling Completion Temperature ° C. | $f_n$ | Time Required for Start of Cooling s | Average Cooling Rate in Temperature Range of 800° C. to 450° C. ° C./s | Maximum Reheating Temperature ° C. | Left side in Expression (7-1) | $K_{20}$ ×10$^4$ | Note |
|---|---|---|---|---|---|---|---|---|---|---|
| | | | | | | Cold Rolling Process | Reheating Process | | | |
| G | G2 | 1259 | 880 | 0.77 | 1.9 | 54 | 539 | 3.25 | 1.84 | Example |
| H | H1 | 1252 | 889 | 0.37 | 3.3 | 38 | 585 | 2.57 | 1.95 | Example |
| H | H2 | 1226 | 863 | 0.47 | 1.8 | 73 | 635 | 1.83 | 1.96 | Example |
| I | I1 | 1181 | 897 | 0.76 | 1.9 | 39 | 685 | 35.60 | 1.83 | Example |
| I | I2 | 1266 | 880 | 0.39 | 3.4 | 41 | 540 | 11.10 | 1.64 | Example |
| I | I3 | 1300 | 916 | 0.45 | 3.2 | 31 | 612 | 9.37 | 1.66 | Example |
| J | J1 | 1204 | 890 | 0.73 | 1.8 | 53 | 549 | 4.48 | 1.72 | Example |
| J | J2 | 1229 | 874 | 0.25 | 3.1 | 79 | 522 | 9.65 | 1.76 | Example |
| K | K1 | 1259 | 889 | 0.75 | 2.1 | 43 | 594 | 1.99 | 1.75 | Example |
| K | K2 | 1226 | 900 | 0.41 | 4.6 | 49 | 641 | 5.00 | 1.85 | Example |
| K | K3 | 1211 | 905 | 0.48 | 1.2 | 63 | 592 | 1.92 | 1.75 | Comparative Example |
| L | L1 | 1214 | 895 | 0.33 | 4.8 | 29 | 578 | 11.26 | 1.89 | Example |
| L | L2 | 1206 | 875 | 0.31 | 4.2 | 83 | 537 | 5.91 | 1.82 | Example |
| L | L3 | 1257 | 877 | 0.34 | 3.1 | 47 | 726 | — | — | Comparative Example |
| M | M1 | 1254 | 899 | 0.27 | 4.3 | 30 | 594 | 6.35 | 1.58 | Example |
| M | M2 | 1253 | 875 | 0.52 | 2.2 | 42 | 595 | 2.84 | 1.52 | Example |
| M | M3 | 1355 | 901 | 0.60 | 4.2 | 49 | 672 | 17.28 | 1.71 | Comparative Example |
| N | N1 | 1253 | 904 | 0.63 | 1.7 | 38 | 498 | 3.44 | 1.84 | Example |
| N | N2 | 1168 | 893 | 0.63 | 1.7 | 44 | 599 | 1.40 | 1.85 | Example |

The underline represents that the value is outside of the range of the present invention.

TABLE 2-2

| Steel | Hot-Rolled Steel Sheet | Steel Piece Heating Temperature ° C. | Rolling Completion Temperature ° C. | $f_n$ | Time Required for Start of Cooling s | Average Cooling Rate in Temperature Range of 800° C. to 450° C. ° C./s | Maximum Reheating Temperature ° C. | Left side in Expression (7-1) | $K_{20}$ ×10$^4$ | Note |
|---|---|---|---|---|---|---|---|---|---|---|
| | | | | | | Cold Rolling Process | Reheating Process | | | |
| O | O1 | 1245 | 919 | 0.75 | 1.8 | 42 | 650 | 5.97 | 1.92 | Example |
| O | O2 | 1284 | 863 | 0.55 | 2.5 | 32 | 574 | 1.84 | 1.77 | Example |
| O | O3 | 1238 | 898 | 0.54 | 2.4 | 36 | 435 | — | — | Comparative Example |
| P | P1 | 1249 | 876 | 0.76 | 1.9 | 39 | 540 | 1.84 | 1.85 | Example |
| P | P2 | 1232 | 902 | 0.41 | 2.5 | 67 | 615 | 4.13 | 1.96 | Example |
| Q | Q1 | 1250 | 905 | 0.80 | 1.8 | 32 | 540 | 2.62 | 1.75 | Example |
| Q | Q2 | 1241 | 889 | 0.78 | 1.9 | 41 | 464 | 3.39 | 1.73 | Example |
| R | R1 | 1245 | 905 | 0.41 | 2.1 | 57 | 611 | 1.70 | 1.81 | Example |
| R | R2 | 1248 | 912 | 0.46 | 2.0 | 60 | 665 | 4.89 | 1.94 | Example |
| S | S1 | 1193 | 919 | 0.57 | 2.1 | 29 | 643 | 49.42 | 1.68 | Example |
| S | S2 | 1263 | 887 | 0.74 | 1.5 | 41 | 519 | 4.51 | 1.45 | Example |
| T | T1 | 1266 | 897 | 0.68 | 3.0 | 52 | 538 | 2.33 | 1.56 | Example |
| T | T2 | 1264 | 886 | 0.92 | 1.9 | 42 | 565 | 3.82 | 1.61 | Example |
| T | T3 | 1245 | 943 | 0.80 | 1.7 | 35 | 623 | 12.15 | 1.72 | Comparative Example |
| U | U1 | 1240 | 887 | 0.42 | 2.5 | 23 | 605 | 8.48 | 1.66 | Example |
| U | U2 | 1225 | 882 | 0.37 | 2.4 | 34 | 575 | 4.85 | 1.61 | Example |
| V | V1 | 1286 | 921 | 0.67 | 1.9 | 61 | 627 | 3.10 | 1.96 | Example |
| V | V2 | 1275 | 925 | 0.36 | 3.5 | 47 | 527 | 1.22 | 1.81 | Example |
| W | W1 | 1273 | 908 | 0.48 | 2.5 | 29 | 586 | 7.69 | 1.68 | Example |
| W | W2 | 1308 | 886 | 0.42 | 3.5 | 38 | 597 | 33.46 | 1.80 | Example |
| X | X1 | 1219 | 892 | 0.40 | 2.3 | 36 | 623 | 2.65 | 1.93 | Example |
| X | X2 | 1295 | 904 | 0.39 | 3.3 | 25 | 517 | 1.14 | 1.80 | Example |
| X | X3 | 1267 | 914 | 0.42 | 2.5 | 37 | 663 | 5.21 | 2.02 | Comparative Example |
| Y | Y1 | 1254 | 878 | 0.38 | 4.0 | 36 | 574 | 23.87 | 1.64 | Example |
| Y | Y2 | 1255 | 881 | 0.46 | 3.6 | 48 | 636 | 73.40 | 1.76 | Example |
| Z | Z1 | 1221 | 911 | 0.12 | 5.1 | 35 | 625 | 2.14 | 1.95 | Example |

TABLE 2-2-continued

| Steel | Hot-Rolled Steel Sheet | Cold Rolling Process | | | | | Reheating Process | | | Note |
|---|---|---|---|---|---|---|---|---|---|---|
| | | Steel Piece Heating Temperature °C | Rolling Completion Temperature °C | $f_n$ | Time Required for Start of Cooling s | Average Cooling Rate in Temperature Range of 800° C. to 450° C. ° C./s | Maximum Reheating Temperature ° C. | Left side in Expression (7-1) | $K_{20}$ ×10^4 | |
| Z | Z2 | 1224 | 878 | 0.25 | 4.2 | 47 | 558 | 1.09 | 1.85 | Example |
| Z | Z3 | 1258 | 901 | 0.49 | 2.1 | 41 | 579 | 0.79 | 1.84 | Comparative Example |
| AA | AA | 1223 | 894 | 0.23 | 3.2 | 32 | 594 | 1.19 | 1.83 | Comparative Example |
| AB | AB | 1244 | 896 | 0.81 | 2.1 | 57 | 644 | 6.89 | 1.73 | Comparative Example |
| AC | AC | 1270 | 867 | 0.57 | 3.2 | 40 | 633 | 6.44 | 1.79 | Comparative Example |
| AD | AD | 1274 | 900 | 0.40 | 3.6 | 40 | 618 | 1.94 | 1.92 | Comparative Example |
| AE | AE | 1242 | 888 | 0.40 | 2.5 | 54 | 579 | 2.29 | 1.67 | Comparative Example |
| AF | AF | 1245 | 916 | 0.82 | 2.1 | 43 | 612 | 3.98 | 1.76 | Comparative Example |
| AG | AG | 1222 | 906 | 0.50 | 3.3 | 53 | 624 | — | 1.44 | Comparative Example |
| AH | AH | 1204 | 894 | 1.06 | 1.6 | 56 | 450 | — | — | Comparative Example |

The underline represents that the value is outside of the range of the present invention.

TABLE 3-1

| Experiment Example | Steel | Hot-Rolled Steel Sheet | Cold Rolling Process | | | | | Annealing Temperature |
|---|---|---|---|---|---|---|---|---|
| | | | Sheet Thickness before Rolling mm | Sheet Thickness after Rolling mm | Total Rolling Reduction % | Rolling Completion Temperature ° C. | | Process of Heating Annealing Temperature ° C. |
| 1 | A | A1 | 3.9 | 2.2 | 44 | 175 | | 779 |
| 2 | A | A1 | 3.9 | 2.2 | 44 | 99 | | 770 |
| 3 | A | A2 | 2.8 | 1.0 | 64 | 190 | | 814 |
| 4 | A | A3 | 3.3 | 1.2 | 64 | 196 | | 789 |
| 5 | B | B1 | 3.5 | 1.0 | 71 | 154 | | 790 |
| 6 | B | B2 | 2.1 | 0.7 | 67 | 175 | | 770 |
| 7 | B | B3 | 2.9 | 1.0 | 66 | 172 | | 787 |
| 8 | C | C1 | 4.3 | 1.8 | 58 | 170 | | 804 |
| 9 | C | C1 | 4.3 | 1.8 | 58 | 188 | | 813 |
| 10 | C | C1 | 4.3 | 1.8 | 58 | 188 | | 810 |
| 11 | C | C2 | 1.8 | 0.8 | 56 | 185 | | 795 |
| 12 | C | C3 | 1.9 | 0.8 | 58 | 183 | | 811 |
| 13 | D | D1 | 4.9 | 2.0 | 59 | 136 | | 789 |
| 14 | D | D2 | 4.7 | 1.4 | 70 | 164 | | 775 |
| 15 | E | E1 | 2.0 | 0.6 | 70 | 168 | | 789 |
| 16 | E | E2 | 2.8 | 1.8 | 36 | 196 | | 784 |
| 17 | F | F1 | 3.5 | 1.4 | 60 | 202 | | 796 |
| 18 | F | F1 | 3.5 | 0.6 | 83 | 190 | | 806 |
| 19 | F | F1 | 3.5 | 1.4 | 60 | 202 | | 791 |
| 20 | F | F2 | 2.4 | 0.8 | 67 | 161 | | 807 |
| 21 | F | F3 | 4.8 | 2.0 | 58 | 173 | | 797 |
| 22 | G | G1 | 2.6 | 0.8 | 69 | 164 | | 769 |
| 23 | G | G2 | 3.2 | 0.7 | 78 | 191 | | 771 |
| 24 | H | H1 | 3.5 | 1.8 | 49 | 143 | | 809 |
| 25 | H | H2 | 1.6 | 0.4 | 75 | 174 | | 805 |
| 26 | I | I1 | 2.1 | 0.5 | 76 | 180 | | 779 |
| 27 | I | I2 | 3.3 | 1.6 | 52 | 136 | | 812 |
| 28 | I | I3 | 4.0 | 2.3 | 43 | 160 | | 776 |
| 29 | J | J1 | 5.2 | 2.4 | 54 | 156 | | 767 |
| 30 | J | J2 | 1.8 | 1.0 | 44 | 121 | | 786 |

TABLE 3-1-continued

| Experiment Example | Annealing Temperature | | | Process of Cooling Left Side of | Temper Rolling Process Total Rolling | | |
| | Process of Heating | | | | | | |
| | Tension MPa | $p_{10}$ | $e_4 \cdot ym$ $(K_3 \cdot K_4)^{-1/2}$ | Expression (11) | Reduction % | Plating Process | Note |
|---|---|---|---|---|---|---|---|
| 1 | 18 | 0.58 | 1.8 | 1.40 | 0.50 | | Example |
| 2 | 41 | 0.12 | 2.3 | 1.54 | 0.20 | | Comparative Example |
| 3 | 16 | 0.76 | 1.4 | 1.11 | 0.83 | | Example |
| 4 | 19 | 0.67 | 1.5 | 1.18 | 0.36 | | Comparative Example |
| 5 | 26 | 0.53 | 1.6 | 1.19 | 0.14 | GA | Example |
| 6 | 29 | 0.97 | 1.1 | 1.06 | 0.58 | | Example |
| 7 | 21 | 0.62 | 1.5 | 1.47 | 0.34 | | Comparative Example |
| 8 | 28 | 0.69 | 3.7 | 1.31 | 1.35 | | Example |
| 9 | 22 | 0.08 | 4.3 | 2.43 | 0.42 | | Comparative Example |
| 10 | 18 | 0.75 | 6.4 | 1.55 | 0.33 | | Comparative Example |
| 11 | 20 | 0.65 | 4.2 | 1.80 | 0.33 | GA | Example |
| 12 | 28 | 0.85 | 4.4 | 1.17 | 0.21 | | Comparative Example |
| 13 | 23 | 0.30 | 2.0 | 1.11 | 0.44 | GA | Example |
| 14 | 24 | 0.45 | 2.4 | 1.18 | 0.43 | | Example |
| 15 | 21 | 0.54 | 1.7 | 1.40 | 0.18 | GI | Example |
| 16 | 27 | 0.35 | 3.4 | 1.36 | 0.73 | | Example |
| 17 | 28 | 0.32 | 4.5 | 1.27 | 0.40 | | Example |
| 18 | 29 | 0.39 | 3.5 | 1.17 | 0.52 | | Comparative Example |
| 19 | 26 | 0.32 | 3.5 | 0.84 | 0.56 | | Comparative Example |
| 20 | 34 | 0.77 | 2.3 | 1.24 | 0.26 | Zn Alloy Plating | Example |
| 21 | 25 | 0.76 | 2.0 | 1.56 | 0.19 | | Comparative Example |
| 22 | 26 | 0.54 | 1.5 | 1.32 | 0.28 | | Example |
| 23 | 30 | 0.96 | 1.8 | 1.35 | 0.46 | | Example |
| 24 | 30 | 0.52 | 4.2 | 1.47 | 0.19 | GI | Example |
| 25 | 26 | 0.86 | 3.5 | 1.17 | 0.67 | | Example |
| 26 | 23 | 0.20 | 1.7 | 1.25 | 0.14 | | Example |
| 27 | 26 | 0.69 | 4.8 | 1.16 | 0.18 | | Example |
| 28 | 18 | 0.39 | 1.4 | 1.11 | — | | Example |
| 29 | 25 | 0.58 | 1.5 | 1.12 | 0.22 | | Example |
| 30 | 28 | 0.15 | 2.2 | 2.29 | 0.47 | GA | Example |

The underline represents that the value is outside of the range of the present invention.

TABLE 3-2

| Experiment Example | Steel | Hot-Rolled Steel Sheet | Cold Rolling Process | | | | Annealing Temperature |
| | | | Sheet Thickness before Rolling mm | Sheet Thickness after Rolling mm | Total Rolling Reduction % | Rolling Completion Temperature ° C. | Process of Heating Annealing Temperature ° C. |
|---|---|---|---|---|---|---|---|
| 31 | K | K1 | 4.2 | 2.2 | 48 | 149 | 745 |
| 32 | K | K1 | 4.2 | 2.2 | 48 | 191 | 759 |
| 33 | K | K2 | 3.3 | 2.2 | 33 | 160 | 759 |
| 34 | K | K3 | 3.8 | 1.4 | 63 | 147 | 750 |
| 35 | L | L1 | 2.0 | 1.0 | 50 | 185 | 825 |
| 36 | L | L2 | 1.4 | 0.4 | 71 | 189 | 752 |
| 37 | L | L2 | 1.4 | 0.4 | 71 | 167 | 765 |
| 38 | L | L3 | 1.8 | 0.6 | 67 | 200 | 795 |
| 39 | M | M1 | 4.8 | 2.6 | 46 | 188 | 799 |
| 40 | M | M2 | 3.8 | 1.0 | 74 | 145 | 782 |
| 41 | M | M3 | 3.8 | 1.6 | 58 | 168 | 801 |
| 42 | N | N1 | 3.4 | 2.0 | 41 | 127 | 838 |
| 43 | N | N2 | 2.2 | 0.6 | 73 | 126 | 813 |

TABLE 3-2-continued

| | | | | | | | |
|---|---|---|---|---|---|---|---|
| 44 | O | O1 | 24 | 1.0 | 58 | 158 | 746 |
| 45 | O | O2 | 5.5 | 1.8 | 67 | 179 | 735 |
| 46 | O | O2 | 5.5 | 1.8 | 67 | 142 | <u>857</u> |
| <u>47</u> | O | <u>O3</u> | 3.7 | 2.0 | 46 | 159 | <u>730</u> |
| 48 | P | <u>P1</u> | 5.3 | 2.4 | 55 | 130 | 770 |
| 49 | P | P1 | 5.3 | 2.4 | 55 | 179 | <u>707</u> |
| 50 | P | P1 | 5.3 | 2.4 | 55 | 130 | 780 |
| 51 | P | P2 | 2.3 | 1.0 | 57 | 169 | 774 |
| 52 | Q | Q1 | 2.5 | 1.2 | 52 | 192 | 747 |
| 53 | Q | Q2 | 3.9 | 1.8 | 54 | 209 | 787 |
| 54 | R | R1 | 2.9 | 1.8 | 38 | 188 | 762 |
| 55 | R | R2 | 3.5 | 1.8 | 49 | 175 | 810 |
| 56 | S | S1 | 3.3 | 1.2 | 64 | 185 | 826 |
| 57 | S | S2 | 2.9 | 1.0 | 66 | 148 | 796 |
| 59 | T | T1 | 4.6 | 2.3 | 50 | 151 | 780 |
| 60 | T | T2 | 4.5 | 2.4 | 47 | 145 | 770 |

| | Annealing Temperature | | | Temper Rolling | | | |
|---|---|---|---|---|---|---|---|
| | Process of Heating | | | Process of Cooling Left Side of | Process Total Rolling | | |
| Experiment Example | Tension MPa | $p_{10}$ | $e_4 \cdot ym$ $(K_3 \cdot K_4)^{-1/2}$ | Expression (11) | Reduction % | Plating Process | Note |
| 31 | 20 | 0.24 | 1.3 | 1.08 | 0.59 | | Example |
| 32 | — | 0.24 | 1.3 | 1.08 | 0.22 | | Comparative Example |
| 33 | 33 | 0.19 | 2.0 | 1.17 | 0.55 | | Example |
| <u>34</u> | 35 | 0.32 | 1.6 | 1.04 | 0.30 | | Comparative Example |
| 35 | 30 | 0.92 | 1.7 | 1.07 | 0.25 | | Example |
| 36 | 19 | 0.13 | 1.5 | 2.34 | 0.44 | | Example |
| 37 | 35 | 0.66 | <u>0.7</u> | 1.34 | 0.19 | | Comparative Example |
| <u>38</u> | 38 | — | — | — | 0.34 | | Comparative Example |
| 39 | 34 | 0.46 | 2.6 | 1.79 | 0.87 | GA | Example |
| 40 | 17 | 0.52 | 3.2 | 1.31 | 0.28 | GA | Example |
| <u>41</u> | 29 | 0.85 | 2.3 | 1.50 | 0.28 | | Comparative Example |
| 42 | 23 | 0.43 | 3.3 | 1.51 | 0.28 | | Example |
| 43 | 29 | 0.49 | 2.8 | 2.14 | 0.34 | GI | Example |
| 44 | 24 | 0.13 | 1.2 | 1.43 | 0.47 | | Example |
| 45 | 29 | 0.12 | 1.2 | 1.70 | 0.21 | GI | Example |
| 46 | 29 | 0.85 | — | <u>0.00</u> | 0.24 | | Comparative Example |
| <u>47</u> | 26 | — | — | — | 0.57 | | Comparative Example |
| 48 | 29 | 0.42 | 2.0 | 1.29 | 0.22 | Alloy Galvannealing | Example |
| 49 | 26 | — | — | — | 0.50 | | Comparative Example |
| 50 | 20 | 0.12 | <u>6.0</u> | <u>2.63</u> | 0.41 | | Comparative Example |
| 51 | 19 | 0.52 | 1.3 | 1.43 | 0.33 | | Example |
| 52 | 20 | 0.14 | 3.0 | 2.18 | 0.37 | Alloy Galvannealing | Example |
| 53 | 22 | 0.35 | 3.1 | 1.68 | 0.43 | | Example |
| 54 | 25 | 0.18 | 2.0 | 2.13 | 0.35 | EG | Example |
| 55 | 25 | 0.32 | 2.2 | 1.55 | 1.78 | | Example |
| 56 | 29 | 0.82 | 1.6 | 1.09 | 1.41 | | Example |
| 57 | 23 | 0.25 | 3.8 | 1.47 | 0.48 | Deposition | Example |
| 59 | 25 | 0.22 | 3.6 | 1.55 | 1.31 | | Example |
| 60 | 31 | 0.82 | 1.2 | 1.23 | 0.49 | | Example |

The underline represents that the value is outside of the range of the present invention.

TABLE 3-3

| Experiment Example | Steel | Hot-Rolled Steel Sheet | Cold Rolling Process | | | | Annealing Temperature |
|---|---|---|---|---|---|---|---|
| | | | Sheet Thickness before Rolling mm | Sheet Thickness after Rolling mm | Total Rolling Reduction % | Rolling Completion Temperature ° C. | Process of Heating Annealing Temperature ° C. |
| 61 | T | T3 | 4.0 | 2.2 | 45 | 164 | 773 |
| 62 | U | U1 | 3.4 | 1.8 | 47 | 203 | 779 |
| 63 | U | U2 | 4.5 | 1.8 | 60 | 146 | 730 |
| 64 | V | V1 | 2.0 | 0.8 | 60 | 162 | 762 |
| 65 | V | V2 | 2.9 | 1.8 | 38 | 161 | 760 |
| 66 | W | W1 | 3.3 | 1.4 | 58 | 172 | 799 |
| 67 | W | W2 | 3.6 | 1.6 | 56 | 206 | 802 |
| 68 | X | X1 | 3.0 | 1.0 | 67 | 157 | 804 |
| 69 | X | X1 | 3.0 | 2.3 | 23 | 221 | 809 |
| 70 | X | X2 | 2.4 | 0.6 | 75 | 226 | 764 |
| 71 | X | X3 | 3.0 | 1.6 | 47 | 209 | 764 |
| 72 | Y | Y1 | 2.2 | 0.6 | 73 | 153 | 828 |
| 74 | Z | Z1 | 2.9 | 1.0 | 66 | 199 | 742 |
| 75 | Z | Z2 | 3.0 | 1.0 | 67 | 185 | 785 |
| 76 | Z | Z3 | 4.6 | 2.6 | 43 | 170 | 743 |
| 77 | AA | AA | 3.7 | 2.0 | 46 | 176 | 758 |
| 78 | AB | AB | 2.1 | 1.2 | 43 | 183 | 784 |
| 79 | AC | AC | 3.9 | 1.6 | 59 | 176 | 784 |
| 80 | AD | AD | 4.6 | 1.8 | 61 | 183 | 774 |
| 81 | AE | AE | 4.0 | 1.6 | 60 | 174 | 783 |
| 82 | AF | AF | 4.0 | 1.6 | 60 | 190 | 768 |
| 83 | AG | AG | 3.0 | 1.2 | 60 | 146 | 778 |
| 84 | AH | AH | 1.7 | 0.8 | 53 | 93 | 771 |

| Experiment Example | Annealing Temperature | | | Process of Cooling Left Side of Expression (11) | Temper Rolling Process Total Rolling Reduction % | Plating Process | Note |
|---|---|---|---|---|---|---|---|
| | Process of Heating | | | | | | |
| | Tension MPa | $p_{10}$ | $e_4 \cdot ym$ $(K_3 \cdot K_4)^{-1/2}$ | | | | |
| 61 | 28 | 0.47 | 1.5 | 1.27 | 0.32 | | Comparative Example |
| 62 | 18 | 0.60 | 1.9 | 1.50 | 0.26 | GI | Example |
| 63 | 27 | 0.33 | 1.7 | 1.90 | 0.59 | | Example |
| 64 | 18 | 0.16 | 1.5 | 1.50 | 0.15 | | Example |
| 65 | 19 | 0.14 | 1.7 | 1.84 | 0.30 | | Example |
| 66 | 23 | 0.61 | 2.8 | 1.10 | 0.43 | | Example |
| 67 | 27 | 0.72 | 2.0 | 1.09 | 0.45 | EG | Example |
| 68 | 24 | 0.61 | 4.3 | 1.19 | 0.46 | | Example |
| 69 | 27 | 0.25 | 2.1 | 1.44 | 0.73 | | Comparative Example |
| 70 | 20 | 0.69 | 1.5 | 1.29 | 0.27 | Zn Plating | Example |
| 71 | 27 | 0.25 | 1.4 | 1.19 | 0.24 | | Comparative Example |
| 72 | 39 | 0.77 | 2.1 | 1.10 | 0.42 | | Example |
| 74 | 30 | 0.13 | 1.1 | 1.08 | 0.34 | | Example |
| 75 | 29 | 0.51 | 4.0 | 1.32 | 1.22 | | Example |
| 76 | 32 | 0.17 | 1.5 | 1.19 | 0.88 | | Comparative Example |
| 77 | 27 | 0.22 | 1.7 | 1.40 | 0.26 | | Comparative Example |
| 78 | 29 | 0.32 | 2.7 | 1.45 | 0.38 | | Comparative Example |
| 79 | 28 | 0.76 | 1.3 | 1.21 | 0.14 | | Comparative Example |
| 80 | 22 | 0.23 | 3.2 | 1.29 | 0.34 | | Comparative Example |
| 81 | 21 | 0.33 | 1.7 | 1.22 | 0.32 | | Comparative Example |
| 82 | 22 | 0.28 | 2.4 | 1.41 | 0.11 | | Comparative Example |

TABLE 3-3-continued

| | | | | | | |
|---|---|---|---|---|---|---|
| <u>83</u> | 25 | — | — | — | 0.25 | Comparative Example |
| <u>84</u> | 22 | — | — | — | 0.28 | Comparative Example |

The underline represents that the value is outside of the range of the present invention.

TABLE 4-1

| | | | Properties of Steel Sheet ¼ Width Portion | | | | |
|---|---|---|---|---|---|---|---|
| Experiment Example | Steel | Hot-Rolled Steel Sheet | Ferrite Vol % | Proportion of Unrecrystallized Ferrite % | Martensite Vol % | Residual Austenite Vol % | Average Grain Size of Carbonitrides including Ti and/or Nb nm |
| 1 | A | A1 | 89 | 18 | 0 | 0 | 7.5 |
| 2 | A | A1 | 86 | <u>71</u> | 0 | 0 | 8.6 |
| <u>3</u> | A | A2 | 88 | <u>7</u> | 0 | 0 | 22.5 |
| 4 | A | <u>A3</u> | 85 | 17 | 0 | 0 | 15.4 |
| <u>5</u> | B | <u>B1</u> | 90 | 35 | 0 | 0 | 16.3 |
| 6 | B | B2 | 92 | 35 | 1 | 0 | 10.7 |
| 7 | B | <u>B3</u> | 91 | 14 | 0 | 0 | <u>28.7</u> |
| <u>8</u> | C | <u>C1</u> | 82 | 12 | 0 | 0 | 8.7 |
| 9 | C | C1 | 89 | 59 | 1 | 0 | 8.3 |
| <u>10</u> | C | C1 | 83 | <u>8</u> | 0 | 0 | 8.6 |
| <u>11</u> | C | C2 | 90 | 11 | 0 | 0 | 7.5 |
| 12 | C | <u>C3</u> | 81 | 15 | 0 | 0 | 6.2 |
| <u>13</u> | D | <u>D1</u> | 83 | 20 | 0 | 1 | 8.3 |
| 14 | D | D2 | 88 | 29 | 0 | 0 | 12.5 |
| 15 | E | E1 | 91 | 26 | 0 | 0 | 14.4 |
| 16 | E | E2 | 90 | 15 | 0 | 0 | 8.7 |
| 17 | F | F1 | 81 | 18 | 0 | 0 | 8.0 |
| <u>18</u> | F | F1 | 81 | 16 | 0 | 0 | 8.8 |
| <u>19</u> | F | F1 | 82 | 23 | 0 | 4 | 10.9 |
| <u>20</u> | F | F2 | 83 | 29 | 0 | <u>0</u> | 8.6 |
| 21 | F | <u>F3</u> | 90 | 29 | 0 | 0 | 10.1 |
| <u>22</u> | G | <u>G1</u> | 83 | 22 | 1 | 0 | 9.6 |
| 23 | G | G2 | 92 | 11 | 0 | 0 | 10.9 |
| 24 | H | H1 | 89 | 24 | 0 | 0 | 6.1 |
| 25 | H | H2 | 86 | 13 | 0 | 0 | 6.9 |
| 26 | I | I1 | 82 | 35 | 0 | 0 | 16.6 |
| 27 | I | I2 | 86 | 30 | 0 | 0 | 8.6 |
| 28 | I | I3 | 86 | 43 | 0 | 0 | 9.6 |

| | ¼ Width | Properties of Steel Sheet ½ Width Portion | | | | | |
|---|---|---|---|---|---|---|---|
| Experiment Example | Portion Average Grain Size of Ferrite μm | Ferrite Vol % | Proportion of Unrecrystallized Ferrite % | Martensite Vol % | Residual Austenite | Average Grain Size of Carbonitrides including Ti and/or Nb nm | Average Grain Size of Ferrite μm |
| 1 | 7.6 | 87 | 20 | 0 | 0 | 8.1 | 8.2 |
| 2 | 6.2 | 87 | <u>73</u> | 0 | 0 | 8.9 | 6.7 |
| <u>3</u> | 6.9 | 85 | <u>8</u> | 0 | 0 | 23.7 | 7.8 |
| 4 | 9.7 | 86 | 19 | 0 | 0 | 16.2 | 8.4 |
| <u>5</u> | 6.5 | 95 | 36 | 0 | 0 | 16.3 | 6.5 |
| 6 | 5.3 | 96 | 35 | 1 | 0 | 11.8 | 5.6 |
| 7 | 6.8 | 96 | 14 | 0 | 0 | 31.7 | 7.7 |
| <u>8</u> | 8.6 | 87 | 13 | 0 | 0 | 9.5 | 8.7 |
| 9 | 6.7 | 86 | <u>65</u> | 1 | 0 | 8.4 | 6.3 |
| <u>10</u> | 9.0 | 87 | <u>9</u> | 0 | 0 | 9.5 | 9.5 |
| <u>11</u> | 10.5 | 87 | 11 | 0 | 0 | 8.1 | 10.6 |
| 12 | 10.1 | 86 | 16 | 0 | 0 | 6.9 | 10.6 |
| <u>13</u> | 8.6 | 87 | 20 | 0 | 1 | 8.4 | 8.6 |
| 14 | 9.3 | 88 | 30 | 0 | 0 | 13.6 | 9.9 |
| 15 | 12.4 | 93 | 28 | 0 | 0 | 15.2 | 13.0 |
| 16 | 11.7 | 94 | 12 | 0 | 0 | 9.2 | 11.9 |
| 17 | 7.1 | 86 | 17 | 0 | 0 | 7.0 | 7.0 |
| <u>18</u> | 7.9 | 86 | 14 | 0 | 0 | 8.9 | 8.0 |
| <u>19</u> | 6.9 | 87 | 19 | 0 | <u>4</u> | 10.9 | 7.5 |

TABLE 4-1-continued

| | | | | | | | |
|---|---|---|---|---|---|---|---|
| 20 | 9.5 | 86 | 30 | 0 | 0 | 9.4 | 10.3 |
| 21 | 6.8 | 87 | 31 | 0 | 0 | 11.0 | 6.9 |
| 22 | 6.7 | 90 | 25 | 1 | 0 | 9.8 | 7.2 |
| 23 | 6.2 | 90 | 13 | 0 | 0 | 11.4 | 6.3 |
| 24 | 9.0 | 81 | 26 | 0 | 0 | 6.8 | 9.3 |
| 25 | 7.9 | 82 | 10 | 0 | 0 | 7.3 | 8.3 |
| 26 | 7.2 | 85 | 42 | 0 | 0 | 17.1 | 7.6 |
| 27 | 9.2 | 83 | 29 | 0 | 0 | 9.1 | 8.9 |
| 28 | 10.5 | 85 | 50 | 0 | 0 | 10.1 | 11.1 |

The underline represents that the value is outside of the range of the present invention or is not preferable.

TABLE 4-2

| | | | Properties of Steel Sheet | | | | | |
|---|---|---|---|---|---|---|---|---|
| | | | | ¾ Width Portion | | | | |
| Experiment Example | Steel | Hot-Rolled Steel Sheet | Ferrite Vol % | Proportion of Unrecrystallized Ferrite % | Martensite Vol % | Residual Austenite Vol % | Average Grain Size of Carbonitrides including Ti and/or Nb nm | Average Grain Size of Ferrite μm |
| 1 | A | A1 | 85 | 22 | 0 | 0 | 9.1 | 8.3 |
| 2 | A | A1 | 83 | 49 | 0 | 0 | 11.2 | 5.9 |
| 3 | A | A2 | 81 | 11 | 0 | 0 | 31.6 | 6.9 |
| 4 | A | A3 | 97 | 20 | 0 | 0 | 18.4 | 7.9 |
| 5 | B | B1 | 93 | 46 | 0 | 0 | 19.8 | 7.7 |
| 6 | B | B2 | 95 | 26 | 1 | 0 | 14.1 | 5.8 |
| 7 | B | B3 | 95 | 22 | 0 | 0 | 42.8 | 7.8 |
| 8 | C | C1 | 85 | 16 | 0 | 0 | 10.3 | 8.1 |
| 9 | C | C1 | 87 | 47 | 1 | 0 | 10.7 | 5.8 |
| 10 | C | C1 | 93 | 24 | 0 | 0 | 10.1 | 9.6 |
| 11 | C | C2 | 91 | 14 | 0 | 0 | 9.1 | 9.2 |
| 12 | C | C3 | 94 | 22 | 0 | 0 | 8.8 | 9.9 |
| 13 | D | D1 | 84 | 25 | 0 | 1 | 10.8 | 9.8 |
| 14 | D | D2 | 84 | 38 | 0 | 0 | 15.0 | 10.3 |
| 15 | E | E1 | 91 | 31 | 0 | 0 | 18.6 | 13.7 |
| 16 | E | E2 | 94 | 20 | 0 | 0 | 11.5 | 11.1 |
| 17 | F | F1 | 82 | 21 | 0 | 0 | 6.6 | 6.0 |
| 18 | F | F1 | 85 | 30 | 0 | 0 | 11.1 | 10.0 |
| 19 | F | F1 | 80 | 17 | 0 | 4 | 13.5 | 8.1 |
| 20 | F | F2 | 91 | 23 | 0 | 0 | 10.8 | 10.3 |
| 21 | F | F3 | 90 | 32 | 0 | 0 | 18.1 | 8.5 |
| 22 | G | G1 | 83 | 19 | 1 | 0 | 13.3 | 7.4 |
| 23 | G | G2 | 92 | 17 | 0 | 0 | 13.9 | 6.9 |
| 24 | H | H1 | 88 | 28 | 0 | 0 | 7.3 | 10.2 |
| 25 | H | H2 | 86 | 18 | 0 | 0 | 9.2 | 8.6 |
| 26 | I | I1 | 85 | 44 | 0 | 0 | 21.8 | 7.6 |
| 27 | I | I2 | 86 | 35 | 0 | 0 | 10.8 | 8.3 |
| 28 | I | I3 | 80 | 56 | 0 | 0 | 12.4 | 11.5 |

| | | | | | Properties of Steel Sheet | | |
|---|---|---|---|---|---|---|---|
| Experiment Example | Left Side of Expression (2) | Left Side of Expression (3) | Left Side of Expression (4) | Left Side of Expression (5) | Plated Layer | Fe Content in Plated Layer mass % | Note |
| 1 | 0.05 | 0.09 | 4 | 0.19 | | | Example |
| 2 | 0.05 | 0.13 | 24 | 0.27 | | | Comparative Example |
| 3 | 0.08 | 0.13 | 4 | 0.35 | | | Example |
| 4 | 0.13 | 0.21 | 3 | 0.18 | | | Comparative Example |
| 5 | 0.05 | 0.17 | 11 | 0.20 | GA | 10.3 | Example |
| 6 | 0.04 | 0.09 | 9 | 0.28 | | | Example |
| 7 | 0.05 | 0.13 | 8 | 0.41 | | | Comparative Example |
| 8 | 0.06 | 0.07 | 4 | 0.17 | | | Example |
| 9 | 0.03 | 0.14 | 18 | 0.26 | | | Comparative Example |
| 10 | 0.11 | 0.06 | 16 | 0.16 | | | Comparative Example |
| 11 | 0.04 | 0.14 | 3 | 0.19 | GA | 8.7 | Example |
| 12 | 0.15 | 0.07 | 7 | 0.36 | | | Comparative Example |
| 13 | 0.05 | 0.13 | 5 | 0.27 | GA | 12.6 | Example |
| 14 | 0.05 | 0.10 | 9 | 0.18 | | | Example |
| 15 | 0.02 | 0.10 | 5 | 0.26 | GI | 0.4 | Example |
| 16 | 0.04 | 0.07 | 8 | 0.29 | | | Example |

TABLE 4-2-continued

| 17 | 0.06 | 0.16 | 4 | 0.19 | | | Example |
|---|---|---|---|---|---|---|---|
| 18 | 0.06 | 0.24 | 16 | 0.24 | | | Comparative Example |
| 19 | 0.08 | 0.16 | 6 | 0.22 | | | Comparative Example |
| 20 | 0.09 | 0.08 | 7 | 0.23 | Zn Plated | 4.2 | Example |
| 21 | 0.03 | 0.23 | 3 | 0.61 | | | Comparative Example |
| 22 | 0.08 | 0.10 | 6 | 0.34 | | | Example |
| 23 | 0.02 | 0.11 | 6 | 0.25 | | | Example |
| 24 | 0.09 | 0.13 | 4 | 0.18 | GI | 1.8 | Example |
| 25 | 0.05 | 0.08 | 8 | 0.29 | | | Example |
| 26 | 0.04 | 0.05 | 9 | 0.28 | | | Example |
| 27 | 0.04 | 0.10 | 6 | 0.23 | | | Example |
| 28 | 0.07 | 0.09 | 13 | 0.26 | | | Example |

The underline represents that the value is outside of the range of the present invention or is not preferable.

TABLE 4-3

| | | | Properties of Steel Sheet | | | | |
|---|---|---|---|---|---|---|---|
| | | | ¼ Width Portion | | | | |
| Experiment Example | Steel | Hot-Rolled Steel Sheet | Ferrite Vol % | Proportion of Unrecrystallized Ferrite % | Martensite Vol % | Residual Austenite Vol % | Average Grain Size of Carbonitrides including Ti and/or Nb nm |
| 29 | J | J1 | 90 | 30 | 0 | 0 | 7.7 |
| 30 | J | J2 | 90 | 43 | 1 | 0 | 10.1 |
| 31 | K | K1 | 92 | 40 | 0 | 1 | 11.1 |
| 32 | K | K1 | 81 | 28 | 0 | 0 | 8.8 |
| 33 | K | K2 | 92 | 52 | 0 | 0 | 8.6 |
| 34 | K | K3 | 92 | 33 | 0 | 0 | 9.8 |
| 35 | L | L1 | 87 | 6 | 1 | 0 | 12.1 |
| 36 | L | L2 | 83 | 54 | 0 | 0 | 8.8 |
| 37 | L | L2 | 87 | 27 | 3 | 0 | 7.4 |
| 38 | L | L3 | 95 | 12 | 0 | 0 | 9.0 |
| 39 | M | M1 | 82 | 20 | 0 | 0 | 14.2 |
| 40 | M | M2 | 86 | 24 | 0 | 0 | 10.5 |
| 41 | M | M3 | 84 | 22 | 0 | 0 | 9.7 |
| 42 | N | N1 | 87 | 49 | 0 | 0 | 8.0 |
| 43 | N | N2 | 89 | 26 | 1 | 0 | 7.2 |
| 44 | O | O1 | 87 | 55 | 0 | 0 | 7.6 |
| 45 | O | O2 | 89 | 25 | 0 | 0 | 9.2 |
| 46 | O | O2 | 76 | 0 | 0 | 0 | 8.3 |
| 47 | O | O3 | 87 | 51 | 0 | 0 | 8.0 |
| 48 | P | P1 | 85 | 20 | 0 | 0 | 9.8 |
| 49 | P | P1 | 82 | 4 | 0 | 0 | 8.6 |
| 50 | P | P1 | 81 | 22 | 5 | 0 | 7.9 |
| 51 | P | P2 | 86 | 23 | 1 | 0 | 8.3 |
| 52 | Q | Q1 | 93 | 36 | 0 | 0 | 11.7 |
| 53 | Q | Q2 | 89 | 17 | 0 | 0 | 9.0 |
| 54 | R | R1 | 89 | 20 | 0 | 0 | 7.1 |
| 55 | R | R2 | 83 | 19 | 0 | 0 | 6.4 |
| 56 | S | S1 | 85 | 14 | 0 | 0 | 16.9 |

| | Properties of Steel Sheet | | | | | | |
|---|---|---|---|---|---|---|---|
| | ¼ Width | ½ Width Portion | | | | | |
| Experiment Example | ¼ Width Portion Average Grain Size of Ferrite μm | Ferrite Vol % | Proportion of Unrecrystallized Ferrite % | Martensite Vol % | Residual Austenite Vol % | Average Grain Size of Carbonitrides including Ti and/or Nb nm | Average Grain Size of Ferrite μm |
| 29 | 9.2 | 93 | 32 | 0 | 0 | 8.0 | 9.7 |
| 30 | 11.7 | 91 | 46 | 1 | 0 | 10.8 | 12.1 |
| 31 | 5.8 | 94 | 44 | 0 | 1 | 11.5 | 5.9 |
| 32 | 8.4 | 94 | 30 | 0 | 0 | 9.7 | 9.2 |
| 33 | 8.5 | 93 | 57 | 0 | 0 | 9.5 | 8.5 |
| 34 | 6.9 | 94 | 33 | 0 | 0 | 10.3 | 7.4 |
| 35 | 9.0 | 80 | 7 | 1 | 0 | 12.3 | 9.1 |
| 36 | 9.9 | 85 | 55 | 0 | 0 | 9.1 | 10.7 |
| 37 | 8.2 | 84 | 29 | 3 | 0 | 7.4 | 8.9 |

TABLE 4-3-continued

| | | | | | | | |
|---|---|---|---|---|---|---|---|
| 38 | 5.3 | 84 | 13 | 0 | 0 | 10.0 | 5.6 |
| 39 | 9.3 | 83 | 21 | 0 | 0 | 14.5 | 9.5 |
| 40 | 7.9 | 87 | 26 | 0 | 0 | 10.9 | 8.4 |
| 41 | 7.7 | 85 | 23 | 0 | 0 | 10.3 | 7.9 |
| 42 | 7.8 | 90 | 51 | 0 | 0 | 6.6 | 7.4 |
| 43 | 6.3 | 91 | 21 | 1 | 0 | 7.5 | 6.9 |
| 44 | 5.8 | 90 | 57 | 0 | 0 | 8.4 | 6.1 |
| 45 | 6.3 | 90 | 27 | 0 | 0 | 9.5 | 6.5 |
| 46 | 12.2 | 71 | 0 | 0 | 0 | 8.4 | 13.0 |
| 47 | 12.8 | 91 | 66 | 0 | 0 | 4.9 | 12.8 |
| 48 | 7.7 | 85 | 21 | 0 | 0 | 10.4 | 7.8 |
| 49 | 9.0 | 87 | 2 | 0 | 0 | 9.1 | 9.4 |
| 50 | 9.1 | 84 | 23 | 6 | 0 | 7.9 | 9.3 |
| 51 | 10.0 | 84 | 25 | 1 | 0 | 9.2 | 10.6 |
| 52 | 6.8 | 90 | 39 | 0 | 0 | 11.8 | 7.6 |
| 53 | 7.6 | 88 | 19 | 0 | 0 | 10.0 | 7.7 |
| 54 | 9.5 | 91 | 26 | 0 | 0 | 7.4 | 9.5 |
| 55 | 9.8 | 89 | 20 | 0 | 0 | 6.8 | 10.4 |
| 56 | 10.4 | 87 | 16 | 0 | 0 | 17.0 | 10.8 |

The underline represents that the value is outside of the range of the present invention or is not preferable.

TABLE 4-4

| | | | Properties of Steel Sheet ¾ Width Portion | | | | | |
|---|---|---|---|---|---|---|---|---|
| Experiment Example | Steel | Hot-Rolled Steel Sheet | Ferrite Vol % | Proportion of Unrecrystallized Ferrite % | Martensite Vol % | Residual Austenite Vol % | Average Grain Size of Carbonitrides including Ti and/or Nb nm | Average Grain Size of Ferrite μm |
| 29 | J | J1 | 91 | 37 | 0 | 0 | 9.7 | 9.7 |
| 30 | J | J2 | 90 | 30 | 1 | 0 | 13.9 | 12.8 |
| 31 | K | K1 | 92 | 51 | 0 | 1 | 15.0 | 6.5 |
| 32 | K | K1 | 81 | 35 | 0 | 0 | 11.0 | 9.7 |
| 33 | K | K2 | 89 | 39 | 0 | 0 | 10.8 | 9.6 |
| 34 | K | K3 | 92 | 39 | 0 | 0 | 11.7 | 8.6 |
| 35 | L | L1 | 81 | 10 | 1 | 0 | 16.6 | 10.4 |
| 36 | L | L2 | 84 | 36 | 0 | 0 | 10.7 | 10.7 |
| 37 | L | L2 | 87 | 32 | 3 | 0 | 9.2 | 9.0 |
| 38 | L | L3 | 99 | 34 | 0 | 0 | 15.0 | 5.9 |
| 39 | M | M1 | 86 | 24 | 0 | 0 | 18.3 | 10.2 |
| 40 | M | M2 | 89 | 32 | 0 | 0 | 13.1 | 9.2 |
| 41 | M | M3 | 92 | 27 | 0 | 0 | 12.0 | 6.1 |
| 42 | N | N1 | 91 | 37 | 0 | 0 | 6.4 | 7.1 |
| 43 | N | N2 | 87 | 20 | 1 | 0 | 10.5 | 7.1 |
| 44 | O | O1 | 82 | 44 | 0 | 0 | 9.7 | 6.4 |
| 45 | O | O2 | 93 | 31 | 0 | 0 | 11.0 | 7.5 |
| 46 | O | O2 | 77 | 0 | 0 | 0 | 9.8 | 13.2 |
| 47 | P | O3 | 89 | 78 | 0 | 0 | 8.7 | 13.7 |
| 48 | P | P1 | 89 | 25 | 0 | 0 | 13.9 | 9.3 |
| 49 | P | P1 | 85 | 3 | 0 | 0 | 11.1 | 9.7 |
| 50 | P | P1 | 84 | 31 | 5 | 0 | 11.4 | 9.9 |
| 51 | P | P2 | 88 | 29 | 1 | 0 | 10.2 | 10.5 |
| 52 | Q | Q1 | 92 | 32 | 0 | 0 | 16.2 | 7.6 |
| 53 | Q | Q2 | 90 | 14 | 0 | 0 | 13.8 | 8.7 |
| 54 | R | R1 | 91 | 31 | 0 | 0 | 8.8 | 10.4 |
| 55 | R | R2 | 87 | 12 | 0 | 0 | 7.9 | 10.3 |
| 56 | S | S1 | 89 | 13 | 0 | 0 | 20.7 | 11.0 |

| | Properties of Steel Sheet | | | | | | |
|---|---|---|---|---|---|---|---|
| Experiment Example | Left Side of Expression (2) | Left Side of Expression (3) | Left Side of Expression (4) | Left Side of Expression (5) | Plated Layer | Fe Content in Plated Layer mass % | Note |
| 29 | 0.03 | 0.05 | 7 | 0.24 | | | Example |
| 30 | 0.01 | 0.09 | 16 | 0.33 | GA | 8.2 | Example |
| 31 | 0.02 | 0.12 | 11 | 0.31 | | | Example |
| 32 | 0.15 | 0.14 | 7 | 0.22 | | | Comparative Example |
| 33 | 0.04 | 0.12 | 18 | 0.23 | | | Example |
| 34 | 0.02 | 0.22 | 6 | 0.18 | | | Comparative Example |
| 35 | 0.08 | 0.15 | 4 | 0.33 | | | Example |

TABLE 4-4-continued

| | | | | | | | |
|---|---|---|---|---|---|---|---|
| 36 | 0.02 | 0.08 | 19 | 0.20 | | | Example |
| 37 | 0.03 | 0.09 | 5 | 0.23 | | | Comparative Example |
| 38 | 0.16 | 0.11 | 22 | 0.53 | | | Comparative Example |
| 39 | 0.05 | 0.09 | 4 | 0.26 | GA | 11.6 | Example |
| 40 | 0.03 | 0.15 | 8 | 0.23 | GA | 9.7 | Example |
| 41 | 0.09 | 0.25 | 5 | 0.22 | | | Comparative Example |
| 42 | 0.04 | 0.09 | 14 | 0.23 | | | Example |
| 43 | 0.04 | 0.12 | 6 | 0.39 | GI | 0.9 | Example |
| 44 | 0.09 | 0.10 | 13 | 0.25 | | | Example |
| 45 | 0.04 | 0.18 | 6 | 0.18 | GI | 2.4 | Example |
| 46 | 0.08 | 0.08 | 0 | 0.17 | | | Comparative Example |
| 47 | 0.04 | 0.07 | 27 | 0.53 | | | Comparative Example |
| 48 | 0.05 | 0.19 | 5 | 0.36 | Alloy Galvannealed | 11.5 | Example |
| 49 | 0.06 | 0.07 | 2 | 0.26 | | | Comparative Example |
| 50 | 0.04 | 0.08 | 9 | 0.39 | | | Comparative Example |
| 51 | 0.05 | 0.06 | 6 | 0.21 | | | Example |
| 52 | 0.03 | 0.11 | 7 | 0.34 | Alloy Galvannealed | 9.2 | Example |
| 53 | 0.02 | 0.14 | 5 | 0.44 | | | Example |
| 54 | 0.02 | 0.09 | 11 | 0.22 | EG | | Example |
| 55 | 0.07 | 0.06 | 8 | 0.21 | | | Example |
| 56 | 0.05 | 0.06 | 3 | 0.21 | | | Example |

The underline represents that the value is outside of the range of the present invention or is not preferable.

TABLE 4-5

| | | | | Properties of Steel Sheet 1/4 Width Portion | | | |
|---|---|---|---|---|---|---|---|
| Experiment Example | Steel | Hot-Rolled Steel Sheet | Ferrite Vol % | Proportion of Unrecrystallized Ferrite % | Martensite Vol % | Residual Austenite Vol % | Average Grain Size of Carbonitrides including Ti and/or Nb nm |
| 57 | S | S2 | 87 | 39 | 0 | 0 | 10.0 |
| 59 | T | T1 | 97 | 33 | 0 | 0 | 9.6 |
| 60 | T | T2 | 94 | 39 | 0 | 0 | 18.8 |
| 61 | T | T3 | 91 | 55 | 0 | 0 | 7.4 |
| 62 | U | U1 | 84 | 27 | 0 | 0 | 9.9 |
| 63 | U | U2 | 83 | 47 | 0 | 0 | 11.6 |
| 64 | V | V1 | 82 | 30 | 1 | 0 | 8.5 |
| 65 | V | V2 | 82 | 8 | 0 | 0 | 7.1 |
| 66 | W | W1 | 91 | 26 | 1 | 0 | 7.5 |
| 67 | W | W2 | 86 | 24 | 0 | 0 | 16.9 |
| 68 | X | X1 | 80 | 14 | 0 | 1 | 6.4 |
| 69 | X | X1 | 81 | 75 | 0 | 0 | 8.2 |
| 70 | X | X2 | 85 | 12 | 0 | 0 | 10.3 |
| 71 | X | X3 | 93 | 37 | 4 | 0 | 6.4 |
| 72 | Y | Y1 | 88 | 19 | 0 | 0 | 11.1 |
| 74 | Z | Z1 | 86 | 27 | 1 | 1 | 8.3 |
| 75 | Z | Z2 | 89 | 11 | 0 | 0 | 9.1 |
| 76 | Z | Z3 | 89 | 15 | 0 | 0 | 5.3 |
| 77 | AA | AA | 87 | 0 | 0 | 0 | 8.8 |
| 78 | AB | AB | 94 | 78 | 0 | 0 | 11.8 |
| 79 | AC | AC | 88 | 66 | 0 | 0 | 9.1 |
| 80 | AD | AD | 85 | 57 | 0 | 0 | 9.1 |
| 81 | AE | AE | 98 | 36 | 0 | 0 | 7.9 |
| 82 | AF | AF | 75 | 21 | 0 | 0 | 9.1 |
| 83 | AG | AG | 87 | 0 | 1 | 0 | — |
| 84 | AH | AH | 93 | 18 | 0 | 0 | 7.5 |

| | Properties of Steel Sheet | | | | | | |
|---|---|---|---|---|---|---|---|
| | 1/4 Width | 1/2 Width Portion | | | | | |
| Experiment Example | Portion Average Grain Size of Ferrite μm | Ferrite Vol % | Proportion of Unrecrystallized Ferrite % | Martensite Vol % | Residual Austenite Vol % | Average Grain Size of Carbonitrides including Ti and/or Nb nm | Average Grain Size of Ferrite μm |
| 57 | 6.8 | 88 | 43 | 0 | 0 | 10.5 | 7.5 |
| 59 | 5.1 | 96 | 34 | 0 | 0 | 10.5 | 5.2 |

TABLE 4-5-continued

| | | | | | | | |
|---|---|---|---|---|---|---|---|
| 60 | 5.1 | 96 | 43 | 0 | 0 | 19.1 | 5.3 |
| 61 | 13.1 | 95 | 58 | 0 | 0 | 7.7 | 16.8 |
| 62 | 9.8 | 86 | 28 | 0 | 0 | 10.7 | 10.6 |
| 63 | 10.0 | 87 | 48 | 0 | 0 | 11.8 | 10.7 |
| 64 | 11.9 | 84 | 32 | 1 | 0 | 9.4 | 12.4 |
| 65 | 15.0 | 84 | 9 | 0 | 0 | 7.3 | 16.3 |
| 66 | 7.8 | 90 | 29 | 1 | 0 | 6.4 | 8.1 |
| 67 | 9.9 | 90 | 26 | 0 | 0 | 17.7 | 10.4 |
| 68 | 9.5 | 85 | 15 | 0 | 1 | 6.4 | 9.8 |
| 69 | 14.8 | 85 | 78 | 0 | 0 | 9.0 | 15.9 |
| 70 | 9.1 | 87 | 13 | 0 | 0 | 11.0 | 9.7 |
| 71 | 8.9 | 87 | 39 | 4 | 0 | 6.6 | 9.8 |
| 72 | 8.6 | 90 | 17 | 0 | 0 | 11.4 | 8.9 |
| 74 | 10.9 | 92 | 28 | 1 | 1 | 7.6 | 11.5 |
| 75 | 10.5 | 90 | 12 | 0 | 0 | 9.4 | 10.7 |
| 76 | 10.5 | 92 | 16 | 0 | 0 | 5.5 | 11.0 |
| 77 | 11.9 | 86 | 0 | 0 | 0 | 9.3 | 12.1 |
| 78 | 6.0 | 95 | 82 | 0 | 0 | 12.7 | 5.9 |
| 79 | 6.2 | 90 | 71 | 0 | 0 | 9.6 | 6.8 |
| 80 | 8.9 | 91 | 62 | 0 | 0 | 7.5 | 9.1 |
| 81 | 8.3 | 100 | 38 | 0 | 0 | 8.6 | 8.9 |
| 82 | 5.8 | 74 | 22 | 0 | 0 | 10.0 | 6.4 |
| 83 | 13.1 | 90 | 0 | 1 | 0 | — | 14.2 |
| 84 | 5.9 | 98 | 5 | 0 | 0 | 8.1 | 6.4 |

The underline represents that the value is outside of the range of the present invention or is not preferable.

TABLE 4-6

| | | | | Properties of Steel Sheet | | | | |
|---|---|---|---|---|---|---|---|---|
| | | | | ¾ Width Portion | | | | |
| Experiment Example | Steel | Hot-Rolled Steel Sheet | Ferrite Vol % | Proportion of Unrecrystallized Ferrite % | Martensite Vol % | Residual Austenite Vol % | Average Grain Size of Carbonitrides including Ti and/or Nb nm | Average Grain Size of Ferrite µm |
| 57 | S | S2 | 89 | 52 | 0 | 0 | 13.4 | 7.7 |
| 59 | T | T1 | 95 | 43 | 0 | 0 | 10.9 | 6.0 |
| 60 | T | T2 | 97 | 33 | 0 | 0 | 28.5 | 5.9 |
| 61 | T | T3 | 95 | 41 | 0 | 0 | 10.3 | 16.1 |
| 62 | U | U1 | 82 | 34 | 0 | 0 | 12.2 | 10.7 |
| 63 | U | U2 | 84 | 39 | 0 | 0 | 13.4 | 10.7 |
| 64 | V | V1 | 88 | 37 | 1 | 0 | 11.6 | 12.5 |
| 65 | V | V2 | 83 | 14 | 0 | 0 | 8.7 | 15.9 |
| 66 | W | W1 | 87 | 17 | 1 | 0 | 6.2 | 8.6 |
| 67 | W | W2 | 83 | 33 | 0 | 0 | 20.2 | 10.6 |
| 68 | X | X1 | 86 | 19 | 0 | 1 | 7.7 | 10.8 |
| 69 | X | X1 | 86 | 63 | 0 | 0 | 11.3 | 15.9 |
| 70 | X | X2 | 82 | 19 | 0 | 0 | 12.3 | 9.9 |
| 71 | X | X3 | 83 | 45 | 4 | 0 | 8.3 | 9.9 |
| 72 | Y | Y1 | 85 | 25 | 0 | 0 | 15.5 | 9.4 |
| 74 | Z | Z1 | 85 | 37 | 1 | 1 | 6.9 | 11.7 |
| 75 | Z | Z2 | 88 | 16 | 0 | 0 | 11.7 | 11.0 |
| 76 | Z | Z3 | 91 | 24 | 0 | 0 | 8.9 | 11.0 |
| 77 | AA | AA | 89 | 3 | 0 | 0 | 10.2 | 12.4 |
| 78 | AB | AB | 93 | 54 | 0 | 0 | 18.2 | 7.0 |
| 79 | AC | AC | 87 | 55 | 0 | 0 | 11.6 | 7.3 |
| 80 | AD | AD | 90 | 45 | 0 | 0 | 7.1 | 9.6 |
| 81 | AE | AE | 99 | 29 | 0 | 0 | 9.8 | 9.0 |
| 82 | AF | AF | 73 | 19 | 0 | 0 | 12.7 | 6.8 |
| 83 | AG | AG | 86 | 0 | 1 | 0 | — | 14.5 |
| 84 | AH | AH | 97 | 31 | 0 | 0 | 12.2 | 7.4 |

| | | | Properties of Steel Sheet | | | | |
|---|---|---|---|---|---|---|---|
| Experiment Example | Left Side of Expression (2) | Left Side of Expression (3) | Left Side of Expression (4) | Left Side of Expression (5) | Plated Layer | Fe Content in Plated Layer mass % | Note |
| 57 | 0.02 | 0.12 | 13 | 0.30 | Deposit | | Example |
| 59 | 0.02 | 0.17 | 10 | 0.13 | | | Example |
| 60 | 0.03 | 0.15 | 10 | 0.44 | | | Example |

TABLE 4-6-continued

| 61 | 0.04 | 0.24 | 17 | 0.34 | | | Comparative Example |
|---|---|---|---|---|---|---|---|
| 62 | 0.05 | 0.09 | 7 | 0.21 | GI | 0.1 | Example |
| 63 | 0.05 | 0.07 | 9 | 0.15 | | | Example |
| 64 | 0.07 | 0.05 | 7 | 0.32 | | | Example |
| 65 | 0.02 | 0.08 | 6 | 0.21 | | | Example |
| 66 | 0.04 | 0.10 | 12 | 0.19 | | | Example |
| 67 | 0.08 | 0.07 | 9 | 0.18 | EG | | Example |
| 68 | 0.07 | 0.13 | 5 | 0.19 | | | Example |
| 69 | 0.06 | 0.07 | 15 | 0.33 | | | Comparative Example |
| 70 | 0.06 | 0.08 | 7 | 0.18 | Zn Plated | 33 | Example |
| 71 | 0.11 | 0.10 | 8 | 0.27 | | | Comparative Example |
| 72 | 0.06 | 0.09 | 8 | 0.35 | | | Example |
| 74 | 0.08 | 0.07 | 10 | 0.18 | | | Example |
| 75 | 0.02 | 0.05 | 5 | 0.26 | | | Example |
| 76 | 0.03 | 0.05 | 9 | 0.55 | | | Comparative Example |
| 77 | 0.03 | 0.04 | 3 | 0.15 | | | Comparative Example |
| 78 | 0.02 | 0.17 | 28 | 0.45 | | | Comparative Example |
| 79 | 0.03 | 0.16 | 16 | 0.25 | | | Comparative Example |
| 80 | 0.07 | 0.08 | 17 | 0.25 | | | Comparative Example |
| 81 | 0.02 | 0.08 | 9 | 0.22 | | | Comparative Example |
| 82 | 0.03 | 0.16 | 3 | 0.34 | | | Comparative Example |
| 83 | 0.05 | 0.10 | 0 | — | | | Comparative Example |
| 84 | 0.05 | 0.23 | 26 | 0.51 | | | Comparative Example |

The underline represents that the value is outside of the range of the present invention or is not preferable.

TABLE 5-1

| Experiment Example | Steel | Hot-Rolled Steel Sheet | Properties | | | | | | | |
|---|---|---|---|---|---|---|---|---|---|---|
| | | | YS MPa | TS MPa | YR | uEl % | $\Delta_{YS}$/YS | $\Delta_{uEl}$/uEl | $\alpha_M$/90 | Note |
| 1 | A | A1 | 338 | 603 | 0.56 | 16.2 | 0.09 | 0.17 | 0.98 | Example |
| 2 | A | A1 | 604 | 689 | 0.88 | 8.2 | 0.21 | 0.40 | 1.14 | Comparative Example |
| 3 | A | A2 | 293 | 545 | 0.54 | 19.7 | 0.16 | 0.16 | 1.02 | Example |
| 4 | A | A3 | 309 | 604 | 0.51 | 14.1 | 0.22 | 0.26 | 1.12 | Comparative Example |
| 5 | B | B1 | 393 | 572 | 0.69 | 16.8 | 0.13 | 0.14 | 1.04 | Example |
| 6 | B | B2 | 403 | 604 | 0.67 | 14.9 | 0.12 | 0.17 | 1.01 | Example |
| 7 | B | B3 | 261 | 483 | 0.54 | 19.7 | 0.22 | 0.03 | 1.11 | Comparative Example |
| 8 | C | C1 | 292 | 541 | 0.54 | 16.5 | 0.12 | 0.17 | 1.06 | Example |
| 9 | C | C1 | 609 | 686 | 0.89 | 10.9 | 0.09 | 0.22 | 1.12 | Comparative Example |
| 10 | C | C1 | 348 | 563 | 0.62 | 18.6 | 0.25 | 0.27 | 0.88 | Comparative Example |
| 11 | C | C2 | 326 | 594 | 0.55 | 20.0 | 0.11 | 0.14 | 0.94 | Example |
| 12 | C | C3 | 301 | 565 | 0.53 | 18.3 | 0.20 | 0.27 | 1.16 | Comparative Example |
| 13 | D | D1 | 462 | 772 | 0.60 | 14.6 | 0.10 | 0.08 | 0.97 | Example |
| 14 | D | D2 | 450 | 701 | 0.64 | 13.2 | 0.12 | 0.15 | 1.01 | Example |
| 15 | E | E1 | 312 | 534 | 0.58 | 20.1 | 0.08 | 0.18 | 1.02 | Example |
| 16 | E | E2 | 324 | 505 | 0.64 | 19.4 | 0.13 | 0.07 | 1.01 | Example |
| 17 | F | F1 | 383 | 701 | 0.55 | 17.7 | 0.13 | 0.21 | 1.02 | Example |
| 18 | F | F1 | 351 | 674 | 0.52 | 16.1 | 0.23 | 0.12 | 0.89 | Comparative Example |
| 19 | F | F1 | 274 | 611 | 0.45 | 22.2 | 0.15 | 0.16 | 0.91 | Comparative Example |
| 20 | F | F2 | 421 | 689 | 0.61 | 12.2 | 0.18 | 0.20 | 1.02 | Example |
| 21 | F | F3 | 407 | 712 | 0.57 | 15.0 | 0.22 | 0.09 | 1.12 | Comparative Example |
| 22 | G | G1 | 370 | 616 | 0.60 | 14.7 | 0.19 | 0.06 | 0.97 | Example |
| 23 | G | G2 | 308 | 582 | 0.53 | 20.1 | 0.08 | 0.14 | 0.95 | Example |
| 24 | H | H1 | 411 | 721 | 0.57 | 12.3 | 0.14 | 0.17 | 1.04 | Example |
| 25 | H | H2 | 336 | 638 | 0.53 | 14.0 | 0.15 | 0.05 | 1.01 | Example |
| 26 | I | I1 | 450 | 714 | 0.63 | 12.2 | 0.09 | 0.14 | 1.03 | Example |
| 27 | I | I2 | 414 | 703 | 0.59 | 12.7 | 0.08 | 0.06 | 1.05 | Example |
| 28 | I | I3 | 526 | 674 | 0.78 | 13.5 | 0.11 | 0.20 | 1.01 | Example |
| 29 | J | J1 | 358 | 580 | 0.62 | 18.7 | 0.10 | 0.09 | 1 | Example |
| 30 | J | J2 | 435 | 604 | 0.72 | 13.2 | 0.11 | 0.06 | 0.98 | Example |

The underline represents that the value is outside of the range of the present invention or is not preferable.

TABLE 5-2

| Experiment Example | Steel | Hot-Rolled Steel Sheet | YS MPa | TS MPa | YR | uEl % | $\Delta_{YS}/$ YS | $\Delta_{uEl}/$ uEl | $\alpha_M/90$ | Note |
|---|---|---|---|---|---|---|---|---|---|---|
| 31 | K | K1 | 431 | 647 | 0.67 | 16.6 | 0.07 | 0.14 | 1.02 | Example |
| 32 | K | K1 | 417 | 598 | 0.70 | 17.0 | 0.15 | 0.26 | 1.16 | Comparative Example |
| 33 | K | K2 | 513 | 647 | 0.79 | 11.8 | 0.13 | 0.21 | 1 | Example |
| 34 | K | K3 | 400 | 591 | 0.68 | 19.9 | 0.21 | 0.17 | 1.16 | Comparative Example |
| 35 | L | L1 | 302 | 566 | 0.53 | 15.6 | 0.16 | 0.15 | 0.99 | Example |
| 36 | L | L2 | 486 | 657 | 0.74 | 11.6 | 0.13 | 0.12 | 0.98 | Example |
| 37 | L | L2 | 266 | 662 | 0.40 | 16.7 | 0.12 | 0.22 | 1.08 | Comparative Example |
| 38 | L | L3 | 324 | 637 | 0.51 | 14.6 | 0.31 | 0.26 | 1.14 | Comparative Example |
| 39 | M | M1 | 357 | 598 | 0.60 | 13.0 | 0.13 | 0.00 | 1.09 | Example |
| 40 | M | M2 | 358 | 606 | 0.59 | 16.6 | 0.14 | 0.06 | 0.91 | Example |
| 41 | M | M3 | 338 | 618 | 0.55 | 13.6 | 0.22 | 0.17 | 1.12 | Comparative Example |
| 42 | N | N1 | 470 | 650 | 0.72 | 13.2 | 0.15 | 0.09 | 1.04 | Example |
| 43 | N | N2 | 343 | 593 | 0.58 | 17.8 | 0.14 | 0.19 | 1.02 | Example |
| 44 | O | O1 | 561 | 695 | 0.81 | 12.1 | 0.17 | 0.15 | 1.03 | Example |
| 45 | O | O2 | 365 | 681 | 0.54 | 18.5 | 0.10 | 0.17 | 0.98 | Example |
| 46 | O | O2 | 363 | 647 | 0.56 | 9.4 | 0.11 | 0.15 | 1.09 | Comparative Example |
| 47 | O | O3 | 638 | 697 | 0.92 | 9.9 | 0.23 | 0.35 | 1.13 | Comparative Example |
| 48 | P | P1 | 318 | 629 | 0.51 | 14.8 | 0.14 | 0.11 | 1.03 | Example |
| 49 | P | P1 | 238 | 620 | 0.38 | 14.5 | 0.14 | 0.04 | 0.92 | Comparative Example |
| 50 | P | P1 | 258 | 731 | 0.35 | 12.4 | 0.19 | 0.15 | 1.09 | Comparative Example |
| 51 | P | P2 | 350 | 641 | 0.55 | 12.8 | 0.14 | 0.10 | 0.98 | Example |
| 52 | Q | Q1 | 418 | 654 | 0.64 | 16.9 | 0.10 | 0.18 | 1.05 | Example |
| 53 | Q | Q2 | 330 | 619 | 0.53 | 15.9 | 0.09 | 0.10 | 0.99 | Example |
| 54 | R | R1 | 340 | 587 | 0.58 | 14.8 | 0.13 | 0.11 | 1.05 | Example |
| 55 | R | R2 | 312 | 596 | 0.52 | 17.4 | 0.14 | 0.15 | 1.05 | Example |
| 56 | S | S1 | 383 | 672 | 0.57 | 17.0 | 0.10 | 0.12 | 1 | Example |
| 57 | S | S2 | 517 | 695 | 0.74 | 15.1 | 0.07 | 0.17 | 1.02 | Example |
| 59 | T | T1 | 456 | 686 | 0.66 | 18.8 | 0.11 | 0.19 | 1 | Example |
| 60 | T | T2 | 479 | 661 | 0.72 | 14.4 | 0.11 | 0.14 | 1.04 | Example |

The underline represents that the value is outside of the range of the present invention or is not preferable.

40

TABLE 5-3

| Experiment Example | Steel | Hot-Rolled Steel Sheet | YS MPa | TS MPa | YR | uEl % | $\Delta_{YS}/$ YS | $\Delta_{uEl}/$ uEl | $\alpha_M/90$ | Note |
|---|---|---|---|---|---|---|---|---|---|---|
| 61 | T | T3 | 516 | 698 | 0.74 | 15.2 | 0.23 | 0.20 | 1.11 | Comparative Example |
| 62 | U | U1 | 406 | 666 | 0.61 | 12.3 | 0.09 | 0.10 | 1 | Example |
| 63 | U | U2 | 473 | 673 | 0.70 | 14.3 | 0.15 | 0.19 | 1.01 | Example |
| 64 | V | V1 | 409 | 669 | 0.61 | 14.8 | 0.12 | 0.23 | 0.98 | Example |
| 65 | V | V2 | 313 | 629 | 0.50 | 17.6 | 0.07 | 0.05 | 1 | Example |
| 66 | W | W1 | 387 | 616 | 0.63 | 16.4 | 0.14 | 0.09 | 1.07 | Example |
| 67 | W | W2 | 340 | 538 | 0.63 | 14.5 | 0.14 | 0.01 | 0.93 | Example |
| 68 | X | X1 | 306 | 578 | 0.53 | 15.1 | 0.14 | 0.04 | 1.03 | Example |
| 69 | X | X1 | 629 | 656 | 0.96 | 9.7 | 0.26 | 0.29 | 0.86 | Comparative Example |
| 70 | X | X2 | 283 | 542 | 0.52 | 18.5 | 0.14 | 0.19 | 1 | Example |
| 71 | X | X3 | 440 | 678 | 0.65 | 14.0 | 0.22 | 0.26 | 1.14 | Comparative Example |
| 72 | Y | Y1 | 371 | 657 | 0.56 | 18.9 | 0.15 | 0.16 | 0.98 | Example |
| 74 | Z | Z1 | 362 | 640 | 0.57 | 15.6 | 0.17 | 0.12 | 0.96 | Example |
| 75 | Z | Z2 | 318 | 607 | 0.52 | 17.1 | 0.09 | 0.15 | 0.99 | Example |
| 76 | Z | Z3 | 607 | 606 | 1.00 | 16.9 | 0.09 | 0.30 | 1.13 | Comparative Example |
| 77 | AA | AA | 218 | 448 | 0.49 | 16.1 | 0.10 | 0.15 | 0.91 | Comparative Example |

TABLE 5-3-continued

| | | Hot-Rolled | Properties | | | | | | | |
| Experiment Example | Steel | Steel Sheet | YS MPa | TS MPa | YR | uEl % | $\Delta_{YS}/$ YS | $\Delta_{uEl}/$ uEl | $\alpha_M/90$ | Note |
|---|---|---|---|---|---|---|---|---|---|---|
| 78 | AB | AB | 655 | 636 | 1.03 | 10.2 | 0.21 | 0.28 | 1.14 | Comparative Example |
| 79 | AC | AC | 635 | 650 | 0.98 | 9.7 | 0.10 | 0.22 | 1.08 | Comparative Example |
| 80 | AD | AD | 610 | 652 | 0.94 | 13.2 | 0.17 | 0.23 | 0.92 | Comparative Example |
| 81 | AE | AE | 298 | 352 | 0.85 | 19.8 | 0.14 | 0.14 | 1.07 | Comparative Example |
| 82 | AF | AF | 428 | 727 | 0.59 | 9.4 | 0.07 | 0.05 | 1.06 | Comparative Example |
| 83 | AG | AG | 188 | 407 | 0.47 | 18.0 | 0.14 | 0.14 | 0.92 | Comparative Example |
| 84 | AH | AH | 391 | 462 | 0.85 | 18.8 | 0.17 | 0.19 | 1.21 | Comparative Example |

The underline represents that the value is outside of the range of the present invention or is not preferable.

Among steels A to AH shown in Tables 1-1 and 1-2, the steels AA to AG are comparative examples where the composition was outside of the range defined by the present invention.

The steel AA did not satisfy Expression (1-2). In the steel sheet according to Experiment Example 77 obtained using this steel, the amount of unrecrystallized ferrite was small. Therefore, the 0.2% proof stress, the tensile strength, and the yield ratio were low.

The steel AB did not satisfy Expression (1-2). In the steel sheet according to Experiment Example 78 obtained using this steel, the amount of unrecrystallized ferrite was large, and Expression (4) was not satisfied. Therefore, the 0.2% proof stress and the yield ratio were high, and Expressions (12) and (13) were not satisfied.

In the steel AC, the Ti content was higher than the range of the present invention. In the steel sheet according to Experiment Example 79 obtained using this steel, the amount of unrecrystallized ferrite was large. Therefore, the 0.2% proof stress and the yield ratio were high, and the uniform elongation was low.

In the steel AD, the Nb content was higher than the range of the present invention. In the steel sheet according to Experiment Example 80 obtained using this steel, the amount of unrecrystallized ferrite was large. Therefore, the 0.2% proof stress and the yield ratio were high.

In the steel AE, the C content was lower than the range of the present invention. In the steel sheet according to Experiment Example 81 obtained using this steel, the tensile strength was low.

In the steel AF, the C content and the S content were higher than the ranges of the present invention. In the steel sheet according to Experiment Example 82 obtained using this steel, the ferrite content was low. Therefore, the uniform elongation was low.

The steel AG did not include both Ti and Nb. In the steel sheet according to Experiment Example 83 obtained using this steel, the amount of unrecrystallized ferrite was small, carbonitrides were not included, and Expression (5) was not satisfied. Therefore, the 0.2% proof stress, the tensile strength, and the yield ratio were low.

Experiment Examples 4, 7, 12, 21, 34, 41, and 61 were comparative examples where the conditions of the hot rolling process were outside of the range of the present invention.

Experiment Example 4 was a comparative example in which the hot rolling completion temperature was low. Therefore, Expressions (2) and (3) were not satisfied, and Expressions (12) and (13) were not satisfied.

Experiment Example 7 was a comparative example in which the steel piece heating temperature was low. Therefore, the average grain size of carbonitrides was large, the 0.2% proof stress was low, and Expression (12) was not satisfied.

Experiment Example 12 was a comparative example in which the average cooling rate in the temperature range of 800° C. to 450° C. was low. Therefore, Expression (2) was not satisfied, and Expression (13) was not satisfied.

Experiment Example 21 was a comparative example in which G was large and Expression (6) in a temperature range of 1000° C. or lower was not satisfied. Therefore, Expressions (3) and (5) were not satisfied, and Expression (12) was not satisfied.

Experiment Example 34 was a comparative example in which the time required for the start of cooling after hot rolling was short. Therefore, Expression (3) was not satisfied, and Expression (12) was not satisfied.

Experiment Example 41 was a comparative example in which the steel piece heating temperature was high. Therefore, Expression (3) was not satisfied, and Expression (12) was not satisfied.

Experiment Example 61 was a comparative example in which the hot rolling completion temperature was high. Therefore, Expression (3) was not satisfied, and Expression (12) was not satisfied.

Experiment Examples 38, 47, 71, and 76 were comparative examples in which the conditions of the reheating process were outside of the range of the present invention.

Experiment Example 38 was a comparative example in which the maximum reheating temperature was high. Therefore, Expressions (2), (4), and (5) were not satisfied, and Expressions (12) and (13) were not satisfied.

Experiment Example 47 was a comparative example in which the maximum reheating temperature was high. Therefore, the amount of unrecrystallized ferrite was large, the average grain size of carbonitrides was small, Expressions (4) and (5) were not satisfied, the 0.2% proof stress and the yield ratio were high, the uniform elongation was low, and Expressions (12) and (13) were not satisfied.

Experiment Example 71 was a comparative example in which $K_2O$ was high and Expression (8) in a temperature range of 450° C. to 700° C. was not satisfied. Therefore, the amount of martensite was large, Expression (5) was not satisfied, and Expressions (12) and (13) were not satisfied.

Experiment Example 76 was a comparative example in which Expression (7-1) was not satisfied. Therefore, the average grain size of carbonitrides was small, Expression (5) was not satisfied, the 0.2% proof stress and the yield ratio were high, and Expression (13) was not satisfied.

Experiment Examples 2, 18, and 69 were comparative examples in which the conditions of the cold rolling process were outside of the range of the present invention.

Experiment Example 2 was a comparative example in which the cold rolling completion temperature was low. Therefore, the amount of unrecrystallized ferrite was large, Expression (4) was not satisfied, the 0.2% proof stress was high, the uniform elongation was low, and Expressions (12) and (13) were not satisfied.

Experiment Example 18 was a comparative example in which the total rolling reduction was high. Therefore, Expression (3) was not satisfied, and Expression (12) was not satisfied.

Experiment Example 69 was a comparative example in which the total rolling reduction was low. Therefore, the amount of unrecrystallized ferrite was large, the 0.2% proof stress and the yield ratio were high, the uniform elongation was low, and Expressions (12) and (13) were not satisfied.

Experiment Examples 9, 10, 19, 32, 37, 46, 49, and 50 were comparative examples where the conditions of the annealing process were outside of the range of the present invention.

Experiment Example 9 was a comparative example in which $P_{10}$ was low and Expression (9) was not satisfied. Therefore, the amount of unrecrystallized ferrite was large, and the 0.2% proof stress was high.

Experiment Example 10 was a comparative example in which Expression (10) was not satisfied. Therefore, Expressions (2) was not satisfied, and Expressions (12) and (13) were not satisfied.

Experiment Example 19 was a comparative example in which Expression (11) was not satisfied. Therefore, the amount of residual austenite was large, and the 0.2% proof stress and the yield ratio were low.

Experiment Example 32 was a comparative example in which a tension in a temperature range of 720° C. to the annealing temperature was not applied. Therefore, Expression (2) was not satisfied, and Expression (13) was not satisfied.

Experiment Example 37 was a comparative example in which Expression (10) was not satisfied. Therefore, the amount of martensite was large, and the 0.2% proof stress and the yield ratio were low.

Experiment Example 46 was a comparative example in which the annealing temperature was high. Therefore, the amount of ferrite and the amount of unrecrystallized ferrite were small, and the uniform elongation was low.

Experiment Example 49 was a comparative example in which the annealing temperature was low. Therefore, the amount of unrecrystallized ferrite was small, and the 0.2% proof stress and the yield ratio were low.

Experiment Example 50 was a comparative example in which Expression (10) was not satisfied. Therefore, the amount of martensite was large, and the 0.2% proof stress and the yield ratio were low.

Experiment Example 84 was a comparative example in which Expression (6) was not satisfied, the time required for the start of cooling in the hot rolling process was short, and the rolling completion temperature in the cold rolling process was low. Therefore, Expressions (2) to (5) were not satisfied.

Experiment Examples other than Comparative Examples described above were Examples according to the present invention. It was found that the steel sheets described as Examples were manufactured using the manufacturing method satisfying the manufacturing conditions according to the present invention and thus had excellent formability, strength, and dimensional accuracy during press forming.

Experiment Examples 5, 11, 13, 15, 20, 24, 30, 39, 40, 43, 45, 48, 52, 54, 57, 62, 67, and 70 are examples where the plated steel sheets according to the present invention were obtained by performing plating.

Experiment Examples 15, 24, 43, 45, and 62 were Examples in which a hot-dip galvanized steel sheet (GI) was obtained by cooling the steel sheet to 500° C. in the annealing process, dipping the steel sheet in a molten zinc bath, and cooling the steel sheet to room temperature.

Experiment Examples 5, 11, 13, 30, 39, and 40 were Examples in which hot-dip galvannealed steel sheet (GA) was obtained by cooling the steel sheet to 500° C. in the annealing process, dipping the steel sheet in a molten zinc bath and reheating the steel sheet to 560° C. for alloying and cooling the steel sheet to room temperature.

Experiment Examples 20 and 70 were Examples in which a zinc alloy plated steel sheet was obtained by cooling the steel sheet to 500° C. in the annealing process, dipping the steel sheet in a molten zinc alloy bath, and cooling the steel sheet to room temperature.

Experiment Examples 48 and 52 were Examples in which an alloy galvannealed steel sheet was obtained by cooling the steel sheet to 500° C. in the annealing process, dipping the steel sheet in a molten zinc alloy bath and reheating the steel sheet to 580° C. for alloying and cooling the steel sheet to room temperature.

Experiment Example 57 is an Example in which a galvanized steel sheet was obtained by performing deposition plating after temper rolling.

Experiment Examples 54 and 67 are Examples in which an electrogalvanized steel sheet (EG) was obtained by performing electrogalvanizing after the annealing process.

INDUSTRIAL APPLICABILITY

In the above-described aspects according to the present invention, a steel sheet having excellent formability, strength, and dimensional accuracy during press forming and a method of manufacturing the same can be provided. The steel sheet according to the above-described aspects is a steel sheet that is suitable for a significant reduction in the weight of a vehicle and for ensuring the protection and safety of a passenger. Therefore, the present invention is highly applicable to the steel sheet manufacturing industry and the automobile industry.

The invention claimed is:

1. A steel sheet comprising, as a composition, by mass % comprising:
C: 0.035% to 0.150%;
Si: 0.010% to 1.500%;
Mn: 0.10% to 3.00%;
Al: 0.005% to 1.000%;
P: 0.100% or less;
S: 0.0200% or less;
N: 0.0150% or less;
O: 0.0100% or less;
V: 0% to 0.50%;

Cr: 0% to 1.00%;
Ni: 0% to 1.00%;
Cu: 0% to 1.00%;
Mo: 0% to 1.00%;
W: 0% to 1.00%;
B: 0% to 0.0100%;
Sn: 0% to 1.00%;
Sb: 0% to 0.20%;
Nb: 0% to 0.060%;
Ti: 0% to 0.100%;
Ca: 0% to 0.0100%;
Mg: 0% to 0.0100%;
Zr: 0% to 0.0100%;
REM: 0% to 0.0100%; and
a remainder: Fe and impurities,
wherein Expressions (1-1) to (1-3) are satisfied;
a microstructure in a ¼ width portion at a ¼ width position from a sheet width direction end portion in a sheet width direction and at a ¼ thickness position from a surface in a sheet thickness direction, a microstructure in a ½ width portion at a ½ width position from the sheet width direction end portion in the sheet width direction and at the ¼ thickness position from the surface in the sheet thickness direction, and a microstructure in a ¾ width portion at a ¾ width position from the sheet width direction end portion in the sheet width direction and at the ¼ thickness position from the surface in the sheet thickness direction
include, by area %, ferrite: 80% or more, martensite: 2% or less, and residual austenite: 2% or less, and the remainder in microstructure comprises pearlite, cementite, and bainite in a total area ratio of 20% or less,
a proportion of unrecrystallized ferrite in the ferrite is 5% to 60%,
an average grain size of carbonitrides is 6.0 nm to 30.0 nm,
Expressions (2) to (5) are satisfied,
a 0.2% proof stress is 280 MPa to 600 MPa,
a tensile strength is 450 MPa to 800 MPa,
a yield ratio is 0.50 to 0.90, and
a uniform elongation is 10.0% or more, $$1.5 \times Nb + Ti \geq 0.015 \tag{1-1}$$

$$0.03 \leq \{(Ti/48 - N/14) + Nb/93\}/(C/12) \leq 0.40 \tag{1-2}$$

$$Ca + Mg + Zr + REM \leq 0.0100 \tag{1-3}$$

$$\Delta_{SF}/\mu_{SF} \leq 0.10 \tag{2}$$

$$\Delta_{dF}/\mu_{dF} \leq 0.20 \tag{3}$$

$$\Delta_{SUF} \leq 20 \tag{4}$$

$$\Delta_{dC}/\mu_{dC} \leq 0.50 \tag{5}$$

each of Ti, N, Nb, C, Ca, Mg, Zr, and REM in Expressions (1-1) to (1-3) represent a content by mass % of the element, when the element is not included, 0% is substituted as the content of the element, and when a value of $(Ti/48 - N/14)$ is negative, 0 is substituted as the value of $(Ti/48 - N/14)$,
$\mu_{SF}$ in Expression (2) represents an average value of an area ratio of ferrite in the microstructure in the ¼ width portion, an area ratio of ferrite in the microstructure in the ½ width portion, and an area ratio of ferrite in the microstructure in the ¾ width portion, and $\Delta_{SF}$ represents a difference between a maximum value and a minimum value of area ratio of ferrite in the microstructures in the ¼ width portion, the ½ width portion, and the ¾ width portion,
$\mu_{dF}$ in Expression (3) represents an average value of an average grain size of ferrite in the microstructure in the ¼ width portion, an average grain size of ferrite in the microstructure in the ½ width portion, and an average grain size of ferrite in the microstructure in the ¾ width portion, and $A_{dF}$ represents a difference between a maximum value and a minimum value of average grain size of ferrite in the microstructures in the ¼ width portion, the ½ width portion, and the ¾ width portion,
$\Delta_{SUF}$ in Expression (4) represents a difference between a maximum value and a minimum value of area ratio of unrecrystallized ferrite in the microstructures in the ¼ width portion, the ½ width portion, and the ¾ width portion, and
$\mu_{dC}$ in Expression (5) represents an average value of an average grain size of carbonitrides in the microstructure in the ¼ width portion, an average grain size of carbonitrides in the microstructure in the ½ width portion, and an average grain size of carbonitrides in the microstructure in the ¾ width portion, and $\Delta_{dC}$ represents a difference between a maximum value and a minimum value of average grain size of carbonitrides in the microstructures in the ¼ width portion, the ½ width portion, and the ¾ width portion.

2. The steel sheet according to claim 1 wherein the composition, includes Mn: 0.70% to 3.00% by mass %.

3. The steel sheet according to claim 2,
wherein the average grain sizes of ferrite in the ¼ width portion, the ½ width portion, and the ¾ width portion is 5.0 μm to 15.0 μm.

4. The steel sheet according to claim 1,
wherein the average grain sizes of ferrite in the ¼ width portion, the ½ width portion, and the ¾ width portion is 5.0 μm to 15.0 μm.

5. The steel sheet according to claim 1, comprising a galvanized layer on the surface.

6. The steel sheet according to claim 5,
wherein a Fe content in the galvanized layer is 7.0% to 13.0% by mass %.

7. The steel sheet according to claim 1, comprising a zinc alloy plated layer on the surface.

8. The steel sheet according to claim 7,
wherein a Fe content in the zinc alloy plated layer is 7.0% to 13.0% by mass %.

9. The steel sheet according to claim 1, wherein the proportion of unrecrystallized ferrite in the ferrite is 10% to 60%.

10. The steel sheet according to claim 1, wherein the proportion of unrecrystallized ferrite in the ferrite is 12% to 60%.

11. The steel sheet according to claim 1, wherein the steel sheet includes 0% martensite and wherein the yield ratio is 0.50 to 0.69.

12. A method of manufacturing the steel sheet according to claim 1, comprising:
a hot rolling process of heating a steel piece having the composition of said steel sheet to 1150° C. to 1320° C., completing hot rolling such that a hot rolling completion temperature is 850° C. to 930° C., starting cooling after 1.5 s or longer, cooling the steel piece to a temperature range of lower than 450° C. to obtain a hot-rolled steel sheet such that an average cooling rate in a temperature range of 800° C. to 450° C. is 20° C./s or higher;

a reheating process of heating the hot-rolled steel sheet to a temperature range of 450° C. to 700° C.;

a cooling process of cooling the hot-rolled steel sheet to room temperature;

a cold rolling process of cold-rolling the hot-rolled steel sheet to obtain a cold-rolled steel sheet such that a total rolling reduction is 30% to 80% and a cold rolling completion temperature is 120° C. or higher; and an annealing process of heating the cold-rolled steel sheet to an annealing temperature of 720° C. to 850° C. and cooling the cold-rolled steel sheet to a temperature range of 500° C. or lower, wherein in the hot rolling process, Expression (6) is satisfied in a temperature range of 1000° C. or lower, in the reheating process, Expression (7-1) and Expression (8) are satisfied in the temperature range of 450° C. to 700° C., in the annealing process, in the process of heating to the annealing temperature, Expression (9) is satisfied in a temperature range of 550° C. to 720° C., a tension of 15 MPa or higher is applied and Expression (10) is satisfied in a temperature range of 720° C. to the annealing temperature, and in the process of cooling from the annealing temperature, Expression (11) is satisfied in a temperature range of 720° C. to 500° C., $$g_n = \left(0.5 + \frac{h*}{h}\right)\cdot\left(1 + a_1\sqrt{Nb} + a_2\sqrt{Ti}\right) \quad (6)$$

$$K_n = (T_n + 273)\cdot\left(a_3 + a_4\sqrt{Nb} + a_5\sqrt{Ti}\right)$$

$$R_n = (T_n + 273)\cdot\left(a_6 + a_7\sqrt{Nb} + a_8\sqrt{Ti}\right)$$

$$J_n = \left(\frac{h*}{h}\right)^{1.5}\cdot\left(a_9 + a_{10}\sqrt{Nb} + a_{11}\sqrt{Ti}\right)$$

$$f_n = [f_{n-1}\cdot\exp(-K_n\cdot t_n) + g_n\cdot\{1 - \exp(-K_n\cdot t_n)\}]\cdot\exp(-R_n\cdot t_n) + J_n \leq 1.00$$

in Expression (6), $f_n$ represents an index representing a degree of progress of precipitation of a fine carbide in the temperature range of 1000° C. or lower of the hot rolling process, where, $f_n$ can be obtained by setting $f_0$ to 0 and calculating $f_1$ to $f_n$ in order, reference numerals in Expression (6) are as follows, n: the number of rolling passes at 1000° C. or lower, h: a sheet thickness in mm before an n-th pass rolling, h*: a sheet thickness in mm after the n-th pass rolling, Nb and Ti: contents in mass % of Nb and Ti, $T_n$: an average steel sheet temperature in ° C. from the n-th pass rolling to an n+1-th pass rolling, wherein the average steel sheet temperature is a temperature in the width direction of the steel strip managed such that a temperature distribution in the width direction is within +15° C. relative to the average temperature, $t_n$: a shorter time among a time in s from the n-th pass rolling to the n+1-th pass rolling and a time in s taken until the steel sheet temperature decreases to 800° C. from the n-th pass rolling, $a_{1\ to\ 11}$: constants ($a_1=2.28\times100$, $a_2=1.25\times100$, $a_3=7.86\times10^{-4}$, $a_4=1.36\times10^{-3}$, $5=6.76\times10^{-4}$, $a_6=7.86\times10^{-4}$, $a_7=2.13\times10^{-3}$, $a_8=1.14\times10^{-3}$, $a_9=6.70\times10^{-2}$, $a_{10}=1.11\times10^{0}$, and $a_{11}=5.27\times10^{-1}$), $$b_1\cdot\left\{1.00-\exp\left(-\frac{b_2 + b_3\cdot\sqrt{Nb} + b_4\cdot\sqrt{Ti*}-T_{max}}{b_5 + b_6\cdot\sqrt{Nb} + b_7\cdot\sqrt{Ti*}}\right)\right\}\cdot\sqrt{D_{20}\cdot t_{20}} \geq 1.00 \quad (7\text{-}1)$$

reference numerals in Expression (7-1) are as follows, $b_{1\ to\ 7}$: constants ($b_1=6.82\times10^6$, $b_2=1.00\times10^3$, $b_3=8.70\times10^1$, $b_4=1.25\times10^2$, $b_5=1.00\times10^2$, $b_6=-1.50\times10^1$, and $b_7=-2.50\times10^1$), Nb: a Nb content in mass %, Ti*: an effective Ti content represented by Ti−42/14× N, where each of Ti and N represents a content by mass % of the element, and when the element is not included, 0 is substituted as the content of the element, $T_{max}$: a highest heating temperature in ° C., $t_{20}$: an effective heat temperature time in s in a 20th period when a residence time in the temperature range of 450° C. to 700° C. is divided into 20 periods, $D_{20}$: an index representing an effective diffusion rate in a 20th period when a residence time in the temperature range of 450° C. to 700° C. is divided into 20 periods, where an m-th effective heat treatment time $t_m$ and an index $D_m$ representing an m-th effective diffusion rate are represented by Expression (7-2), $$D_m = \frac{Ti*}{42}\cdot\left(\frac{Ti*}{42} + \frac{Nb}{92}\right)^{-1}\cdot b_8\cdot\exp\left(-\frac{b_9}{T_m}\right) + \frac{Nb}{92}\cdot\left(\frac{Ti*}{42} + \frac{Nb}{92}\right)^{-1}\cdot b_{10}\cdot\exp\left(-\frac{b_{11}}{T_m}\right) \quad (7\text{-}2)$$

$$t_m = t' + \frac{D_{m-1}}{D_m}\cdot t_{m-1}$$

reference numerals in Expression (7-2) are as follows, m: an integer of 1 to 20, $b_{9\ to\ 11}$: constants ($b_8=6.81\times10^1$, $b_9=2.61\times10^5$, $b_{10}=5.60\times10^0$, and $b_{11}=2.86\times10^5$), Nb: a Nb content in mass %, Ti*: an effective Ti content represented by Ti−42/14×N, where each of Ti and N represents a content by mass % of the element, and when the element is not included, 0 is substituted as the content of the element, $T_m$: an average steel sheet temperature in ° C. in an m-th period when a residence time in the temperature range of 450° C. to 700° C. is divided into 20 periods, wherein the average steel sheet temperature is a temperature in the width direction of the steel strip managed such that a temperature distribution in the width direction is within #15° C. relative to the average temperature, $t_m$: an effective heat treatment time s in an m-th period when a residence time in the temperature range of 450° C. to 700° C. is divided into 20 periods, where $t_1 = t'$, t': 1/20 s of an entire residence time in the temperature range of 450° C. to 700° C., $$K_j = \frac{(8)}{T_j\cdot\left(\log10(s_j) + 20/(1 + 0.15\times Si - 0.08\times Mn - 0.05\times Cr - 0.13\times Mo)\right)}$$

$$s_j = t' + 10^{\frac{T_{j-1}}{T_j}\cdot log_{10}s_j - 1 + \frac{20}{T_j}\cdot\frac{T_j + T_{j-1}}{1 + 0.15Si - 0.08Mn - 0.05Cr - 0.13Mo}}$$

-continued $$K_{20} \leqq 2.00 \times 10^4$$

in Expression (8), $K_{20}$ represents an index representing a degree of stabilization of cementite in a 20th period when a temperature history in the temperature range of 450° C. to 700° C. of the reheating process is divided into 20 periods with respect to time, reference numerals in Expression (8) are as follows, j: an integer of 1 to 20, each of Si, Mn, Cr, and Mo: a content mass % of the element, $T_j$: an average steel sheet temperature in ° C. in a j-th period when a residence time in the temperature range of 450° C. to 700° C. is divided into 20 periods, wherein the average steel sheet temperature is a temperature in the width direction of the steel strip managed such that a temperature distribution in the width direction is within =15° C. relative to the average temperature, $s_j$: an effective heat treatment time s in a j-th period when a residence time in the temperature range of 450° C. to 700° C. is divided into 20 periods, where $s_1 = t'$, t': 1/20 s of an entire residence time in the temperature range of 450° C. to 700° C., $$E = d_1 \cdot \left(1 - \frac{h*}{h}\right)^{1.5} \cdot T_R^{-1} \cdot \left(1 + d_2 \cdot Nb^{0.5} + d_3 \cdot Ti*^{0.5}\right)^{-1} \cdot K_2^{0.5} \quad (9)$$

$$q_n = d_3 \cdot E \cdot \exp\left(-\frac{d_4}{T_n' + 273}\right)$$

$$t_n = \Delta t - \frac{\ln(1 - p_{n-1})}{q_n}$$

$$p_n = 1 - \exp(-q_n \cdot t_n)$$

$$0.10 \leq p_{10} \leq 1.00$$

in Expression (9), $p_{10}$ represents an index representing a degree of progress of recrystallization in a 10th period when a residence time in the temperature range of 550° C. to 720° C. in the process of heating in the annealing process is divided into 10 periods, reference numerals in Expression (9) are as follows, $d_{1\ to\ 4}$: constants ($d_1 = 4.24 \times 10^2$, $d_2 = 2.10 \times 10^0$, $d_3 = 1.31 \times 10^3$, and $d_4 = 7.63 \times 10^3$), h: a sheet thickness in mm before cold rolling, h*: a sheet thickness in mm after cold rolling, $T_R$: a cold rolling completion temperature in ° C., Nb: a Nb content in mass %, Ti*: an effective Ti content represented by Ti−42/14× N, where each of Ti and N represents a content by mass % of the element, and when the element is not included, 0 is substituted as the content of the element, $K_2$: a value obtained by Expression (7-1), n: an integer of 1 to 10, $T_n'$: an average temperature in ° C. in an n-th period when a residence time in the temperature range of 550° C. to 720° C. is divided into 10 periods, $\Delta_t$: a time in s when an elapsed time until a steel sheet temperature reaches 720° C. from 550° is divided into 10 periods, where $t_1 = \Delta t$, $$y_m = \left\{\frac{e_1}{K_2} \cdot \exp\left(-\frac{e_2}{T_m + 273}\right) \cdot \frac{A_{c3} - T_m}{A_{c3} - A_{c1}} \cdot t_m\right\}^{1/2} \cdot e_3 \cdot \left(\frac{T_m - e_4}{A_{c3} - e_4}\right)^3 \quad (10)$$

$$t_m = \Delta t + y_{m-1}^2 \cdot \left\{\frac{e_1}{K_2} \cdot \exp\left(-\frac{e_2}{T_m + 273}\right) \cdot \frac{A_{c3} - T_m}{A_{c3} - A_{c1}}\right\}^{-1} \cdot \left\{e_3 \cdot \left(\frac{T_m - e_4}{A_{c3} - e_4}\right)^3\right\}^{-2}$$

$$1.0 \leq e_4 \cdot y_m \cdot (K_3 \cdot K_4)^{-\frac{1}{2}} \leq 5.0$$

in Expression (10), $y_m$ represents an index representing a degree of progress of reverse transformation in an m-th period when a residence time in the temperature range of 720° C. to the annealing temperature is divided into 10 periods, and $y_0 = 0$, reference numerals in Expression (10) are as follows, $e_{1\ to\ 4}$: constants ($e_1 = 4.50 \times 10^2$, $e_2 = 2.85 \times 10^4$, $e_3 = 2.24 \times 10^0$, and $e_4 = 8.56 \times 10^{-8}$), $K_2$: a value on the left side of Expression (7-1), $K_3$: a value of $K_2 0$ obtained by Expression (8), $e_4\ y_m\ (K_3 \cdot K_4)^{-1/2}$ is a value when m=10, $K_4$: a value of $p_{10}$ obtained by Expression (9), $Ac_1$: an austenite transformation start temperature in ° C. during heating, $Ac_3$: an austenite transformation completion temperature in ° C. during heating, $T_m$: an average temperature in ° C. in an m-th period when a residence time in the temperature range of 720° C. to the annealing temperature is divided into 10 periods, $t_m$: an effective heat treatment time s in an m-th period when a residence time in the temperature range of 720° C. to the annealing temperature is divided into 10 periods, and Δt: a time in s when an entire residence time in the temperature range of 720° C. to 500° C. is divided into 10 periods;

$$\sum_{i=1}^{10} \left(g_1 + g_2 \cdot Nb^{0.5} + g_3 \cdot Ti*^{0.5}\right) \cdot \left(1 + g_4 \cdot Mo^{0.5}\right)^{-1} \cdot K_4^{1/3} \cdot \quad (11)$$

$$\left(\frac{A_{c3} - T_{max}}{A_{c3} - A_{c1}}\right)^{1/3} \cdot \left(\Delta_i + g_5 \cdot \Delta_i^{0.5}\right) \cdot \exp\left(-\frac{g_6}{T_i + 273}\right) \cdot t'^{0.5} \geq 1.00$$

reference numerals in Expression (11) are as follows, i: an integer of 1 to 10, $\Delta_i$: 750−18×Si−17×Mn−10×Cr−8×Ni+15×Al−Ti, where each of the elements represents a content by mass % of the element, and when the element is not included, 0 is substituted as the content of the element, when a calculated value of $\Delta_i$ is a negative value, $\Delta_i$ set to 0, $g_{1\ to\ 6}$: constants ($g_1 = 1.00 \times 10^{-1}$, $g_2 = 1.46 \times 10^{-1}$, $g_3 = 1.14 \times 10^{-1}$, $g_4 = 2.24 \times 100$, $g_5 = 4.53 \times 10^0$, and $g_6 = 4.83 \times 10^3$), each of Nb, Mo, Si, Mn, Cr, Ni, and Al: a content in mass % of the element, Ti*: an effective Ti content represented by Ti−42/14× N, where each of Ti and N represents a content by mass % of the element, and when the element is not included, 0 is substituted as the content of the element, $K_4$: a value of $p_{10}$ obtained by Expression (9), $Ac_1$: an austenite transformation start temperature in ° C. during heating, $Ac_3$: an austenite transformation completion temperature in ° C. during heating, $T_{max}$: an annealing temperature in ° C., $T_i$: an average temperature in ° C. in an i-th period when a residence time in the temperature range of 720° C. to 500° C. is divided into 10 periods, and t': $\frac{1}{20}$ s of an entire residence time in the temperature range of 450° C. to 700° C.

13. The method of manufacturing a steel sheet according to claim 12, wherein in the process of cooling in the annealing process, hot-dip galvanizing is performed on the cold-rolled steel sheet.

14. The method of manufacturing a steel sheet according to claim 13, wherein in the process of cooling in the annealing process, alloying is performed after the hot-dip galvanizing.

15. The method of manufacturing a steel sheet according to claim 12, wherein in the process of cooling in the annealing process, hot-dip zinc alloy plating is performed on the cold-rolled steel sheet.

16. The method of manufacturing a steel sheet according to claim 15, wherein in the process of cooling in the annealing process, alloying is performed after the hot-dip zinc alloy plating.

* * * * *